United States Patent
Ngu et al.

(10) Patent No.: US 12,492,202 B2
(45) Date of Patent: Dec. 9, 2025

(54) MACROCYCLIC PAD4 INHIBITORS USEFUL AS IMMUNOSUPPRESSANT

(71) Applicant: BRISTOL-MYERS SQUIBB COMPANY, Princeton, NJ (US)

(72) Inventors: Khehyong Ngu, Pennington, NJ (US); Christopher Annunziato, North Lawrence, NJ (US); John V. Duncia, Newtown, PA (US); Daniel S. Gardner, Furlong, PA (US)

(73) Assignee: Bristol-Myers Squibb Company, Princeton, NJ (US)

( * ) Notice: Subject to any disclaimer, the term of this patent is extended or adjusted under 35 U.S.C. 154(b) by 686 days.

(21) Appl. No.: 17/760,309

(22) PCT Filed: Feb. 5, 2021

(86) PCT No.: PCT/US2021/016698
§ 371 (c)(1),
(2) Date: Aug. 8, 2022

(87) PCT Pub. No.: WO2021/158840
PCT Pub. Date: Aug. 12, 2021

(65) Prior Publication Data
US 2023/0203039 A1    Jun. 29, 2023

Related U.S. Application Data

(60) Provisional application No. 62/970,832, filed on Feb. 6, 2020.

(51) Int. Cl.
C07D 471/22    (2006.01)
A61K 45/06     (2006.01)
C07D 487/22    (2006.01)
C07D 498/22    (2006.01)
C07D 519/00    (2006.01)

(52) U.S. Cl.
CPC ............ C07D 471/22 (2013.01); A61K 45/06 (2013.01); C07D 487/22 (2013.01); C07D 498/22 (2013.01); C07D 519/00 (2013.01)

(58) Field of Classification Search
CPC .. C07D 471/22; C07D 487/22; C07D 498/22; C07D 519/00
See application file for complete search history.

(56) References Cited

FOREIGN PATENT DOCUMENTS

| WO | 2014015905 A1 | 1/2014 |
|---|---|---|
| WO | 2016185279 A1 | 11/2016 |
| WO | 2017/100601 A1 | 6/2017 |
| WO | 2017/100594 A1 | 7/2017 |
| WO | 2017147102 A1 | 8/2017 |
| WO | 2018022897 A1 | 2/2018 |
| WO | 2018049296 A1 | 3/2018 |
| WO | 2020033488 A1 | 2/2020 |
| WO | 2020033490 A1 | 2/2020 |
| WO | 2020033514 A1 | 2/2020 |
| WO | 2020033520 A1 | 2/2020 |
| WO | 2021158840 A1 | 8/2021 |
| WO | 2021163254 A1 | 8/2021 |

OTHER PUBLICATIONS

Berge et al Pharmaceutical Salts Journal of Pharmaceutical Sciences, vol. 66(1), pp. 1-19 (1977).
Brinkmann et al., Neutrophil extracellular traps kill bacteria, Science vol. 303(5663) pp. 1532-1535 (2004).
Chang, et al., "Increased PADI4 expression in blood and tissues of patients with malignant tumors", BMC Cancer, vol. 9(40), pp. 1-11 (2009).
Chumanevich, et al., "Suppression of colitis in mice by Cl-amidine: a novel peptidylarginine deiminase inhibitor", American J of Physiology, Gastrointestinal and Liver Physiology, vol. 300(6), pp. G929-G938 (2011).
Clark, et al., "Platelet TLR4 activates neutrophil extracellular traps to ensnare bacteria in septic blood", Nature Medicine, vol. 13(4), pp. 463-469 (2007).
Dworski et al., "Eosinophil and neutrophil extracellular DNA traps in human allergic asthmatic airways", The Journal of Allergy and Clinical Immunology, vol. 127(5), pp. 1260-1266 (2011).
Fuchs, et al., "Extracellular DNA traps promote thrombosis", PNAS, vol. 107(36), pp. 15880-15885 (2010).
Hakkim et al., "Impairment of neutrophil extracellular trap degradation is associated with lupus nephritis", PNAS, vol. 107(21), pp. 9813-9818 (2010).
ISR issued by USPTO for Application No. PCT/US2016/065857 mailed Apr. 17, 2017 .
Jones et al., "Protein arginine deiminase 4 (PAD4) current understanding and future therapeutic potential", Current Opinion in Drug Discovery and Development, vol. 12(5), pp. 616-627 (2009).
Kessenbrock et al., "Netting neutrophils in autoimmune small- (Continued)

*Primary Examiner* — Matthew P Coughlin
(74) *Attorney, Agent, or Firm* — Hong Liu

(57) ABSTRACT

The present invention provides compounds of Formula (I) useful as inhibitors of PAD4, compositions thereof, and methods of treating PAD4-related disorders, (I) wherein ring A, $A_1$, $A_2$, $A_3$, $A_4$, Q, $R_1$, $R_2$, $R_3$, $R_4$, $R_5$, and $R_6$ along with other variables are as defined herein.

(I)

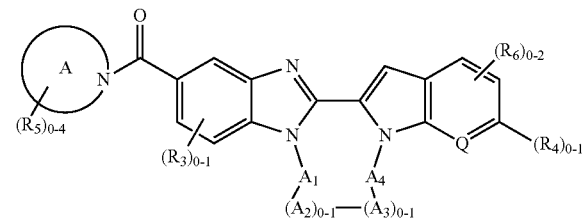

21 Claims, No Drawings

(56) References Cited

OTHER PUBLICATIONS vessel vasculitis", Nature Medicine, vol. 15(6), pp. 623-625 (2009).
Kochi et al., "PADI4 polymorphism predisposes male smokers to rheumatoid arthritis", Annals of the Rheumatic Diseases, vol. 70(3), pp. 512-515 (2011).
Lange et al., "Protein deiminases: New players in the developmentally regulated loss of neutral regenerative ability", Developmental Biology, vol. 355(2), 205-214 (2011).
Lewis et al., "Inhibition of PAD4 activity is sufficient to disrupt mouse and human NET formation", Nature Chemical Biology, vol. 11(3) pp. 189-191 (2015).
Li et al., "PAD4 is essential for antibacterial innate immunity mediated by neutrophil extracellular traps", JEM, vol. 207(9), pp. 1853-1862 (2010).
Li et al., "Regulation of p53 Target Gene Expression by Peptidylarginine Deiminase 4", Molecular and Cellular Biology, vol. 28(15), pp. 4745-4758 (2008).
Lin et al., "Mast Cells and Neutrophils Release IL-17 through Extracellular Trip Formation in Psoriasis", The Journal of Immunology, vol. 187(1), pp. 490-500 (2011).
Neeli et al., "Histone Deimination As a Response to Inflammatory Stimuli in Neutrophils", The Journal of Immunology, vol. 108(3), pp. 1895-1902 (2008).
Pubchem Substance Record for SID 1730220505 Mar. 24, 2017.
Savchenko et al., "Long pentraxin 3 (PTX3) expression and release by neutrophils in nitro and in ulcerative colitis", Pathology International, 2011, vol. 61, pp. 290-297.
Slack et al., "Protein Arginine Deiminase 4: a target for an epigenetic cancer therapy", Cellular and Molecular Life Sciences, vol. 68(4), pp. 709-720 (2011).
Villanueva et al., "Netting Neutrophils Induce Endothelial Damage, Infiltrate Tissues, and Expose Immunostimulatory Molecules in Systemic Lupus Erythematosus", The Journal of Immunology, vol. 187(1), pp. 538-552 (2011).
Vitkov et al., "Neutrophil Fate in Gingival Crevicular Fluid", Ultrastructrual Pathology, vol. 34(1), pp. 1-6 (2010).
Wegner et al., "Autoimmunity to specific citrullinated proteins gives the first clues to the etiology of rheumatoid arthritis", Immunological Reviews, vol. 233(1), pp. 34-54 (2010).
Willis et al., "N-a-Benzoyl-N5-(2-Chloro-1-Iminoethyl)-L-Ornithine Amide, a Protein Arginine Deiminase Inhibitor, Reduces the Severity of Murine Collagen-Induced Arthritis", The J. of Immunology, vol. 186(7), pp. 4396-4404 (2011).

MACROCYCLIC PAD4 INHIBITORS USEFUL AS IMMUNOSUPPRESSANT

CROSS-REFERENCE TO RELATED APPLICATIONS

This application a 371 application of PCT/US2021/016698, filed on Feb. 5, 2021, which claims priority of U.S. Provisional Application Ser. No. 62/970,832, filed Feb. 6, 2020, which are herein incorporated by reference in their entireties.

BACKGROUND OF THE INVENTION

PAD4 is a member of the peptidylarginine deiminase (PAD) family of enzymes capable of catalysing the citrullination of arginine into citrulline within peptide sequences. PAD4 is responsible for the deimination or citrullination of a variety of proteins in vitro and in vivo, with consequences of diverse functional responses in a variety of diseases (Jones J. E. et al, Curr. Opin. Drug Discov. Devel., 12(5), (2009), 616-627). Examples of exemplar diseases include rheumatoid arthritis, diseases with neutrophilic contributions to pathogenesis (for example vasculitis, systemic lupus erythematosus, ulcerative colitis) in addition to oncology indications. PAD4 inhibitors also have wider applicability as tools and therapeutics for human disease through epigenetic mechanisms.

Inhibitors of PAD4 have utility against Rheumatoid Arthritis (RA). RA is an autoimmune disease affecting approximately 1% of the population (Wegner N. et al, Immunol. Rev., 233(1) (2010), 34-54). It is characterised by inflammation of articular joints leading to debilitating destruction of bone and cartilage. A weak genetic association between PAD4 polymorphisms and susceptibility to RA has been suggested, albeit inconsistently, in a number of population studies (Kochi Y. et al, Ann. Rheum. Dis., 70, (2011), 512-515). PAD4 (along with family member PAD2) has been detected in synovial tissue where it is responsible for the deimination of a variety of joint proteins. This process is presumed to lead to a break of tolerance to, and initiation of immune responses to, citrullinated substrates such as fibrinogen, vimentin and collagen in RA joints. These anti-citrullinated protein antibodies (ACPA) contribute to disease pathogenesis and may also be used as a diagnostic test for RA (e.g. the commercially available CCP2 or cyclic citrullinated protein 2 test). In addition, increased citrullination may also offer additional direct contributions to disease pathogenesis through its ability to affect directly the function of several joint and inflammatory mediators (e.g. fibrinogen, anti-thrombin, multiple chemokines). In a smaller subset of RA patients, anti-PAD4 antibodies can be measured and may correlate with a more erosive form of the disease.

PAD4 inhibitors are also useful for the reduction of pathological neutrophil activity in a variety of diseases. Studies suggest that the process of Neutrophil Extracellular Trap (NET) formation, an innate defence mechanism by which neutrophils are able to immobilise and kill pathogens, is associated with histone citrullination and is deficient in PAD4 knockout mice (Neeli I. et al, J. Immunol., 180, (2008), 1895-1902 and Li P. et al, J. Exp. Med., 207(9), (2010), 1853-1862). PAD4 inhibitors may therefore have applicability for diseases where NET formation in tissues contributes to local injury and disease pathology. Such diseases include, but are not limited to, small vessel vasculitis (Kessenbrock K. et al, Nat. Med, 15(6), (2009), 623-625), systemic lupus erythematosus (Hakkim A. et al, Proc. Natl. Acad Sci. USA, 107(21), (2010), 9813-9818 and Villanueva E. et al, J. Immunol., 187(1), (2011), 538-52), ulcerative colitis (Savchenko A. et al, Pathol. Int., 61(5), (2011), 290-7), cystic fibrosis, asthma (Dworski R. et al, J. Allergy Clin. Immunol., 127(5), (2011), 1260-6), deep vein thrombosis (Fuchs T. et al, Proc. Natl. Acad Sci. USA, 107(36), (2010), 15880-5), periodontitis (Vitkov L. et al, Ultrastructural Pathol., 34(1), (2010), 25-30), sepsis (Clark S. R. et al, Nat. Med., 13(4), (2007), 463-9), appendicitis (Brinkmann V et al, Science, 303, (2004), 1532-5), and stroke. In addition, there is evidence that NETs may contribute to pathology in diseases affecting the skin, e.g., in cutaneous lupus erythematosus (Villanueva E. et al, J. Immunol., 187(1), (2011), 538-52) and psoriasis (Lin A. M. et al., J. Immunol., 187(1), (2011), 490-500), so a PAD4 inhibitor may show benefit to tackle NET skin diseases, when administered by a systemic or cutaneous route. PAD4 inhibitors may affect additional functions within neutrophils and have wider applicability to neutrophilic diseases.

Studies have demonstrated efficacy of tool PAD inhibitors (for example chloro-amidine) in a number of animal models of disease, including collagen-induced arthritis (Willis V. C. et al, J. Immunol., 186(7), (2011), 4396-4404), dextran sulfate sodium (DSS)-induced experimental colitis (Chumanevich A. A. et al, Am. J. Physiol. Gastrointest. Liver Physiol., 300(6), (2011), G929-G938), spinal cord repair (Lange S. et al, Dev. Biol., 355(2), (2011), 205-14), and experimental autoimmune encephalomyelitis (EAE). The DSS colitis report also demonstrates that chloro-amidine drives apoptosis of inflammatory cells both in vitro and in vivo, suggesting that PAD4 inhibitors may be effective more generally in widespread inflammatory diseases.

PAD4 inhibitors are also useful in the treatment of cancers (Slack. J. L. et al, Cell. Mol. Life Sci., 68(4), (2011), 709-720). Over-expression of PAD4 has been demonstrated in numerous cancers (Chang X et al, BMC Cancer, 9, (2009), 40). An anti-proliferative role has been suggested for PAD4 inhibitors from the observation that PAD4 citrullinates arginine residues in histones at the promoters of p53-target genes such as p21, which are involved in cell cycle arrest and induction of apoptosis (Li P. et al, Mol. Cell Biol., 28(15), (2008), 4745-4758).

The aforementioned role of PAD4 in deiminating arginine residues in histones may be indicative of a role for PAD4 in epigenetic regulation of gene expression. PAD4 is the primary PAD family member observed to be resident in the nucleus as well as the cytoplasm. Early evidence that PAD4 may act as a histone demethyliminase as well as a deiminase is inconsistent and unproven. However, it may reduce histone arginine methylation (and hence epigenetic regulation associated with this mark) indirectly via depletion of available arginine residues by conversion to citrulline. PAD4 inhibitors are useful as epigenetic tools or therapeutics for affecting expression of varied target genes in additional disease settings. Through such mechanisms, PAD4 inhibitors may also be effective in controlling citrullination levels in stem cells and may therefore therapeutically affect the pluripotency status and differentiation potential of diverse stem cells including, but not limited to, embryonic stem cells, neural stem cells, haematopoietic stem cells and cancer stem cells. Accordingly, there remains an unmet need to identify and develop PAD4 inhibitors for the treatment of PAD4-mediated disorders.

SUMMARY OF THE INVENTION

It has now been found that compounds of Formula (I) are useful as inhibitors of PAD4:

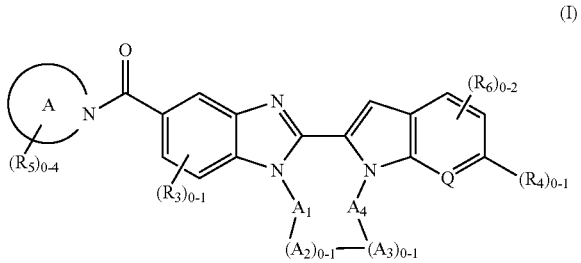

or a pharmaceutically acceptable salt thereof, wherein ring A, $A_1$, $A_2$, $A_3$, $A_4$, Q, $R_1$, $R_2$, $R_3$, $R_4$, $R_5$, and $R_6$, along with other variables are as defined herein.

In some embodiments, a provided compound demonstrates selectivity for PAD4 with respect to PAD2. The present invention also provides pharmaceutically acceptable compositions comprising a provided compound. Provided compounds are useful in treatment of various disorders associated with PAD4. Such disorders are described in detail, herein, and include, for example rheumatoid arthritis, vasculitis, systemic lupus erythematosus, ulcerative colitis, cancer, cystic fibrosis, asthma, cutaneous lupus erythematosus, and psoriasis.

DETAILED DESCRIPTION OF THE INVENTION

1. General Description of Certain Aspects of the Invention

In some embodiments, such compounds include those of the formulae described herein, or a pharmaceutically acceptable salt thereof, wherein each variable is as defined herein and described in embodiments. Such compounds have the structure of Formula (I):

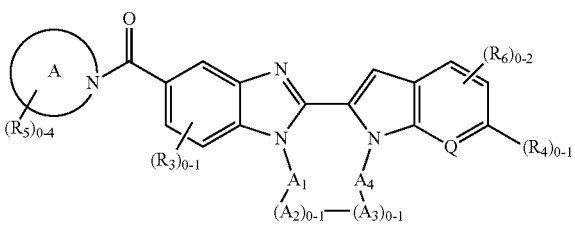

or a pharmaceutically acceptable salt thereof, wherein:

Q is selected from the group consisting of N and CH;

A is 4- to 15-membered heterocyclyl comprising carbon atoms and 1-4 heteroatoms selected from N, O, and $S(O)_p$;

$A_1$ is $C_{1-4}$ alkylene substituted with 0-3 $R_1$; optionally, one or more of the methylene units of said $C_{1-4}$ alkylene are replaced by O, $S(O)_p$, NH, $N(C_{1-4}$ alkyl), and $C(=O)$;

$A_2$ is selected from the group consisting of $C_{3-6}$ carbocyclyl and 4- to 6-membered heterocyclyl comprising carbon atoms and 1-4 heteroatoms selected from N, O, and $S(O)_p$, each substituted with 0-4 $R_2$;

$A_3$ is selected from the group consisting of $C_{3-6}$ carbocyclyl and 4- to 6-membered heterocyclyl comprising carbon atoms and 1-4 heteroatoms selected from N, O, and $S(O)_p$, each substituted with 0-4 $R_2$;

$A_4$ is selected from the group consisting of $C_{3-8}$ alkylene and $C_{3-8}$ alkenylene, each substituted with 0-5 $R_1$; optionally, one or more of the methylene units of said $C_{3-8}$ alkylene except for the one that is directly bonded to the nitrogen atom of the indole or pyrrolopyridine moiety are replaced by O, $S(O)_p$, NH, $N(C_{1-4}$ alkyl), and $C(=O)$;

provided that when $A_2$ is absent, $A_1$ is bonded directly to $A_3$; when $A_3$ is absent, $A_2$ is bonded directly to $A_4$ when $A_2$ and $A_3$ are both absent, $A_1$ is bonded directly to $A_4$ and at least two methylene units of $A_4$ are replaced by O, $S(O)_p$, NH, $N(C_{1-4}$ alkyl), and $C(=O)$;

$R_1$ is selected from the group consisting of F, Cl, —$OR_b$, and $C_{1-3}$ alkyl substituted with 0-5 $R_c$;

$R_2$ is selected from the group consisting of F, Cl, CN, =O, $C(=O)NR_aR_a$, and $C_{1-3}$ alkyl substituted with 0-5 $R_c$;

$R_3$ is selected from the group consisting of F, Cl, Br, —$OR_b$, and $C_{1-3}$ alkyl substituted with 0-5 $R_c$;

$R_4$ is selected from the group consisting of F, Cl, Br, $C_{1-6}$ alkyl substituted with 0-5 $R_c$;

$R_5$ is selected from the group consisting of F, Cl, CN, $C_{1-3}$ alkyl, =N—$OR_b$, —$(CH_2)_rOR_b$, —$OC(=O)NR_aR_a$, —$(CH_2)_rNR_aR_a$, —$NR_aC(=NH)C_{1-3}$alkyl, —$C(=O)OR_b$, —$NR_aC(=O)OR_b$, carbocyclylyl substituted with 0-5 $R_c$, and heterocyclylyl substituted with 0-5 $R_c$; alternatively, two $R_5$ groups are taken together to form carbocyclyl or heterocyclyl;

$R_6$, at each occurrence, is independently selected from the group consisting of F, Cl, Br, and $C_{1-4}$alkyl, $C_{1-4}$ haloalkyl, and $C_{1-4}$ hydroxyalkyl;

$R_a$, at each occurrence, is independently selected from the group consisting of H, $C_{1-6}$ alkyl substituted with 0-5 $R_c$, $C_{2-6}$ alkenyl substituted with 0-5 $R_c$, $C_{2-6}$ alkynyl substituted with 0-5 $R_c$, —$(CH_2)_r$—$C_{3-10}$carbocyclyl substituted with 0-5 Re, and —$(CH_2)_r$-heterocyclyl substituted with 0-5 $R_c$; or $R_a$ and $R_a$ together with the nitrogen atom to which they are both attached form a heterocyclic ring substituted with 0-5 $R_c$;

$R_b$, at each occurrence, is independently selected from the group consisting of H, $C_{1-6}$ alkyl substituted with 0-5 $R_c$, $C_{2-6}$ alkenyl substituted with 0-5 $R_c$, $C_{2-6}$ alkynyl substituted with 0-5 $R_c$, —$(CH_2)_r$—$C_{3-10}$carbocyclyl substituted with 0-5 $R_c$, and —$(CH_2)_r$-heterocyclyl substituted with 0-5 $R_c$;

$R_c$, at each occurrence, is independently selected from the group consisting of F, Cl, Br, CN, =O, OH, $OC_{1-4}$ alkyl, $CO_2H$, $C_{1-6}$ alkyl substituted with 0-5 $R_d$, —$(CH_2)_r$—$C_{3-6}$ cycloalkyl substituted with 0-5 $R_d$, —$(CH_2)_r$-aryl substituted with 0-5 $R_d$, —$(CH_2)_r$-heterocyclyl substituted with 0-5 $R_d$;

$R_d$, at each occurrence, is independently selected from the group consisting of F, Cl, Br, CN, OH, $C_{1-5}$ alkyl, $C_{2-5}$ alkenyl, $C_{2-5}$ alkynyl, $C_{3-6}$ cycloalkyl, and phenyl;

p, at each occurrence, is an integer selected from zero, 1, and 2; and r, at each occurrence, is an integer selected from zero, 1, 2, 3, and 4.

2. Definitions

Throughout the specification and the appended claims, a given chemical formula or name shall encompass all stereo and optical isomers and racemates thereof where such isomers exist. Unless otherwise indicated, all chiral (enantiomeric and diastereomeric) and racemic forms are within the scope of the invention. Many geometric isomers of C═C double bonds, C═N double bonds, ring systems, and the like can also be present in the compounds, and all such stable isomers are contemplated in the present invention. Cis- and trans- (or E- and Z-) geometric isomers of the compounds of the present invention are described and may be isolated as a mixture of isomers or as separated isomeric forms. The present compounds can be isolated in optically active or racemic forms. Optically active forms may be prepared by resolution of racemic forms or by synthesis from optically active starting materials. All processes used to prepare compounds of the present invention and intermediates made therein are considered to be part of the present invention. When enantiomeric or diastereomeric products are prepared, they may be separated by conventional methods, for example, by chromatography or fractional crystallization. Depending on the process conditions the end products of the present invention are obtained either in free (neutral) or salt form. Both the free form and the salts of these end products are within the scope of the invention. If so desired, one form of a compound may be converted into another form. A free base or acid may be converted into a salt; a salt may be converted into the free compound or another salt; a mixture of isomeric compounds of the present invention may be separated into the individual isomers. Compounds of the present invention, free form and salts thereof, may exist in multiple tautomeric forms, in which hydrogen atoms are transposed to other parts of the molecules and the chemical bonds between the atoms of the molecules are consequently rearranged. It should be understood that all tautomeric forms, insofar as they may exist, are included within the invention.

As used herein, the term "alkyl" or "alkylene" is intended to include both branched and straight-chain saturated aliphatic hydrocarbon groups having the specified number of carbon atoms. For examples, "$C_1$ to $C_{12}$ alkyl" or "$C_{1-12}$ alkyl" (or alkylene), is intended to include $C_1$, $C_2$, $C_3$, $C_4$, $C_5$, $C_6$, $C_7$, $C_8$, $C_9$, $C_{10}$, $C_{11}$ and $C_{12}$ alkyl groups; "$C_4$ to $C_{18}$ alkyl" or "$C_{4-18}$ alkyl" (or alkylene), is intended to include $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, and $C_{18}$ alkyl groups. Additionally, for example, "$C_1$ to $C_6$ alkyl" or "$C_{1-5}$ alkyl" denotes alkyl having 1 to 6 carbon atoms. Alkyl group can be unsubstituted or substituted with at least one hydrogen being replaced by another chemical group. Example alkyl groups include, but are not limited to, methyl (Me), ethyl (Et), propyl (e.g., n-propyl and isopropyl), butyl (e.g., n-butyl, isobutyl, t-butyl), and pentyl (e.g., n-pentyl, isopentyl, neopentyl). When "$C_0$ alkyl" or "$C_0$ alkylene" is used, it is intended to denote a direct bond.

"Alkenyl" or "alkenylene" is intended to include hydrocarbon chains of either straight or branched configuration having the specified number of carbon atoms and one or more, preferably one to two, carbon-carbon double bonds that may occur in any stable point along the chain. For example, "$C_2$ to $C_6$ alkenyl" or "$C_{2-6}$ alkenyl" (or alkenylene), is intended to include $C_2$, $C_3$, $C_4$, $C_5$, and $C_6$ alkenyl groups. Examples of alkenyl include, but are not limited to, ethenyl, 1-propenyl, 2-propenyl, 2-butenyl, 3-butenyl, 2-pentenyl, 3, pentenyl, 4-pentenyl, 2-hexenyl, 3-hexenyl, 4-hexenyl, 5-hexenyl, 2-methyl-2-propenyl, and 4-methyl-3-pentenyl.

"Alkynyl" or "alkynylene" is intended to include hydrocarbon chains of either straight or branched configuration having one or more, preferably one to three, carbon-carbon triple bonds that may occur in any stable point along the chain. For example, "$C_2$ to $C_6$ alkynyl" or "$C_{2-6}$ alkynyl" (or alkynylene), is intended to include $C_2$, $C_3$, $C_4$, $C_5$, and $C_6$ alkynyl groups; such as ethynyl, propynyl, butynyl, pentynyl, and hexynyl.

The term "alkoxy" or "alkyloxy" refers to an —O-alkyl group. For example, "$C_1$ to $C_6$ alkoxy" or "$C_{1-6}$ alkoxy" (or alkyloxy), is intended to include $C_1$, $C_2$, $C_3$, $C_4$, $C_5$, and $C_6$ alkoxy groups. Example alkoxy groups include, but are not limited to, methoxy, ethoxy, propoxy (e.g., n-propoxy and isopropoxy), and t-butoxy. Similarly, "alkylthio" or "thioalkoxy" represents an alkyl group as defined above with the indicated number of carbon atoms attached through a sulphur bridge; for example methyl-S— and ethyl-S—.

"Halo" or "halogen" includes fluoro, chloro, bromo, and iodo. "Haloalkyl" is intended to include both branched and straight-chain saturated aliphatic hydrocarbon groups having the specified number of carbon atoms, substituted with 1 or more halogens. Examples of haloalkyl include, but are not limited to, fluoromethyl, difluoromethyl, trifluoromethyl, trichloromethyl, pentafluoroethyl, pentachloroethyl, 2,2,2-trifluoroethyl, heptafluoropropyl, and heptachloropropyl. Examples of haloalkyl also include "fluoroalkyl" that is intended to include both branched and straight-chain saturated aliphatic hydrocarbon groups having the specified number of carbon atoms, substituted with 1 or more fluorine atoms.

The term "cycloalkyl" refers to cyclized alkyl groups, including mono-, bi- or poly-cyclic ring systems. For example, "$C_3$ to $C_6$ cycloalkyl" or "$C_{3-6}$ cycloalkyl" is intended to include $C_3$, $C_4$, $C_5$, and $C_6$ cycloalkyl groups. Example cycloalkyl groups include, but are not limited to, cyclopropyl, cyclobutyl, cyclopentyl, cyclohexyl, and norbornyl. Branched cycloalkyl groups such as 1-methylcyclopropyl and 2-methylcyclopropyl are included in the definition of "cycloalkyl". The term "cycloalkenyl" refers to cyclized alkenyl groups. $C_{4-6}$ cycloalkenyl is intended to include $C_4$, $C_5$, and $C_6$ cycloalkenyl groups. Example cycloalkenyl groups include, but are not limited to, cyclobutenyl, cyclopentenyl, and cyclohexenyl.

As used herein, "carbocycle", "carbocyclyl", or "carbocyclic residue" is intended to mean any stable 3-, 4-, 5-, 6-, 7-, or 8-membered monocyclic or bicyclic or 7-, 8-, 9-, 10-, 11-, 12-, or 13-membered bicyclic or tricyclic hydrocarbon ring, any of which may be saturated, partially unsaturated, unsaturated or aromatic. Examples of such carbocycles include, but are not limited to, cyclopropyl, cyclobutyl, cyclobutenyl, cyclopentyl, cyclopentenyl, cyclohexyl, cycloheptenyl, cycloheptyl, cycloheptenyl, adamantyl, cyclooctyl, cyclooctenyl, cyclooctadienyl, [3.3.0]bicyclooctane, [4.3.0]bicyclononane, [4.4.0]bicyclodecane (decalin), [2.2.2]bicyclooctane, fluorenyl, phenyl, naphthyl, indanyl, adamantyl, anthracenyl, and tetrahydronaphthyl (tetralin). As shown above, bridged rings are also included in the definition of carbocycle (e.g., [2.2.2]bicyclooctane). Preferred carbocycles, unless otherwise specified, are cyclopropyl, cyclobutyl, cyclopentyl, cyclohexyl, phenyl, indanyl, and tetrahydronaphthyl. When the term "carbocycle" is used, it is intended to include "aryl." A bridged ring occurs when one or more, preferably one to three, carbon atoms link two non-adjacent carbon atoms. Preferred bridges are one or two carbon atoms. It is noted that a bridge always converts a monocyclic ring into a tricyclic ring. When a ring is bridged, the substituents recited for the ring may also be present on the bridge.

As used herein, the term "bicyclic carbocycle" or "bicyclic carbocyclic group" is intended to mean a stable 9- or 10-membered carbocyclic ring system that contains two fused rings and consists of carbon atoms. Of the two fused rings, one ring is a benzo ring fused to a second ring; and the second ring is a 5- or 6-membered carbon ring which is saturated, partially unsaturated, or unsaturated. The bicyclic carbocyclic group may be attached to its pendant group at any carbon atom which results in a stable structure. The bicyclic carbocyclic group described herein may be substituted on any carbon if the resulting compound is stable. Examples of a bicyclic carbocyclic group are, but not limited to, naphthyl, 1,2-dihydronaphthyl, 1,2,3,4-tetrahydronaphthyl, and indanyl.

"Aryl" groups refer to monocyclic or bicyclic aromatic hydrocarbons, including, for example, phenyl, and naphthyl. Aryl moieties are well known and described, for example, in Lewis, R. J., ed., *Hawley's Condensed Chemical Dictionary*, 15th Edition, John Wiley & Sons, Inc., New York (2007). "$C_{6-10}$ aryl" refers to phenyl and naphthyl.

As used herein, the term "heterocycle", "heterocyclyl", or "heterocyclic group" is intended to mean a stable 3-, 4-, 5-, 6-, or 7-membered monocyclic or bicyclic or 7-, 8-, 9-, 10-, 11-, 12-, 13-, or 14-membered polycyclic heterocyclic ring that is saturated, partially unsaturated, or fully unsaturated, and that contains carbon atoms and 1, 2, 3 or 4 heteroatoms independently selected from the group consisting of N, O and S; and including any polycyclic group in which any of the above-defined heterocyclic rings is fused to a benzene ring. The nitrogen and sulfur heteroatoms may optionally be oxidized (i.e., N—O and $S(O)_p$, wherein p is 0, 1 or 2). The nitrogen atom may be substituted or unsubstituted (i.e., N or NR wherein R is H or another substituent, if defined). The heterocyclic ring may be attached to its pendant group at any heteroatom or carbon atom that results in a stable structure. The heterocyclic rings described herein may be substituted on carbon or on a nitrogen atom if the resulting compound is stable. A nitrogen in the heterocycle may optionally be quaternized. It is preferred that when the total number of S and O atoms in the heterocycle exceeds 1, then these heteroatoms are not adjacent to one another. It is preferred that the total number of S and O atoms in the heterocycle is not more than 1. When the term "heterocycle" is used, it is intended to include heteroaryl.

Examples of heterocycles include, but are not limited to, acridinyl, azetidinyl, azocinyl, benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH-carbazolyl, carbolinyl, chromanyl, chromenyl, cinnolinyl, decahydroquinolinyl, 2H,6H-1,5,2-dithiazinyl, dihydrofuro[2,3-b]tetrahydrofuran, furanyl, furazanyl, imidazolidinyl, imidazolinyl, imidazolyl, 1H-indazolyl, imidazolopyridinyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isothiazolopyridinyl, isoxazolyl, isoxazolopyridinyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxazolopyridinyl, oxazolidinylperimidinyl, oxindolyl, pyrimidinyl, phenanthridinyl, phenanthrolinyl, phenazinyl, phenothiazinyl, phenoxathiinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolopyridinyl, pyrazolyl, pyridazinyl, pyridooxazolyl, pyridoimidazolyl, pyridothiazolyl, pyridinyl, pyrimidinyl, pyrrolidinyl, pyrrolinyl, 2-pyrrolidonyl, 2H-pyrrolyl, pyrrolyl, quinazolinyl, quinolinyl, 4H-quinolizinyl, quinoxalinyl, quinuclidinyl, tetrazolyl, tetrahydrofuranyl, tetrahydroisoquinolinyl, tetrahydroquinolinyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thiazolopyridinyl, thienothiazolyl, thienooxazolyl, thienoimidazolyl, thiophenyl, triazinyl, 1,2,3-triazolyl, 1,2,4-triazolyl, 1,2,5-triazolyl, 1,3,4-triazolyl, and xanthenyl. Also included are fused ring and spiro compounds containing, for example, the above heterocycles.

Examples of 5- to 10-membered heterocycles include, but are not limited to, pyridinyl, furanyl, thienyl, pyrrolyl, pyrazolyl, pyrazinyl, piperazinyl, piperidinyl, imidazolyl, imidazolidinyl, indolyl, tetrazolyl, isoxazolyl, morpholinyl, oxazolyl, oxadiazolyl, oxazolidinyl, tetrahydrofuranyl, thiadiazinyl, thiadiazolyl, thiazolyl, triazinyl, triazolyl, benzimidazolyl, 1H-indazolyl, benzofuranyl, benzothiofuranyl, benztetrazolyl, benzotriazolyl, benzisoxazolyl, benzoxazolyl, oxindolyl, benzoxazolinyl, benzthiazolyl, benzisothiazolyl, isatinoyl, isoquinolinyl, octahydroisoquinolinyl, tetrahydroisoquinolinyl, tetrahydroquinolinyl, isoxazolopyridinyl, quinazolinyl, quinolinyl, isothiazolopyridinyl, thiazolopyridinyl, oxazolopyridinyl, imidazolopyridinyl, and pyrazolopyridinyl. Also included are fused ring and spiro compounds containing, for example, the above heterocycles.

Bridged rings are also included in the definition of heterocycle. A bridged ring occurs when one or more, preferably one to three, atoms (i.e., C, O, N, or S) link two non-adjacent carbon or nitrogen atoms. Examples of bridged rings include, but are not limited to, one carbon atom, two carbon atoms, one nitrogen atom, two nitrogen atoms, and a carbon-nitrogen group. It is noted that a bridge always converts a monocyclic ring into a tricyclic ring. When a ring is bridged, the substituents recited for the ring may also be present on the bridge.

As used herein, the term "bicyclic heterocycle" or "bicyclic heterocyclic group" is intended to mean a stable 9- or 10-membered heterocyclic ring system which contains two fused rings and consists of carbon atoms and 1, 2, 3, or 4 heteroatoms independently selected from the group consisting of N, O and S. Of the two fused rings, one ring is a 5- or 6-membered monocyclic aromatic ring comprising a 5-membered heteroaryl ring, a 6-membered heteroaryl ring or a benzo ring, each fused to a second ring. The second ring is a 5- or 6-membered monocyclic ring which is saturated, partially unsaturated, or unsaturated, and comprises a 5-membered heterocycle, a 6-membered heterocycle or a carbocycle (provided the first ring is not benzo when the second ring is a carbocycle).

The bicyclic heterocyclic group may be attached to its pendant group at any heteroatom or carbon atom which results in a stable structure. The bicyclic heterocyclic group described herein may be substituted on carbon or on a nitrogen atom if the resulting compound is stable. It is preferred that when the total number of S and O atoms in the heterocycle exceeds 1, then these heteroatoms are not adjacent to one another. It is preferred that the total number of S and O atoms in the heterocycle is not more than 1.

Examples of a bicyclic heterocyclic group are, but not limited to, quinolinyl, isoquinolinyl, phthalazinyl, quinazolinyl, indolyl, isoindolyl, indolinyl, 1H-indazolyl, benzimidazolyl, 1,2,3,4-tetrahydroquinolinyl, 1,2,3,4-tetrahydroisoquinolinyl, 5,6,7,8-tetrahydro-quinolinyl, 2,3-dihydrobenzofuranyl, chromanyl, 1,2,3,4-tetrahydro-quinoxalinyl, and 1,2,3,4-tetrahydro-quinazolinyl.

As used herein, the term "aromatic heterocyclic group" or "heteroaryl" is intended to mean stable monocyclic and polycyclic aromatic hydrocarbons that include at least one heteroatom ring member such as sulfur, oxygen, or nitrogen. Heteroaryl groups include, without limitation, pyridyl, pyrimidinyl, pyrazinyl, pyridazinyl, triazinyl, furyl, quinolyl, isoquinolyl, thienyl, imidazolyl, thiazolyl, indolyl, pyrroyl, oxazolyl, benzofuryl, benzothienyl, benzthiazolyl, isoxazolyl, pyrazolyl, triazolyl, tetrazolyl, indazolyl, 1,2,4-thiadiazolyl, isothiazolyl, purinyl, carbazolyl, benzimidazolyl, indolinyl, benzodioxolanyl, and benzodioxane. Heteroaryl groups are substituted or unsubstituted. The nitrogen atom is substituted or unsubstituted (i.e., N or NR wherein R is H or another substituent, if defined). The nitrogen and sulfur heteroatoms may optionally be oxidized (i.e., N→O and $S(O)_p$, wherein p is 0, 1 or 2).

Examples of 5- to 6-membered heteroaryls include, but are not limited to, pyridinyl, furanyl, thienyl, pyrrolyl, pyrazolyl, pyrazinyl, imidazolyl, imidazolidinyl, tetrazolyl, isoxazolyl, oxazolyl, oxadiazolyl, oxazolidinyl, thiadiazinyl, thiadiazolyl, thiazolyl, triazinyl, and triazolyl.

The term "counter ion" is used to represent a negatively charged species such as chloride, bromide, hydroxide, acetate, and sulfate or a positively charged species such as sodium ($Na^+$), potassium ($K^+$), ammonium ($R_nNH_m+$ where n=0-4 and m=0-4) and the like.

When a dotted ring is used within a ring structure, this indicates that the ring structure may be saturated, partially saturated or unsaturated.

As used herein, the term "amine protecting group" means any group known in the art of organic synthesis for the protection of amine groups which is stable to an ester reducing agent, a disubstituted hydrazine, R4-M and R7-M, a nucleophile, a hydrazine reducing agent, an activator, a strong base, a hindered amine base and a cyclizing agent. Such amine protecting groups fitting these criteria include those listed in Wuts, P. G. M. et al., *Protecting Groups in Organic Synthesis*, 4th Edition, *Wiley* (2007) and *The Peptides: Analysis, Synthesis, Biology*, Vol. 3, Academic Press, New York (1981), the disclosure of which is hereby incorporated by reference. Examples of amine protecting groups include, but are not limited to, the following: (1) acyl types such as formyl, trifluoroacetyl, phthalyl, and p-toluenesulfonyl; (2) aromatic carbamate types such as benzyloxycarbonyl (Cbz) and substituted benzyloxycarbonyls, 1-(p-biphenyl)-1-methylethoxycarbonyl, and 9-fluorenylmethyloxycarbonyl (Fmoc); (3) aliphatic carbamate types such as tert-butyloxycarbonyl (Boc), ethoxycarbonyl, diisopropylmethoxycarbonyl, and allyloxycarbonyl; (4) cyclic alkyl carbamate types such as cyclopentyloxycarbonyl and adamantyloxycarbonyl; (5) alkyl types such as triphenylmethyl and benzyl; (6) trialkylsilane such as trimethylsilane; (7) thiol containing types such as phenylthiocarbonyl and dithiasuccinoyl; and (8) alkyl types such as triphenylmethyl, methyl, and benzyl; and substituted alkyl types such as 2,2,2-trichloroethyl, 2-phenylethyl, and t-butyl; and trialkylsilane types such as trimethylsilane.

As referred to herein, the term "substituted" means that at least one hydrogen atom is replaced with a non-hydrogen group, provided that normal valencies are maintained and that the substitution results in a stable compound. Ring double bonds, as used herein, are double bonds that are formed between two adjacent ring atoms (e.g., C=C, C=N, or N=N).

In cases wherein there are nitrogen atoms (e.g., amines) on compounds of the present invention, these may be converted to N-oxides by treatment with an oxidizing agent (e.g., mCPBA and/or hydrogen peroxides) to afford other compounds of this invention. Thus, shown and claimed nitrogen atoms are considered to cover both the shown nitrogen and its N-oxide (N→O) derivative.

When any variable occurs more than one time in any constituent or formula for a compound, its definition at each occurrence is independent of its definition at every other occurrence. Thus, for example, if a group is shown to be substituted with 0-3 R, then said group may optionally be substituted with up to three R groups, and at each occurrence R is selected independently from the definition of R.

When a bond to a substituent is shown to cross a bond connecting two atoms in a ring, then such substituent may be bonded to any atom on the ring. When a substituent is listed without indicating the atom in which such substituent is bonded to the rest of the compound of a given formula, then such substituent may be bonded via any atom in such substituent.

Combinations of substituents and/or variables are permissible only if such combinations result in stable compounds.

The phrase "pharmaceutically acceptable" is employed herein to refer to those compounds, materials, compositions, and/or dosage forms that are, within the scope of sound medical judgment, suitable for use in contact with the tissues of human beings and animals without excessive toxicity, irritation, allergic response, and/or other problem or complication, commensurate with a reasonable benefit/risk ratio.

As used herein, "pharmaceutically acceptable salts" refer to derivatives of the disclosed compounds wherein the parent compound is modified by making acid or base salts thereof. Examples of pharmaceutically acceptable salts include, but are not limited to, mineral or organic acid salts of basic groups such as amines; and alkali or organic salts of acidic groups such as carboxylic acids. The pharmaceutically acceptable salts include the conventional non-toxic salts or the quaternary ammonium salts of the parent compound formed, for example, from non-toxic inorganic or organic acids. Examples of pharmaceutically acceptable, nontoxic acid addition salts are salts of an amino group formed with inorganic acids such as hydrochloric acid, hydrobromic acid, phosphoric acid, sulfuric acid and perchloric acid or with organic acids such as acetic acid, oxalic acid, maleic acid, tartaric acid, citric acid, succinic acid or malonic acid or by using other methods used in the art such as ion exchange. Other pharmaceutically acceptable salts include adipate, alginate, ascorbate, aspartate, benzenesulfonate, benzoate, bisulfate, borate, butyrate, camphorate, camphorsulfonate, citrate, cyclopentanepropionate, digluconate, dodecylsulfate, ethanesulfonate, formate, fumarate, glucoheptonate, glycerophosphate, gluconate, hemisulfate, heptanoate, hexanoate, hydroiodide, 2-hydroxy-ethanesulfonate, lactobionate, lactate, laurate, lauryl sulfate, malate, maleate, malonate, methanesulfonate, 2-naphthalenesulfonate, nicotinate, nitrate, oleate, oxalate, palmitate, pamoate, pectinate, persulfate, 3-phenylpropionate, phosphate, pivalate, propionate, stearate, succinate, sulfate, tartrate, thiocyanate, p-toluenesulfonate, undecanoate, valerate salts, and the like.

Salts derived from appropriate bases include alkali metal, alkaline earth metal, ammonium and $N^+(C_{1-4}alkyl)_4$ salts. Representative alkali or alkaline earth metal salts include sodium, lithium, potassium, calcium, magnesium, and the like. Further pharmaceutically acceptable salts include, when appropriate, nontoxic ammonium, quaternary ammonium, and amine cations formed using counterions such as halide, hydroxide, carboxylate, sulfate, phosphate, nitrate, loweralkyl sulfonate and aryl sulfonate.

The pharmaceutically acceptable salts of the present invention can be synthesized from the parent compound that contains a basic or acidic moiety by conventional chemical methods. Generally, such salts can be prepared by reacting the free acid or base forms of these compounds with a stoichiometric amount of the appropriate base or acid in water or in an organic solvent, or in a mixture of the two; generally, nonaqueous media like ether, ethyl acetate, ethanol, isopropanol, or acetonitrile are preferred. Lists of suitable salts are found in Allen, Jr., L. V., ed., *Remington: The Science and Practice of Pharmacy*, 22nd Edition, Pharmaceutical Press, London, UK (2012), the disclosure of which is hereby incorporated by reference.

In addition, compounds of Formula (I) may have prodrug forms. Any compound that will be converted in vivo to provide the bioactive agent (i.e., a compound of formula I) is a prodrug within the scope and spirit of the invention. Various forms of prodrugs are well known in the art. For examples of such prodrug derivatives, see:
a) Bundgaard, H., ed., *Design of Prodrugs*, Elsevier (1985), and Widder, K. et al., eds., *Methods in Enzymology*, 112:309-396, Academic Press (1985);
b) Bundgaard, H., Chapter 5, "Design and Application of Prodrugs", Krosgaard-Larsen, P. et al., eds., *A Textbook of Drug Design and Development*, pp. 113-191, Harwood Academic Publishers (1991);
c) Bundgaard, H., *Adv. Drug Deliv. Rev.*, 8:1-38 (1992);
d) Bundgaard, H. et al., *J. Pharm. Sci.*, 77:285 (1988);
e) Kakeya, N. et al., *Chem. Pharm. Bull.*, 32:692 (1984); and
f) Rautio, J., ed., *Prodrugs and Targeted Delivery* (*Methods and Principles in Medicinal Chemistry*), Vol. 47, Wiley-VCH (2011).

Compounds containing a carboxy group can form physiologically hydrolyzable esters that serve as prodrugs by being hydrolyzed in the body to yield formula I compounds per se. Such prodrugs are preferably administered orally since hydrolysis in many instances occurs principally under the influence of the digestive enzymes. Parenteral administration may be used where the ester per se is active, or in those instances where hydrolysis occurs in the blood. Examples of physiologically hydrolyzable esters of compounds of formula I include $C_{1-6}$alkyl, $C_{1-6}$alkylbenzyl, 4-methoxybenzyl, indanyl, phthalyl, methoxymethyl, $C_{1-6}$ alkanoyloxy-$C_{1-6}$alkyl (e.g., acetoxymethyl, pivaloyloxymethyl or propionyloxymethyl), $C_{1-6}$alkoxycarbonyloxy-$C_{1-6}$alkyl (e.g., methoxycarbonyl-oxymethyl or ethoxycarbonyloxymethyl, glycyloxymethyl, phenylglycyloxymethyl, (5-methyl-2-oxo-1,3-dioxolen-4-yl)-methyl), and other well-known physiologically hydrolyzable esters used, for example, in the penicillin and cephalosporin arts. Such esters may be prepared by conventional techniques known in the art.

Preparation of prodrugs is well known in the art and described in, for example, King, F. D., ed., *Medicinal Chemistry: Principles and Practice*, The Royal Society of Chemistry, Cambridge, UK (2nd Edition, reproduced (2006)); Testa, B. et al., *Hydrolysis in Drug and Prodrug Metabolism. Chemistry, Biochemistry and Enzymology*, VCHA and Wiley-VCH, Zurich, Switzerland (2003); Wermuth, C. G., ed., *The Practice of Medicinal Chemistry*, 3rd Edition, Academic Press, San Diego, CA (2008).

The present invention is intended to include all isotopes of atoms occurring in the present compounds. Isotopes include those atoms having the same atomic number but different mass numbers. By way of general example and without limitation, isotopes of hydrogen include deuterium (symbol D or 2H) and tritium (symbol T or 3H). For example, a methyl group may be represented by $CH_3$ or $CD_3$. Isotopes of carbon include $^{13}C$ and $^{14}C$. Isotopically-labeled compounds of the invention can generally be prepared by conventional techniques known to those skilled in the art or by processes analogous to those described herein, using an appropriate isotopically-labeled reagent in place of the non-labeled reagent otherwise employed.

The term "solvate" means a physical association of a compound of this invention with one or more solvent molecules, whether organic or inorganic. This physical association includes hydrogen bonding. In certain instances the solvate will be capable of isolation, for example when one or more solvent molecules are incorporated in the crystal lattice of the crystalline solid. The solvent molecules in the solvate may be present in a regular arrangement and/or a non-ordered arrangement. The solvate may comprise either a stoichiometric or nonstoichiometric amount of the solvent molecules. "Solvate" encompasses both solution-phase and isolable solvates. Exemplary solvates include, but are not limited to, hydrates, ethanolates, methanolates, and isopropanolates. Methods of solvation are generally known in the art.

The terms "measurable affinity" and "measurably inhibit," as used herein, means a measurable change in PAD4 activity between a sample comprising a compound of the present invention, or composition thereof, and PAD4, and an equivalent sample comprising PAD4 in the absence of said compound, or composition thereof.

Abbreviations as used herein, are defined as follows: "1×" for once, "2×" for twice, "3×" for thrice, "° C." for degrees Celsius, "eq" for equivalent or equivalents, "g" for gram or grams, "mg" for milligram or milligrams, "L" for liter or liters, "mL" for milliliter or milliliters, "μL" for microliter or microliters, "N" for normal, "M" for molar, "mmol" for millimole or millimoles, "min" for minute or min, "h" for hour or h, "rt" for room temperature, "RT" for retention time, "atm" for atmosphere, "psi" for pounds per square inch, "conc." for concentrate, "aq" for "aqueous", "sat" or "sat'd" for saturated, "MW" for molecular weight, "mp" for melting point, "MS" or "Mass Spec" for mass spectrometry, "ESI" for electrospray ionization mass spectroscopy, "HR" for high resolution, "HRMS" for high resolution mass spectrometry, "LCMS" for liquid chromatography mass spectrometry, "HPLC" for high pressure liquid chromatography, "RP HPLC" for reverse phase HPLC, "TLC" or "tlc" for thin layer chromatography, "NMR" for nuclear magnetic resonance spectroscopy, "nOe" for nuclear Overhauser effect spectroscopy, "$^1H$" for proton, "S" for delta, "s" for singlet, "d" for doublet, "t" for triplet, "q" for quartet, "m" for multiplet, "br" for broad, "Hz" for hertz, and "a", "p", "R", "S", "E", "Z" and "ee" are stereochemical designations familiar to one skilled in the art. As used herein, the term "pharmaceutically acceptable salt" refers to those salts which are, within the scope of sound medical judgment, suitable for use in contact with the tissues of humans and lower animals without undue toxicity, irritation, allergic response and the like, and are commensurate with a reasonable benefit/risk ratio.

AcOH or HOAc acetic acid
ACN acetonitrile
Alk Alkyl
$AlMe_3$ Trimethylaluminum
$BBr_3$ boron tribromide
Bn benzyl
Boc tert-butyloxycarbonyl
BOP reagent benzotriazol-1-yloxytris(dimethylamino) phosphonium hexafluorophosphate
Bu butyl
i-Bu isobutyl
t-Bu tert-butyl t-BuOH tert-butanol
Cbz carbobenzyloxy
CDCl$_3$ deutero-chloroform
CD$_3$OD deutero-methanol
CH$_2$Cl$_2$ dichloromethane
CH$_3$CN acetonitrile
CHCl$_3$ chloroform
DCM dichloromethane
DIEA, DIPEA or Hunig's diisopropylethylamine base
DMF dimethyl formamide
DMSO dimethyl sulfoxide
Et ethyl
Et$_3$N or TEA triethylamine
Et$_2$O diethyl ether
EtOAc ethyl acetate
EtOH Ethanol
HATU 1-[Bis(dimethylamino)methylene]-1H-1,2,3-triazolo[4,5-b]pyridinium 3-oxid hexafluorophosphate
HCl hydrochloric acid
HPLC high-performance liquid chromatography
Ir(dF(CF3)ppy)2(dtbbpy)PF6 (4,4'-Di-t-butyl-2,2'-bipyridine)bis[3,5-difluoro-2-(5-trifluoromethyl-2-pyridinyl-kN)phenyl-kC]iridium(III) hexafluorophosphate
K$_2$CO$_3$ potassium carbonate
K$_2$HPO$_4$ potassium hydrogenphosphate
K$_3$PO$_4$ potassium phosphate, tribasic
LCMS liquid chromatography mass spectrometry
LiHMDS lithium bis(trimethylsilyl)amide
LG leaving group
Me methyl
MeOH methanol
MgSO$_4$ magnesium sulfate
MsOH or MSA methylsulfonic acid
NaCl sodium chloride
Na$_2$CO$_3$ sodium carbonate
NaHCO$_3$ sodium bicarbonate
NaOH sodium hydroxide
Na$_2$SO$_4$ sodium sulfate
NH$_3$ ammonia
NH$_4$Cl ammonium chloride
NH$_4$OAc ammonium acetate
Pd(OAc)$_2$ palladium(II) acetate
Pd(dppf)Cl$_2$ [1,1'-Bis(diphenylphosphino)ferrocene]palladium(II) dichloride
Pd(PPh$_3$)$_4$ tetrakis(triphenylphosphine)palladium(O)
PG protecting group
Ph phenyl
Pr propyl
i-Pr isopropyl
i-PrOH or IPA Isopropanol
RBF Round bottom flask
Rt retention time
SiO$_2$ silica oxide
Si-pyridine SiliaBond© Pyridine
SFC supercritical fluid chromatography
TBAI Tetrabutylammonium iodide
TEA triethylamine
TFA trifluoroacetic acid
TFAA Trifluoroacetic anhydride
THF tetrahydrofuran
TiCl$_4$ titanium tetrachloride
T3P 1-propanephosphonic acid cyclic anhydride 3. Description of Compounds In a first aspect, the present invention provides a compound of Formula (I):

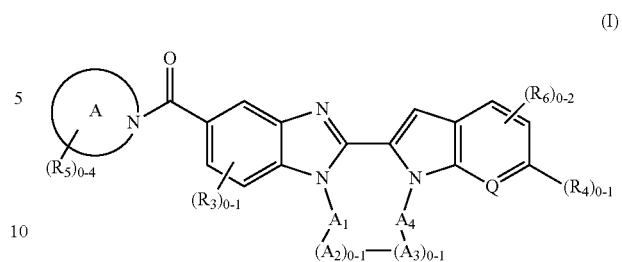

or a pharmaceutically acceptable salt thereof, wherein:

Q is selected from the group consisting of N and CH;

A is 4- to 15-membered heterocyclyl comprising carbon atoms and 1-4 heteroatoms selected from N, O, and S(O)$_p$;

A$_1$ is C$_{1-4}$ alkylene substituted with 0-3 R$_1$; optionally, one or more of the methylene units of said C$_{1-4}$ alkylene are replaced by O, S(O)$_p$, NH, N(C$_{1-4}$ alkyl), and C(=O);

A$_2$ is selected from the group consisting of C$_{3-6}$ carbocyclyl and 4- to 6-membered heterocyclyl comprising carbon atoms and 1-4 heteroatoms selected from N, O, and S(O)$_p$, each substituted with 0-4 R$_2$;

A$_3$ is selected from the group consisting of C$_{3-6}$ carbocyclyl and 4- to 6-membered heterocyclyl comprising carbon atoms and 1-4 heteroatoms selected from N, O, and S(O)$_p$, each substituted with 0-4 R$_2$;

A$_4$ is selected from the group consisting of C$_{3-8}$ alkylene and C$_{3-8}$ alkenylene, each substituted with 0-5 R$_1$; optionally, one or more of the methylene units of said C$_{3-8}$ alkylene except for the one that is directly bonded to the nitrogen atom of the indole or pyrrolopyridine moiety are replaced by O, S(O)$_p$, NH, N(C$_{1-4}$ alkyl), and C(=O);

provided that when A$_2$ is absent, A$_1$ is bonded directly to A$_3$; when A$_3$ is absent, A$_2$ is bonded directly to A$_4$ when A$_2$ and A$_3$ are both absent, A$_1$ is bonded directly to A$_4$ and at least two methylene units of A$_4$ are replaced by O, S(O)$_p$, NH, N(C$_{1-4}$ alkyl), and C(=O);

R$_1$ is selected from the group consisting of F, Cl, —OR$_b$, and C$_{1-3}$ alkyl substituted with 0-5 R$_c$;

R$_2$ is selected from the group consisting of F, Cl, CN, =O, C(=O)NR$_a$R$_a$, and C$_{1-3}$ alkyl substituted with 0-5 R$_c$;

R$_3$ is selected from the group consisting of F, Cl, Br, —OR$_b$, and C$_{1-3}$ alkyl substituted with 0-5 R$_c$;

R$_4$ is selected from the group consisting of F, Cl, Br, C$_{1-6}$ alkyl substituted with 0-5 R$_c$;

R$_5$ is selected from the group consisting of F, Cl, CN, C$_{1-3}$ alkyl, =N—OR$_b$, —(CH$_2$)$_r$OR$_b$, —OC(=O)NR$_a$R$_a$, —(CH$_2$)$_r$NR$_a$R$_a$, —NR$_a$C(=NH)C$_{1-3}$alkyl, —C(=O)OR$_b$, —NR$_a$C(=O)OR$_b$, carbocyclylyl substituted with 0-5 R$_c$, and heterocyclylyl substituted with 0-5 R$_c$; alternatively, two R$_5$ groups are taken together to form carbocyclyl or heterocyclyl;

R$_6$, at each occurrence, is independently selected from the group consisting of F, Cl, Br, and C$_{1-4}$alkyl;

R$_a$, at each occurrence, is independently selected from the group consisting of H, C$_{1-6}$ alkyl substituted with 0-5 R$_c$, C$_{2-6}$ alkenyl substituted with 0-5 R$_c$, C$_{2-6}$ alkynyl substituted with 0-5 R$_c$, —(CH$_2$)$_r$—C$_{3-10}$carbocyclyl substituted with 0-5 R$_c$, and —(CH$_2$)$_r$-heterocyclyl substituted with 0-5 R$_c$; or R$_a$ and R$_a$ together with the nitrogen atom to which they are both attached form a heterocyclic ring substituted with 0-5 $R_c$;

$R_b$, at each occurrence, is independently selected from the group consisting of H, $C_{1-6}$ alkyl substituted with 0-5 $R_c$, $C_{2-6}$ alkenyl substituted with 0-5 $R_c$, $C_{2-6}$ alkynyl substituted with 0-5 $R_c$, —$(CH_2)_r$—$C_{3-10}$carbocyclyl substituted with 0-5 $R_c$, and —$(CH_2)_r$-heterocyclyl substituted with 0-5 $R_c$;

$R_c$, at each occurrence, is independently selected from the group consisting of F, Cl, Br, CN, =O, OH, $OC_{1-4}$ alkyl, $CO_2H$, $C_{1-6}$ alkyl substituted with 0-5 $R_d$, —$(CH_2)_r$—$C_{3-6}$ cycloalkyl substituted with 0-5 $R_d$, —$(CH_2)_r$-aryl substituted with 0-5 $R_d$, —$(CH_2)_r$-heterocyclyl substituted with 0-5 $R_d$;

$R_d$, at each occurrence, is independently selected from the group consisting of F, Cl, Br, CN, OH, $C_{1-5}$ alkyl, $C_{2-5}$ alkenyl, $C_{2-5}$ alkynyl, $C_{3-6}$ cycloalkyl, and phenyl;

p, at each occurrence, is an integer selected from zero, 1, and 2; and r, at each occurrence, is an integer selected from zero, 1, 2, 3, and 4.

In a second aspect, the present invention provides a compound of Formula (II):

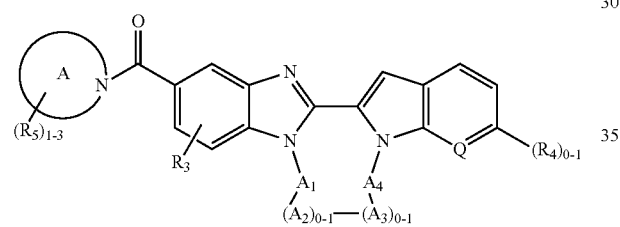

or a pharmaceutically acceptable salt thereof, within the scope of the first aspect, wherein:

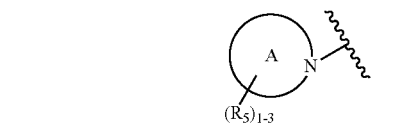

is selected from the group consisting of

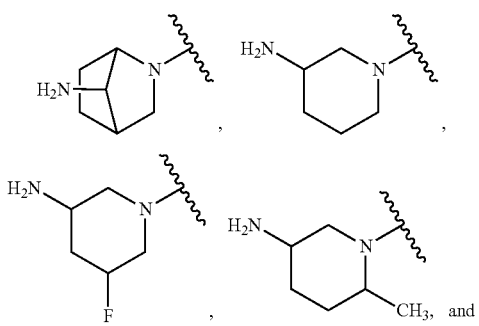

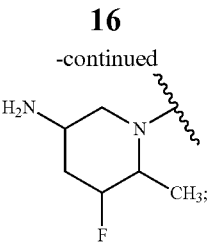

$A_1$ is $C_{1-4}$ alkyl substituted with 0-2 $R_1$; optionally, one or more of the methylene units of said $C_{1-4}$ alkylene are replaced by NH, N($C_{1-4}$ alkyl), and C(=O);

$A_2$ is selected from the group consisting of $C_6$ aryl and 4- to 6-membered heterocyclyl comprising carbon atoms and 1-4 heteroatoms selected from N, O, and S(O)$_p$, each substituted with 0-2 $R_2$;

$A_3$ is selected from the group consisting of $C_{3-6}$ cycloalkyl, $C_6$ aryl, and 4- to 6-membered heterocyclyl comprising carbon atoms and 1-4 heteroatoms selected from N, O, and S(O)$_p$, each substituted with 0-2 $R_2$;

$A_4$ is selected from the group consisting of $C_{3-7}$ alkylene and $C_{3-7}$ alkenylene, each substituted with 0-5 $R_1$; optionally, one to three of the methylene units of said $C_{3-7}$ alkylene except for the one that is directly bonded to the nitrogen atom of the indole or pyrrolopyridine moiety are replaced by O, S(O)$_p$, NH, N($C_{1-4}$ alkyl), and C(=O);

$R_1$ is selected from the group consisting of F, Cl, and —$OR_a$;

$R_2$ is selected from the group consisting of F, Cl, CN, =O, and C(=O)NR$_a$R$_a$;

$R_3$ is selected from the group consisting of F, Cl, Br, and —$OC_{1-4}$ alkyl;

$R_4$ is selected from the group consisting of F, Cl, $C_{1-5}$ alkyl, $C_{1-5}$ haloalkyl and $C_{1-5}$ hydroxyalkyl;

$R_a$, at each occurrence, is independently selected from the group consisting of H and $C_{1-5}$ alkyl; and $R_b$, at each occurrence, is independently selected from the group consisting of H and $C_{1-5}$ alkyl.

In a third aspect, the present invention provides a compound of formula (III):

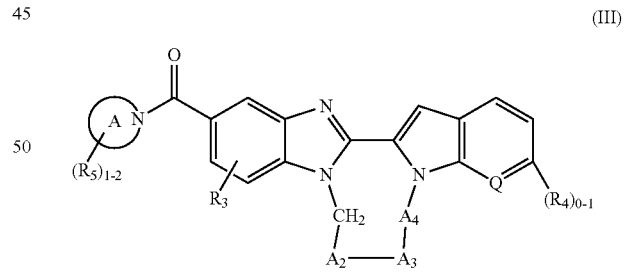

or a pharmaceutically acceptable salt thereof, within the scope of the second aspect, wherein:

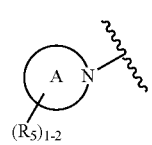

is selected from the group consisting of

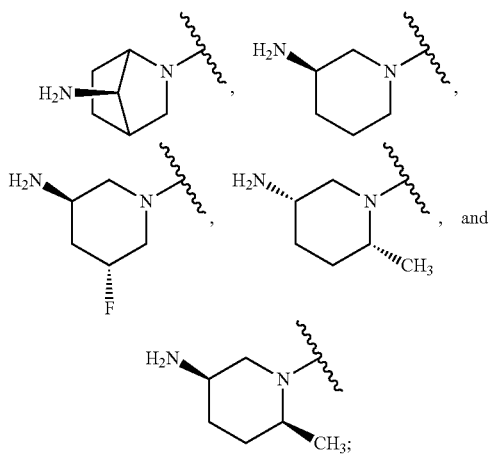

$A_2$ is selected from the group consisting of $C_6$ aryl and 4- to 6-membered heterocyclyl comprising carbon atoms and 1-4 heteroatoms selected from N, O, and $S(O)_p$, each substituted with 0-2 $R_2$;
$A_3$ is selected from the group consisting of $C_{3-6}$ cycloalkyl, $C_6$ aryl, and 4- to 6-membered heterocyclyl comprising carbon atoms and 1-4 heteroatoms selected from N, O, and $S(O)_p$, each substituted with 0-2 $R_2$;
$A_4$ is selected from the group consisting of $C_{3-7}$ alkylene and $C_{3-7}$ alkenylene, each substituted with 0-5 $R_1$; optionally, one to two of the methylene units of said $C_{3-7}$ alkylene except for the one that is directly bonded to the nitrogen atom of the indole or pyrrolopyridine moiety are replaced by O, $S(O)_p$, NH, and $N(C_{1-4}$ alkyl);
$R_1$ is selected from the group consisting of F, Cl, and —$OR_b$;
$R_2$ is selected from the group consisting of F, Cl, CN, =O, and $C(=O)NR_aR_a$;
$R_3$ is selected from the group consisting of F, Cl, Br, and —$OC_{1-4}$ alkyl;
$R_4$ is selected from the group consisting of F, $C_{1-4}$ alkyl, $C_{1-4}$ haloalkyl and $C_{1-4}$ hydroxyalkyl;
$R_a$, at each occurrence, is independently selected from the group consisting of H and $C_{1-5}$ alkyl; and
$R_b$, at each occurrence, is independently selected from the group consisting of H and $C_{1-5}$ alkyl.

In a fourth aspect, the present invention provides a compound of formula (IV):

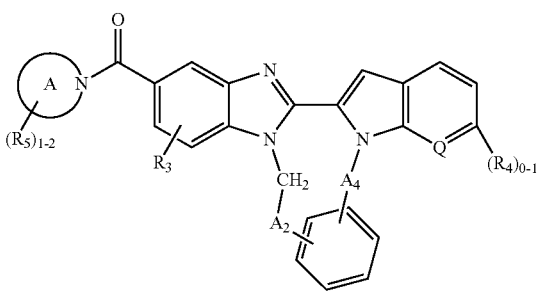

(IV)

or a pharmaceutically acceptable salt thereof, within the scope of the third aspect, wherein:

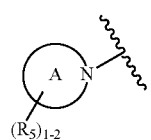

is selected from the group consisting of

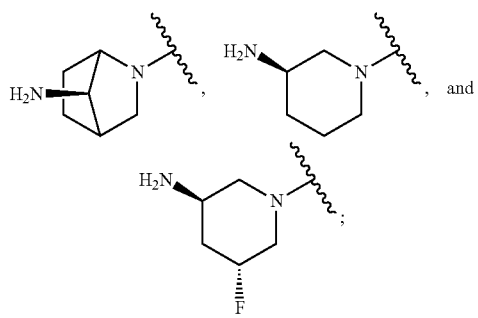

$A_2$ is selected from the group consisting of $C_6$ aryl and 5- to 6-membered heterocyclyl comprising carbon atoms and 1-4 heteroatoms selected from N, O, and $S(O)_p$, each substituted with 0-2 $R_2$;
$A_4$ is selected from the group consisting of $C_{3-7}$ alkylene and $C_{3-7}$ alkenylene, each substituted with 0-5 $R_1$; optionally, one or more of the methylene units of said $C_{3-7}$ alkylene are replaced by 0, NH, and $N(C_{1-4}$ alkyl);
$R_1$ is selected from the group consisting of F and —$OR_b$;
$R_2$ is selected from the group consisting of F, CN, =O, and $C(=O)NR_aR_a$; and
$R_4$ is selected from the group consisting of $C_{1-3}$ alkyl, $C_{1-3}$ haloalkyl and $C_{1-3}$ hydroxyalkyl.

In a fifth aspect, the present invention provides a compound of Formula (V):

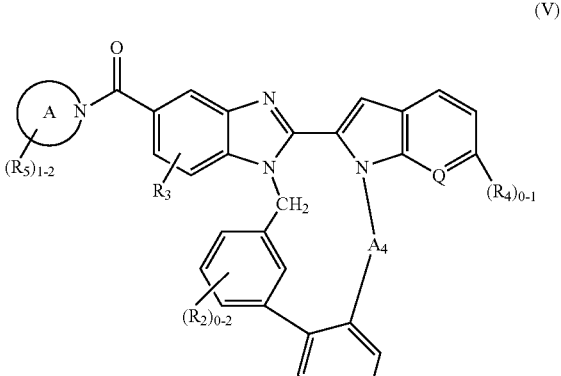

(V)

or a pharmaceutically acceptable salt thereof, within the scope of the fourth aspect, wherein:
$A_4$ is selected from the group consisting of $C_{3-7}$ alkylene and $C_{3-7}$ alkenylene, each substituted with 0-5 $R_1$; optionally, one or more of the methylene units of said $C_{3-7}$ alkylene except for the one that is directly bonded to the nitrogen atom of the indole or pyrrolopyridine moiety are replaced by O and NH;

R$_1$ is selected from the group consisting of F and —OH;

R$_2$ is selected from the group consisting of F, CN, and C(=O)NH$_2$; and

R$_4$ is selected from the group consisting of C$_{1-4}$ haloalkyl and C$_{1-4}$ hydroxyalkyl.

In a sixth aspect, the present invention provides a compound or a pharmaceutically acceptable salt thereof, within the scope of the fifth aspect, wherein: A$_4$ is selected from the group consisting of C$_{3-7}$ alkylene, —OC$_{4-7}$ alkylene, and C$_{3-7}$ alkenylene.

In a seventh aspect, the present invention provides a compound of Formula (VI):

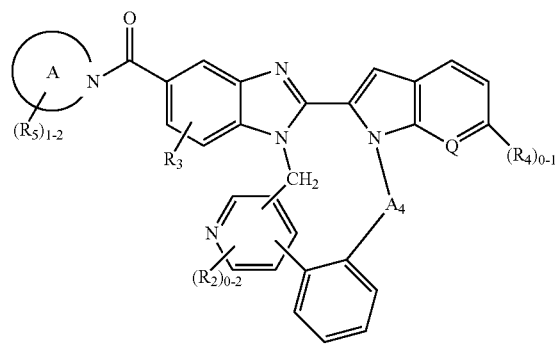

(VI)

or a pharmaceutically acceptable salt thereof, within the scope of the fourth aspect, wherein:

A$_4$ is selected from the group consisting of C$_{3-7}$ alkylene, —OC$_{4-7}$ alkylene, and C$_{3-7}$ alkenylene each substituted with 0-5 R$_1$;

R$_1$ is selected from the group consisting of —OR$_b$ and C$_{1-3}$ alkyl;

R$_2$ is selected from the group consisting of F and CN;

R$_3$ is —OC$_{1-4}$ alkyl;

R$_4$ is selected from the group consisting of C$_{1-3}$ haloalkyl and C$_{1-3}$ hydroxyalkyl; and R$_b$, at each occurrence, is independently selected from the group consisting of H and C$_{1-3}$ alkyl.

In an eighth aspect, the present invention provides a compound or a pharmaceutically acceptable salt thereof, within the scope of the seventh aspect, wherein:

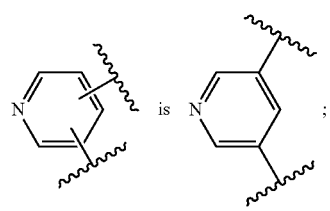

A$_4$ is C$_{3-5}$ alkylene; and

R$_3$ is —OCH$_3$.

In a ninth aspect, the present invention provides a compound of Formula (VII):

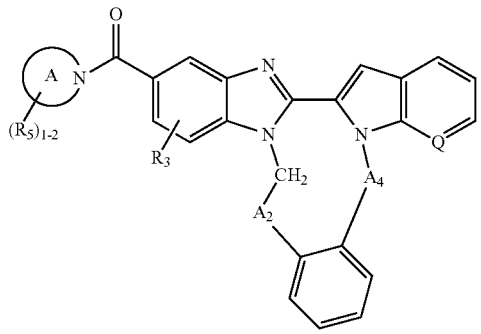

(VII)

or a pharmaceutically acceptable salt thereof, within the scope of the fourth aspect, wherein:

A$_2$ is selected from the group consisting of

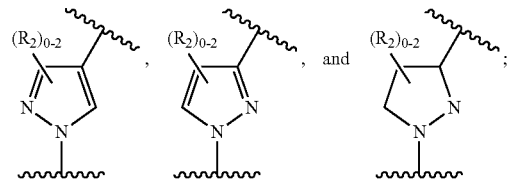

A$_4$ is selected from the group consisting of C$_{3-6}$ alkylene, —OC$_{3-6}$ alkylene, and C$_{3-6}$ alkenylene, each substituted with 0-5 R$_1$; and R$_2$ is selected from the group consisting of F and =O.

In a tenth aspect, the present invention provides a compound of formula (VIII):

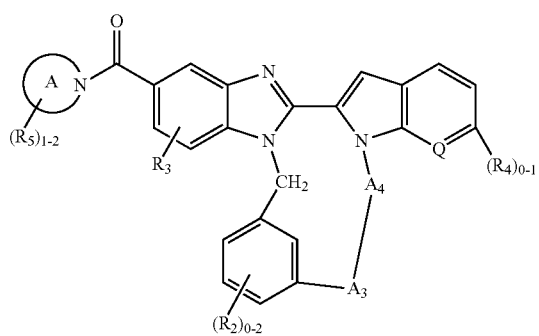

(VIII)

or a pharmaceutically acceptable salt thereof, within the scope of the third aspect, wherein:

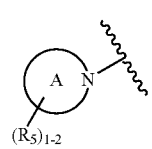

is selected from the group consisting of

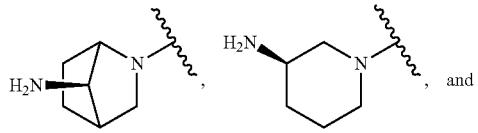

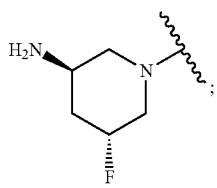

$A_3$ is selected from the group consisting of $C_{3-6}$ cycloalkyl and 4- to 6-membered heterocyclyl comprising carbon atoms and 1-4 heteroatoms selected from N, O, and $S(O)_p$, each substituted with 0-2 $R_2$;

$A_4$ is selected from the group consisting of $C_{3-7}$ alkylene and $C_{3-7}$ alkenylene, each substituted with 0-5 $R_1$; optionally, one to two of the methylene units of said $C_{3-7}$ alkylene are replaced by O, $S(O)_p$, NH, and N($C_{1-4}$ alkyl);

$R_1$ is selected from the group consisting of F and —$OR_b$;

$R_2$ is selected from the group consisting of F, Cl, and CN;

$R_3$ is selected from the group consisting of F, Cl, and —$OC_{1-4}$ alkyl;

$R_4$ is selected from the group consisting of $C_{1-4}$ alkyl, $C_{1-4}$ haloalkyl and $C_{1-4}$ hydroxyalkyl;

$R_a$, at each occurrence, is independently selected from the group consisting of H and $C_{1-4}$ alkyl; and $R_b$, at each occurrence, is independently selected from the group consisting of H and $C_{1-4}$ alkyl.

In an eleventh aspect, the present invention provides a compound or a pharmaceutically acceptable salt thereof, within the scope of the tenth aspect, wherein:

$A_3$ is selected from the group consisting of cyclopropyl substituted with 0-2 $R_2$ and

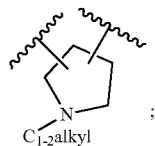

$A_4$ is selected from the group consisting of $C_{3-7}$ alkylene, —$OC_{4-7}$ alkylene, and $C_{3-7}$ alkenylene, each substituted with 0-5 $R_1$;

$R_2$ is selected from the group consisting of F and Cl; and $R_3$ is —$OCH_3$.

In a twelfth aspect, the present invention provides a compound of Formula (IX):

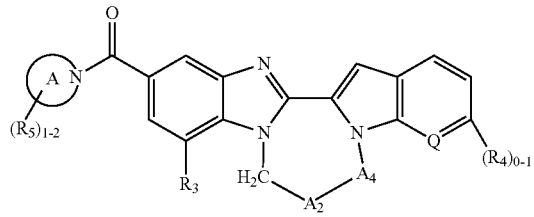

or a pharmaceutically acceptable salt thereof, within the scope of the second aspect, wherein:

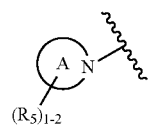

is selected from the group consisting of

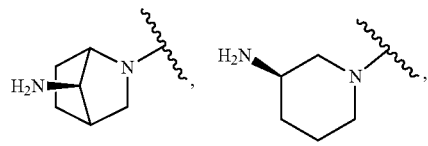

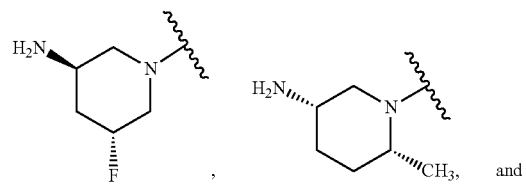

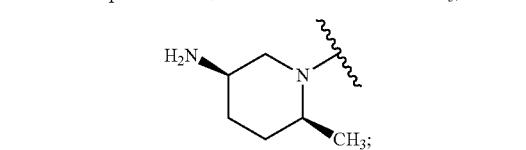

$A_2$ is selected from the group consisting of $C_6$ aryl and 4- to 6-membered heterocyclyl comprising carbon atoms and 1-2 heteroatoms selected from N, each substituted with 0-2 $R_2$;

$A_4$ is selected from the group consisting of $C_{3-7}$ alkylene and $C_{3-7}$ alkenylene, each substituted with 0-3 $R_1$; optionally one to three of the methylene units of said $C_{3-7}$ alkylene except for the one that is directly bonded to the nitrogen atom of the indole or pyrrolopyridine moiety are replaced by O and C(=O);

$R_1$ is selected from the group consisting of F, Cl, and —OH;

$R_2$ is selected from the group consisting of F, Cl, and CN; and $R_3$ is selected from the group consisting of F, Cl, and —$OC_{1-4}$ alkyl.

In a thirteenth aspect, the present invention provides a compound of Formula (X):

(X)

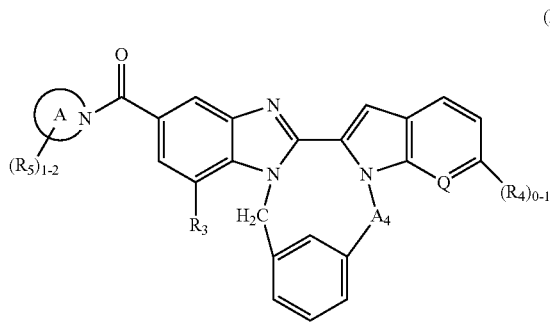

or a pharmaceutically acceptable salt thereof, within the scope of the twelfth aspect, wherein:

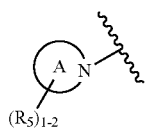

is selected from the group consisting of

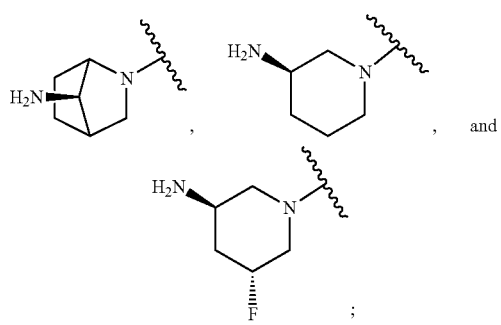

$A_4$ is selected from the group consisting of $C_{3-7}$ alkylene substituted with 0-3 $R_1$, —$OC_{4-7}$ alkylene, and $C_{3-7}$ alkenylene;
$R_1$ is selected from the group consisting of F and —OH; and
$R_3$ is —$OC_{1-4}$ alkyl.

In a fourteenth aspect, the present invention provides a compound or a pharmaceutically acceptable salt thereof, within the scope of the twelves aspect, wherein:
$A_2$ is

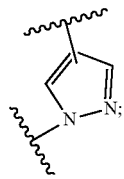

$A_4$ is selected from the group consisting of $C_{4-7}$ alkylene and $C_{4-7}$ alkenylene; and
$R_3$ is —$OCH_3$.

In a fifteenth aspect, the present invention provides a compound of Formula (XI):

(XI)

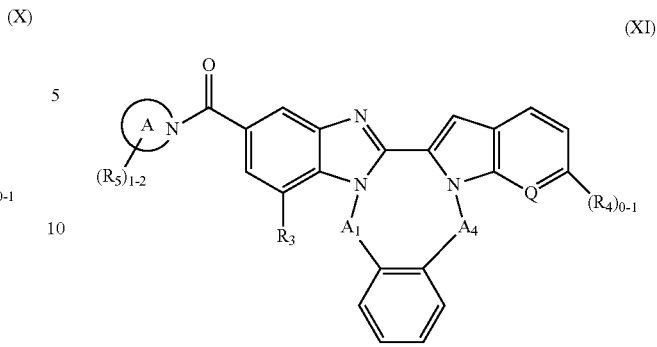

or a pharmaceutically acceptable salt thereof, within the scope of the twelfth aspect, wherein:

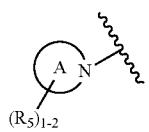

is selected from the group consisting of

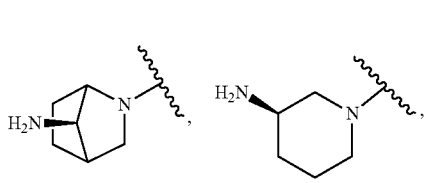

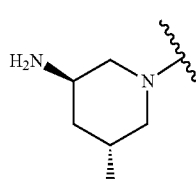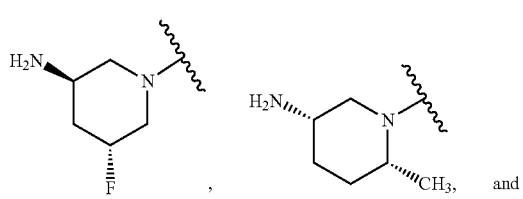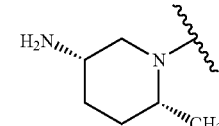, and

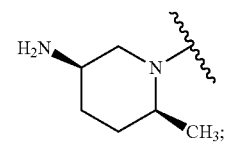

$A_1$ is $C_{1-3}$ alkylene and one to two of the methylene units of said $C_{1-3}$ alkylene are replaced by NH, N($C_{1-4}$ alkyl), and C(=O);
$A_4$ is selected from the group consisting of $C_{3-7}$ alkylene, —$OC_{4-7}$ alkylene, and $C_{3-7}$ alkenylene; and
$R_3$ is selected from the group consisting of F, Cl, and —$OC_{1-4}$ alkyl.

In a sixteenth aspect, the present invention provides a compound of Formula (XII):

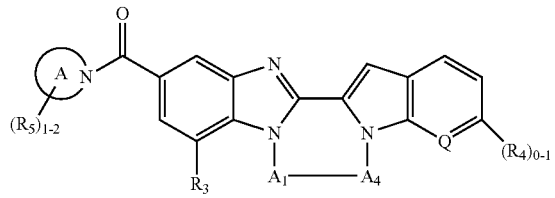

or a pharmaceutically acceptable salt thereof, within the scope of the second aspect, wherein:

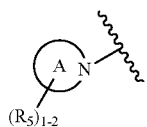

is selected from the group consisting of

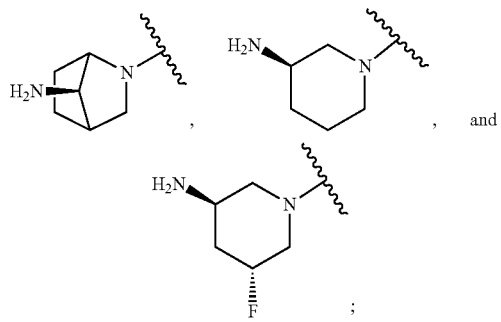

$A_1$ is $C_{1-2}$ alkylene;

$A_4$ is $C_{3-7}$ alkylene wherein the first two methylene units of said $C_{3-7}$ alkylene are replaced by $S(=O)_2$—NH or $S(=O)_2$—N($C_{1-3}$ alkyl); and $R_3$ is —$OC_{1-4}$ alkyl.

In a seventeenth aspect, the present invention provides a compound of Formula (XIII):

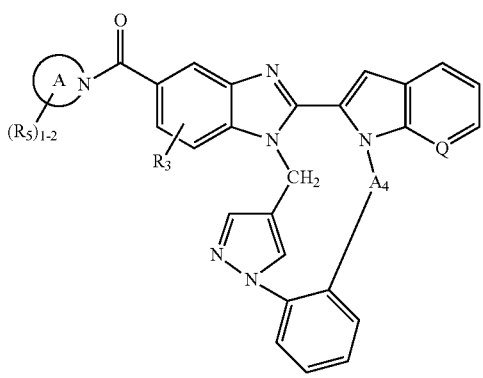

or a pharmaceutically acceptable salt thereof, wherein:

Q is selected from the group consisting of N and CH;

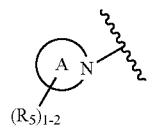

is selected from the group consisting of

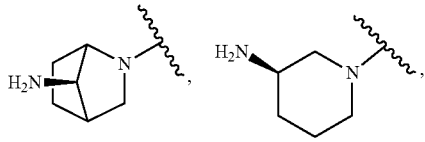

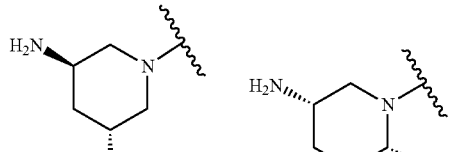

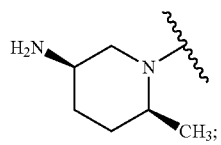

$A_4$ is selected from the group consisting of $C_{3-6}$ alkylene, —$OC_{3-6}$ alkylene, and $C_{3-6}$ alkenylene, each substituted with 0-5 $R_1$;

$R_1$ is selected from the group consisting of F and —OH; and $R_3$ is —$OC_{1-4}$ alkyl.

In an eighteenth aspect, the present invention provides a compound of Formula (XIV):

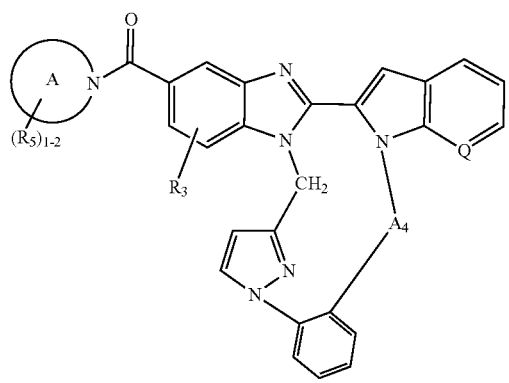

or a pharmaceutically acceptable salt thereof, within the scope of the fourth aspect, wherein:

Q is selected from the group consisting of N and CH;

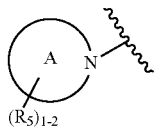

is selected from the group consisting of

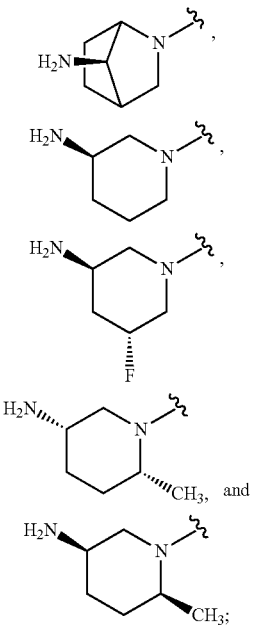

A$_4$ is selected from the group consisting of C$_{3-6}$ alkylene, —OC$_{3-6}$ alkylene, and C$_{3-6}$ alkenylene, each substituted with 0-5 R$_1$;

R$_1$ is selected from the group consisting of F and —OH; and

R$_3$ is —OC$_{1-4}$ alkyl.

In a nineteenth aspect, the present invention provides a compound of Formula (XV):

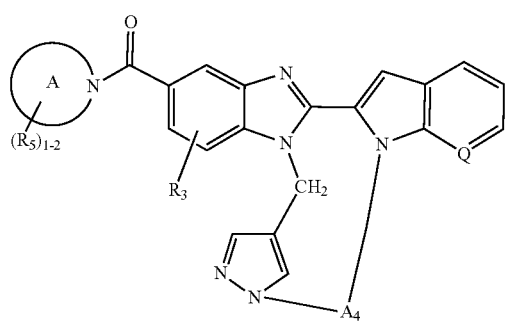

(XV)

or a pharmaceutically acceptable salt thereof, within the scope of the fourth aspect, wherein:

Q is selected from the group consisting of N and CH;

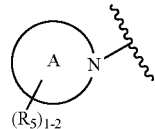

is selected from the group consisting of

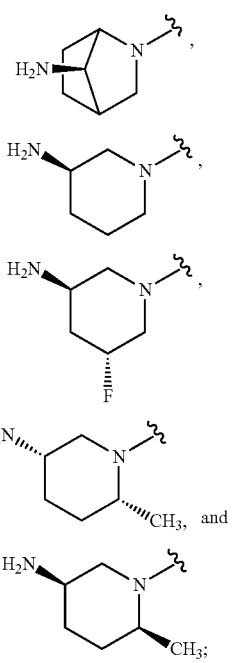

A$_4$ is selected from the group consisting of C$_{3-7}$ alkylene and C$_{3-7}$ alkenylene, each substituted with 0-5 R$_1$;

R$_1$ is selected from the group consisting of F and —OH; and

R$_3$ is —OC$_{1-4}$ alkyl.

In a twentieth aspect, the present invention provides a compound of Formula (XVI):

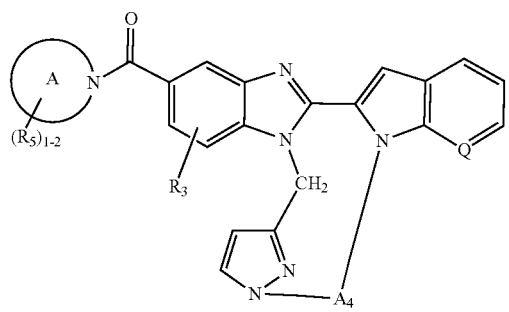

(XVI)

or a pharmaceutically acceptable salt thereof, within the scope of the fourth aspect, wherein:

Q is selected from the group consisting of N and CH;

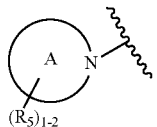

is selected from the group consisting of

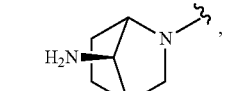

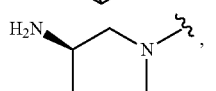

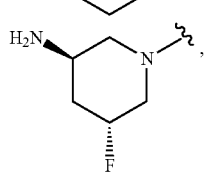

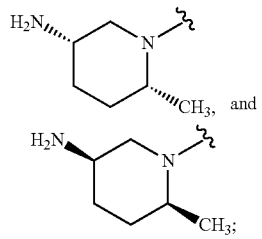

$A_4$ is selected from the group consisting of $C_{3-7}$ alkylene and $C_{3-7}$ alkenylene, each substituted with 0-5 $R_1$;

$R_1$ is selected from the group consisting of F and —OH; and $R_3$ is —OC$_{1-4}$ alkyl.

In a twenty first aspect, the present invention provides a compound or a pharmaceutically acceptable salt thereof, within the scope of the twelfth aspect, wherein:

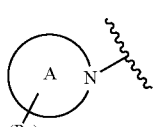

is selected from the group consisting of

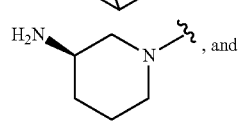

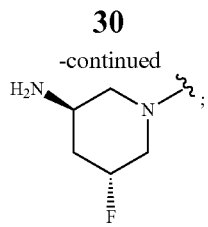

$A_2$ is

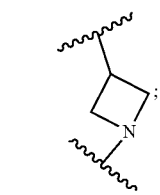 [SMILES: *C1CN(*)C1]

$A_4$ is —C(=O)—C$_{5-6}$ alkylene; and
$R_3$ is —OCH$_3$.

In a twenty second aspect, the present invention provides a compound or a pharmaceutically acceptable salt thereof, within the scope of the seventeenth aspect, wherein:

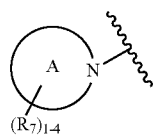

is selected from

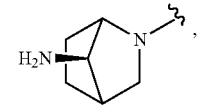

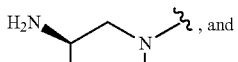

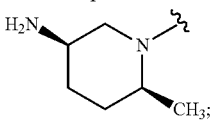

$R_2$ is —CH$_2$-cyclopropyl;
$R_3$ is —OCH$_3$; and
$R_4$ is selected from

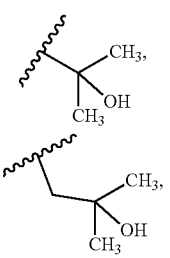

-continued

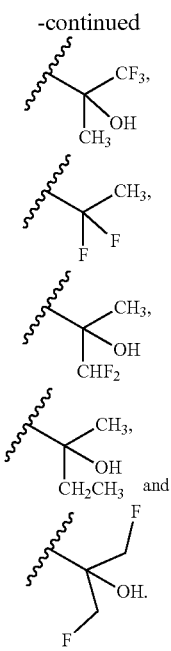

In one embodiment, the present invention provides compounds with $IC_{50}$ values≤4.000 μM, using the RFMS PAD4 functional assay disclosed herein, preferably, $IC_{50}$ values≤1.000 μM, preferably, $IC_{50}$ values≤0.500 μM, preferably, $IC_{50}$ values≤0.100 μM, more preferably, $IC_{50}$ values≤0.050 μM, more preferably, $IC_{50}$ values≤0.03 μM, more preferably, $IC_{50}$ values≤0.02 μM, even more preferably, $IC_{50}$ values≤0.01 μM.

As defined above and described herein, Q is N or CH. In some embodiments, Q is N. In some embodiments, Q is CH.

As defined above and described herein, $A_1$ is $C_{1-4}$ alkylene optionally substituted with 1-2 $R_1$. For example, in some embodiments, $A_1$ is $—CH_2—$. In some embodiments, $A_1$ is $—CH_2CH_2—$. In some embodiments, $A_1$ is $—CH_2CH_2CH_2—$. Optionally, one or more of the methylene units of said $C_{1-4}$ alkylene of $A_1$ are replaced by O, $S(O)_p$, NH, $N(C_{1-4}$ alkyl), and $C(=O)$. For example, in some embodiments, $A_1$ is $—C(=O)NHCH_2CH_2CH_2—$. In certain embodiments, $A_1$ is selected from those functional groups depicted in the examples below.

As defined above and described herein, $A_2$ is selected from $C_{3-6}$ carbocyclyl and 4- to 6-membered heterocyclyl comprising carbon atoms and 1-4 heteroatoms selected from N, O, and $S(O)_p$, substituted with 0-4 $R_2$. In some embodiments, $A_2$ is $C_6$ aryl substituted with 0-2 $R_2$. In some embodiments, $A_2$ is 4- to 6-membered heterocyclyl comprising carbon atoms and 1-3 heteroatoms selected from N and O. In some embodiments, $A_2$ is pyridyl. In some embodiments, $A_2$ is 5-membered heteroaryl comprising carbon atoms and 1-2 N atoms. In some embodiments, $A_2$ is pyrazole wherein one of its nitrogen atoms is attached to $A_3$. In certain embodiments, $A_2$ is selected from those functional groups depicted in the examples below.

As defined above and described herein, $A_3$ is selected from $C_{3-6}$ carbocyclyl and 4- to 6-membered heterocyclyl comprising carbon atoms and 1-4 heteroatoms selected from N, O, and $S(O)_p$, substituted with 0-4 $R_2$. In some embodiments, $A_3$ is $C_6$ aryl substituted with 0-2 $R_2$. In some embodiments, $A_3$ is $C_{3-6}$ cycloalkyl substituted with 0-2 $R_2$. In some embodiments, $A_3$ is 4- to 6-membered heterocyclyl comprising carbon atoms and 1-3 heteroatoms selected from N and O. In some embodiments, $A_3$ is cyclopropyl substituted with 2 F. In some embodiments, $A_3$ is 5-membered heterocyclyl comprising carbon atoms and 1-2 N atoms. In certain embodiments, $A_3$ is selected from those functional groups depicted in the examples below.

As defined above and described herein, $A_4$ is $C_{3-8}$ alkylene. In some embodiments, $A_4$ is $—CH_2CH_2CH_2—$. In some embodiments, $A_4$ is $—CH_2CH_2CH_2CH_2—$. In some embodiments, $A_4$ is $—CH_2CH_2CH_2CH_2CH_2—$. In some embodiments, $A_4$ is $—CH_2CH_2CH_2CH_2CH_2CH_2—$. In some embodiments, $A_4$ is $—CH_2CH_2CH_2CH_2CH_2CH_2CH_2—$. In some embodiments, $A_4$ is $C_{3-8}$ alkenylene. For example, in some embodiments, $A_4$ is $—CH_2=CH_2CH_2CH_2—$. In some embodiments, $A_4$ is $—CH_2=CH_2CH_2CH_2CH_2—$. In some embodiments, $A_4$ is $—CH_2=CH_2CH_2CH_2CH_2CH_2—$.

In some embodiments, $A_4$ is $C_{3-8}$ alkylene and $C_{3-8}$ alkenylene, each substituted with 1-5 $R_1$. For example, in some embodiments, $A_4$ is $—CH_2(OH)CH_2(OH)CH_2CH_2CH_2—$. In some embodiments, $A_4$ is $—CH_2(OH)CH_2(OH)CH_2CH_2—$. Optionally, one or more of the methylene units of said $C_{3-8}$ alkylene of $A_4$ except for the one that is directly bonded to the nitrogen atom of the indole or pyrrolopyridine moiety are replaced by O, $S(O)_p$, NH, $N(C_{1-4}$ alkyl), and $C(=O)$. In some embodiments, $A_4$ is $—OCH_2CH_2CH_2—$. In some embodiments, $A_4$ is $—OCH_2CH_2CH_2CH_2—$. In some embodiments, $A_4$ is $—OCH_2CH_2CH_2CH_2CH_2—$. In certain embodiments, $A_4$ is selected from those functional groups depicted in the examples below.

As defined above and described herein, $R_1$ is selected from halogen $—OR_b$, and $C_{1-3}$ alkyl; In some embodiments, $R_1$ is F. In some embodiments, $R_1$ is Cl. In some embodiments, $R_1$ is OH. In certain embodiments, $R_1$ is selected from those functional groups depicted in the examples below.

As defined above and described herein, $R_2$ is selected from F, Cl, CN, $=O$, $C(=O)NR_aR_a$, and $C_{1-3}$ alkyl. In some embodiments, $R_2$ is F. In some embodiments, $R_2$ is Cl. In some embodiments, $R_2$ is CN. In some embodiments, $R_2$ is $=O$. In some embodiments, $R_2$ is $C(=O)NH_2$. In certain embodiments, $R_2$ is selected from those functional groups depicted in the examples below.

As defined above and described herein, $R_3$ is selected from F, Cl, Br, $—OR_b$, and $C_{1-3}$ alkyl. In some embodiments, $R_3$ is F, Cl, or Br. In some embodiments, $R_3$ is $—OC_{1-4}$ alkyl. In some embodiments, $R^3$ is $—OCH_3$. In some embodiments, $R_3$ is $—OCH_2CH_3$. In certain embodiments, $R_3$ is selected from those functional groups depicted in the examples below.

As defined above and described herein, $R_4$ is selected from F, Cl, Br, $C_{1-6}$ alkyl substituted with 0-5 $R_c$. In certain embodiments, $R_4$ is $C_{1-5}$ alkyl substituted with 1-4 F, Cl, Br, and OH.

In some embodiments, $R_4$ is selected from

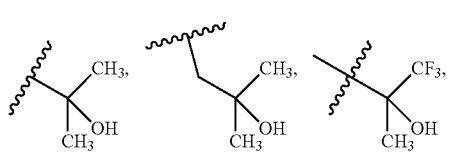

-continued

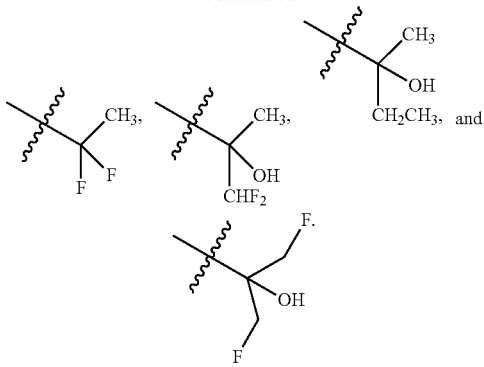

In some embodiment $R_4$ is absent.

As defined above and described herein, $R_5$ is selected from F, Cl, CN, $C_{1-3}$ alkyl, =N—$OR_b$, —$(CH_2)_rOR_b$, —OC(=O)$NR_aR_a$, —$(CH_2)_rNR_aR_a$, —$NR_aC$(=NH)$C_{1-3}$ alkyl, —C(=O)$OR_b$, —$NR_aC$(=O)$OR_b$, carbocyclylyl substituted with 0-5 $R_c$, and heterocyclylyl substituted with 0-5 $R_c$. Alternatively, two $R_5$ groups are taken together to form carbocyclyl or heterocyclyl;

As defined above and described herein, $R_6$ is F, Cl, Br, and $C_{1-4}$alkyl. In some embodiments, $R_6$ is absent.

As defined above and described herein, ring A and $R_5$, i.e.

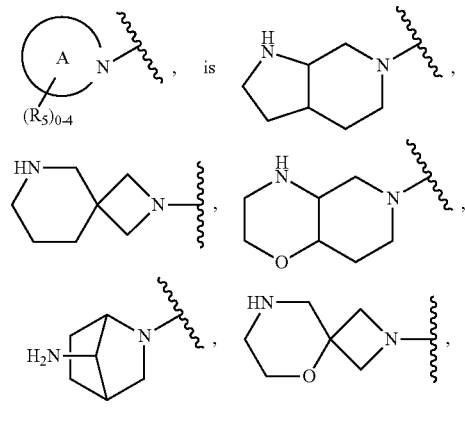

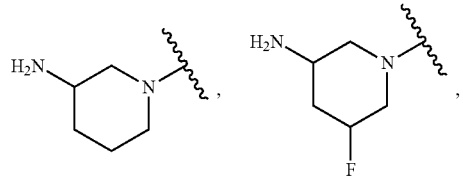

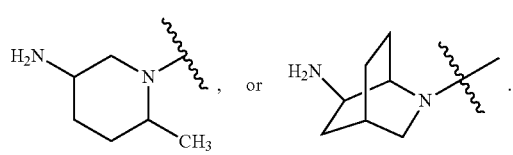

In some embodiments,

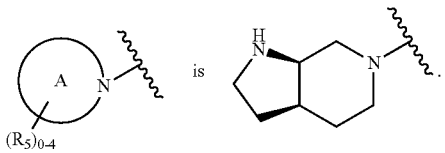

In some embodiments,

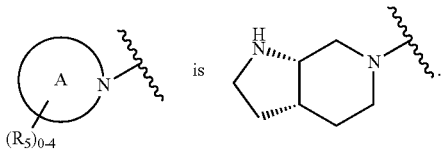

In some embodiments

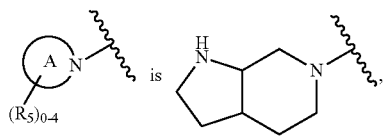

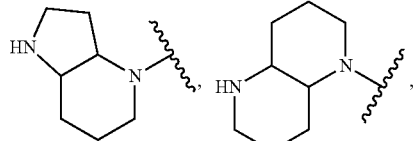

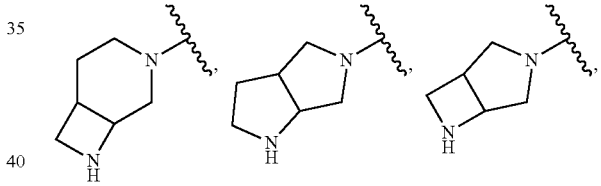

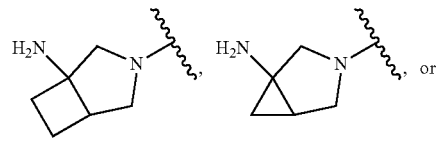

In some embodiments,

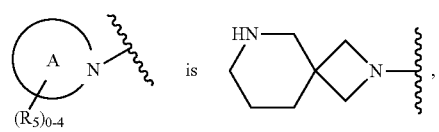

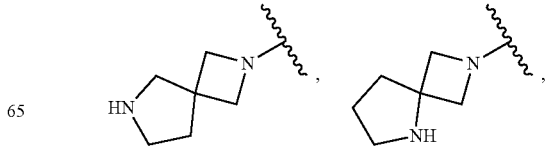

In some embodiments,

In some embodiments,

-continued
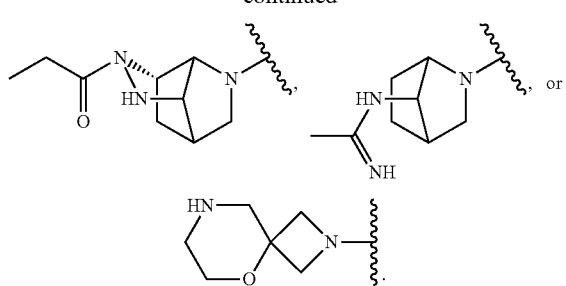
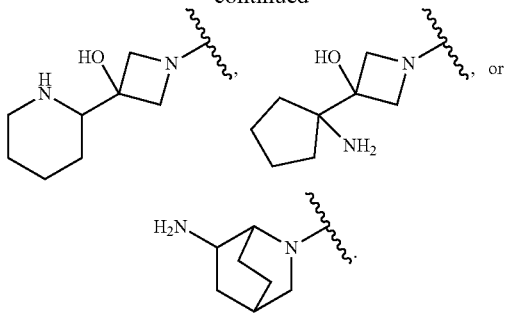
In some embodiments,
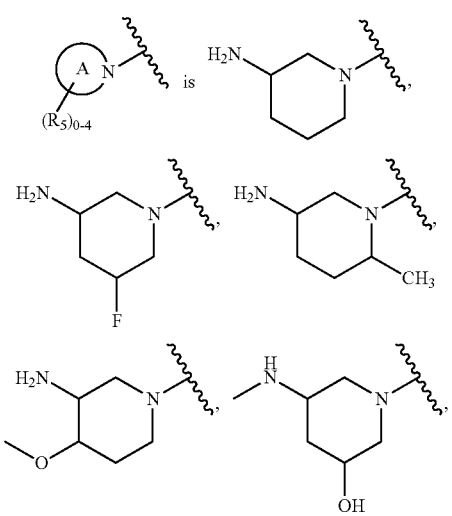
In some embodiments,
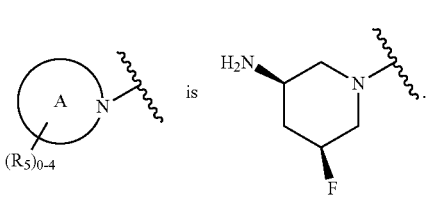
In some embodiments,
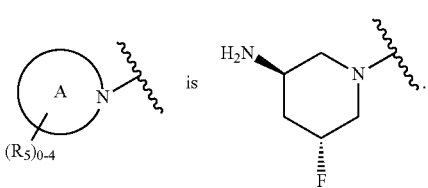
In some embodiments,
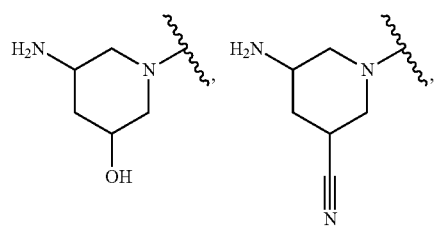
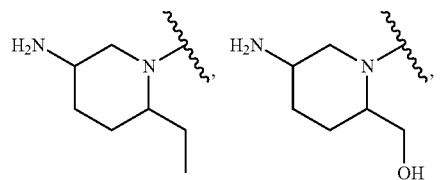
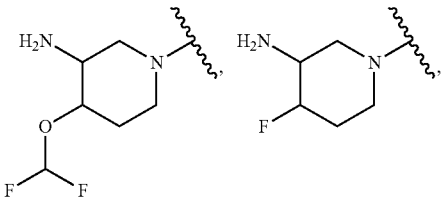
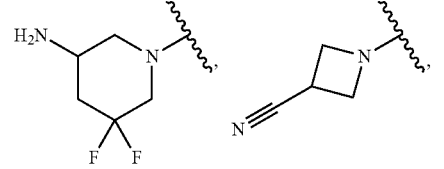
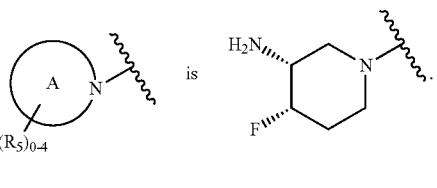
In some embodiments,
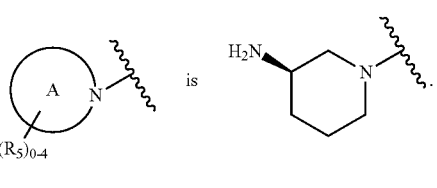

In some embodiments, 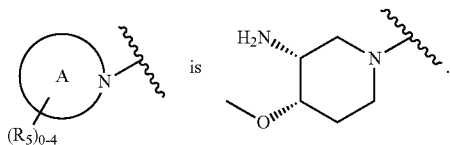 is 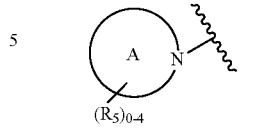.
In some embodiments, 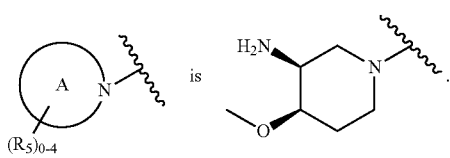 is 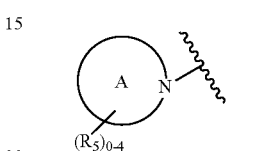.
In some embodiments, 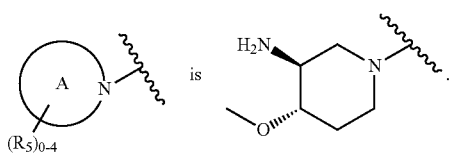 is 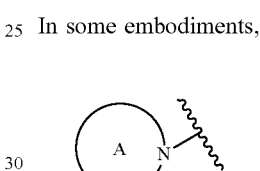.
In some embodiments, 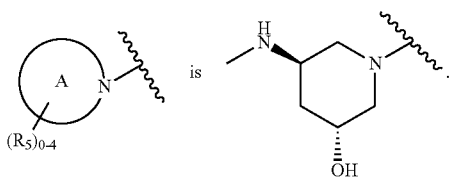 is 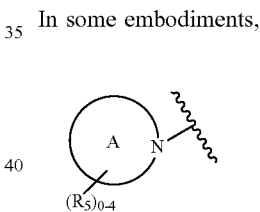.
In some embodiments, 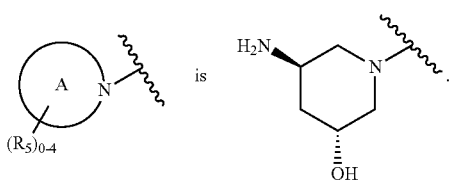 is 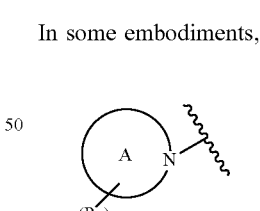.
In some embodiments, 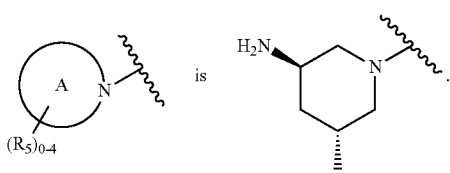 is 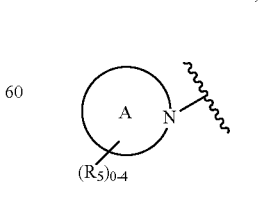.
In some embodiments, 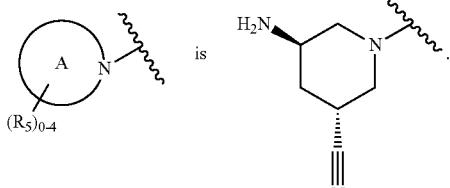 is 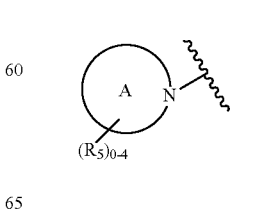.

In some embodiments 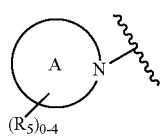 is 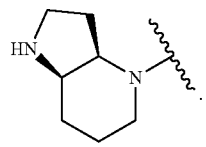.
In some embodiments, 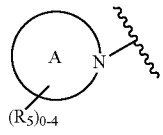 is 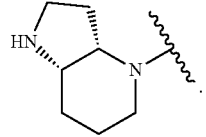.
In some embodiments, 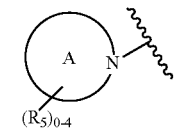 is 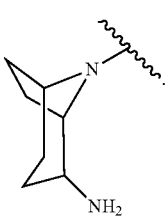.
In some embodiments, 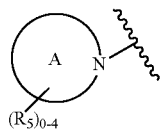 is 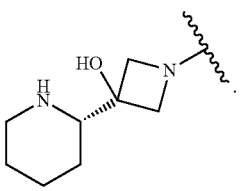.
In some embodiments, 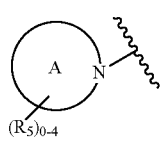 is 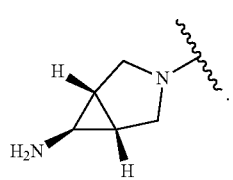.
In some embodiments, 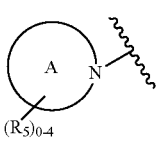 is 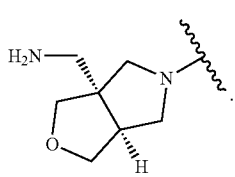.
In some embodiments, 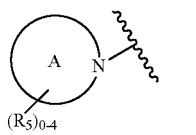 is 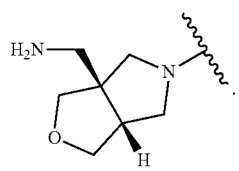.
In some embodiments, 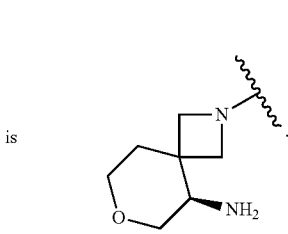.
In some embodiments, 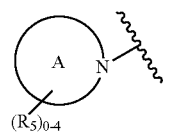 is 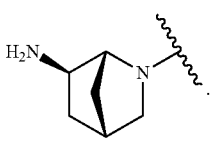.
In some embodiments, 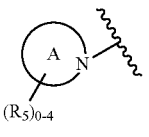 is 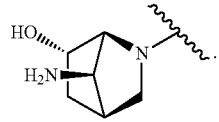.
In some embodiments, 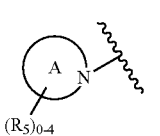 is 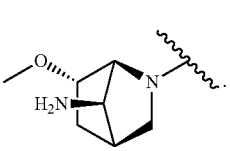.
In some embodiments, 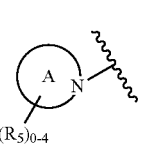 is .

In some embodiments, 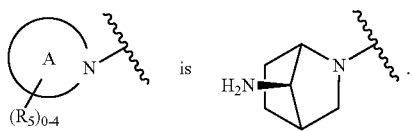 is 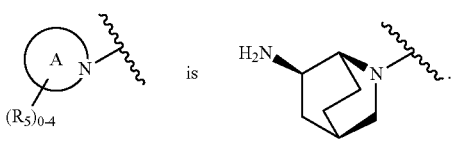
In some embodiments, 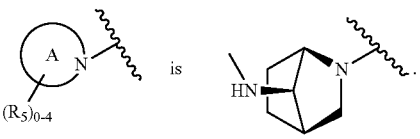 is 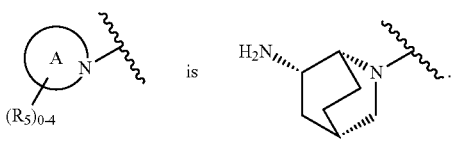
In some embodiments, 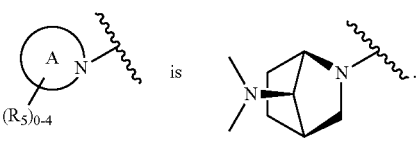 is 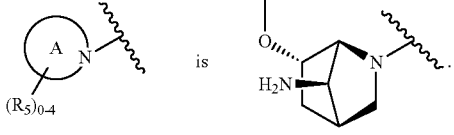
In some embodiments, 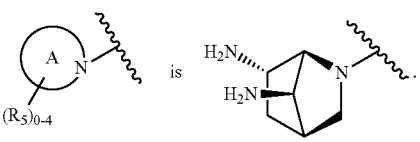 is 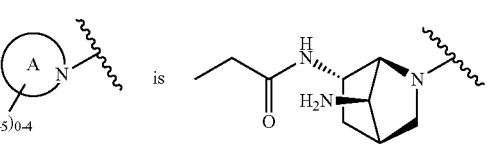
In some embodiments, 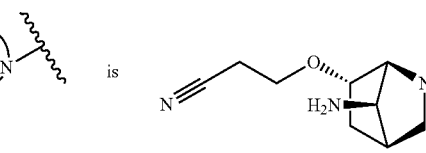 is 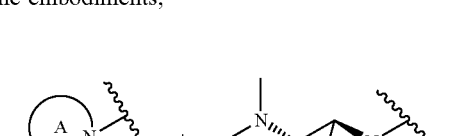
In some embodiments, 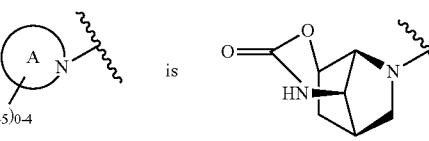 is 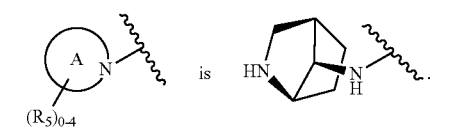
In some embodiments, 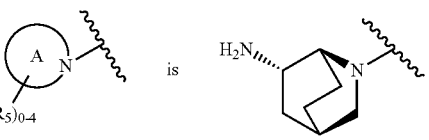 is In some embodiments, 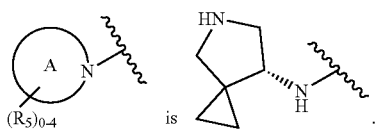
In some embodiments, 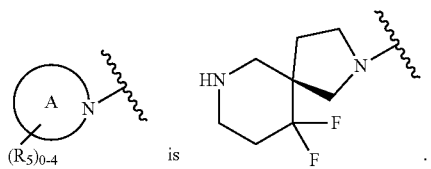
In some embodiments, 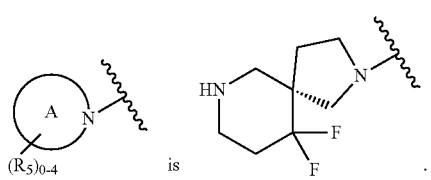
In some embodiments, 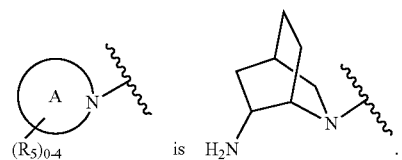
In some embodiments, 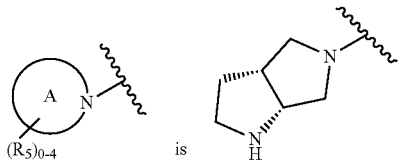
In some embodiments, 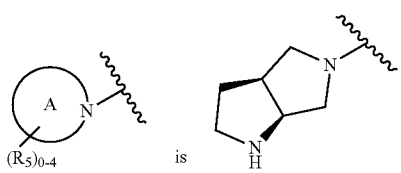
In some embodiments, 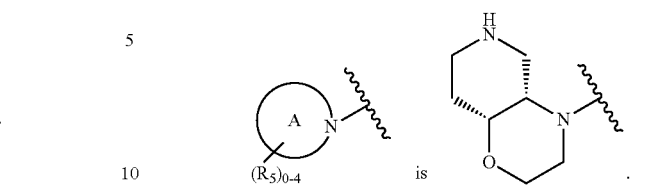
In some embodiments, 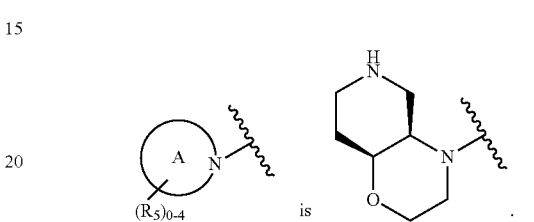
In some embodiments, 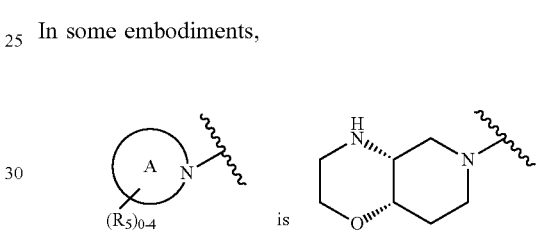
In some embodiments, 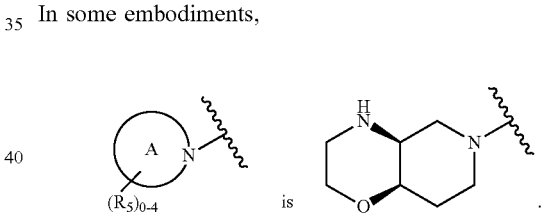
In some embodiments, 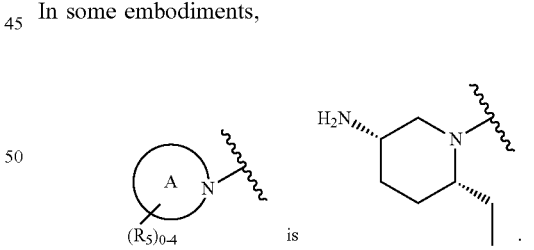
In some embodiments, 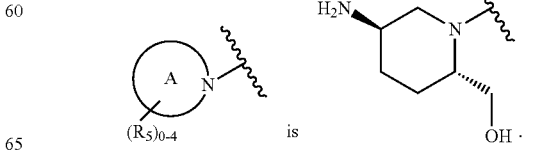

In some embodiments,

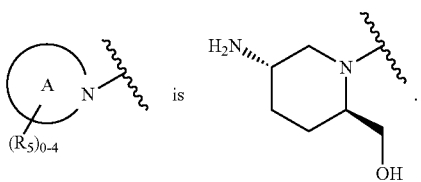

In some embodiments,

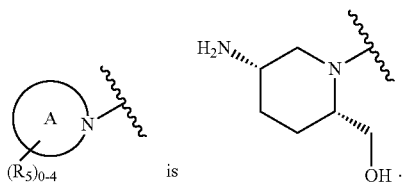

In some embodiments,

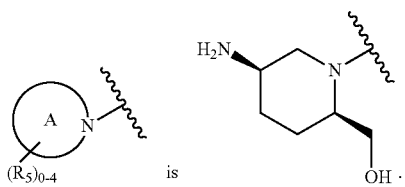

In some embodiments,

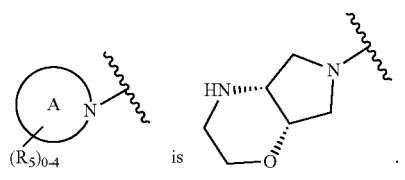

In some embodiments,

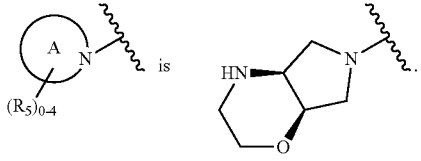

As defined above and described herein, r is an integer of 0-4. In some embodiments, r is 0. In some embodiments, r is 1. In some embodiments, r is 2. In some embodiments, r is 3. In some embodiments, r is 4.

In some embodiments, the compound of formula (I) is selected from examples depicted below. In certain embodiments, the present invention provides any compound described above and herein, or a pharmaceutically acceptable salt thereof or a composition for use in therapy. In some embodiments, the present invention provides any compound described above and herein in isolated form. In some embodiments, the present invention provides the compounds according to any one of claims 1-16.

4. Pharmaceutically Acceptable Compositions

According to another embodiment, the invention provides a composition comprising a compound of this invention or a pharmaceutically acceptable derivative thereof and a pharmaceutically acceptable carrier, adjuvant, or vehicle. The amount of compound in compositions of this invention is such that is effective to measurably inhibit PAD4, in a biological sample or in a patient. In certain embodiments, the amount of compound in compositions of this invention is such that is effective to measurably inhibit PAD4, in a biological sample or in a patient. In certain embodiments, a composition of this invention is formulated for administration to a patient in need of such composition. In some embodiments, a composition of this invention is formulated for oral administration to a patient. The term "subject," as used herein, is used interchangeably with the term "patient" and means an animal, preferably a mammal. In some embodiments, a subject or patient is a human. In other embodiments, a subject (or patient) is a veterinary subject (or patient). In some embodiments, a veterinary subject (or patient) is a canine, a feline, or an equine subject.

The term "pharmaceutically acceptable carrier, adjuvant, or vehicle" refers to a non-toxic carrier, adjuvant, or vehicle that does not destroy the pharmacological activity of the compound with which it is formulated. Pharmaceutically acceptable carriers, adjuvants or vehicles that may be used in the compositions of this invention include, but are not limited to, ion exchangers, alumina, aluminum stearate, lecithin, serum proteins, such as human serum albumin, buffer substances such as phosphates, glycine, sorbic acid, potassium sorbate, partial glyceride mixtures of saturated vegetable fatty acids, water, salts or electrolytes, such as protamine sulfate, disodium hydrogen phosphate, potassium hydrogen phosphate, sodium chloride, zinc salts, colloidal silica, magnesium trisilicate, polyvinyl pyrrolidone, cellulose-based substances, polyethylene glycol, sodium carboxymethylcellulose, polyacrylates, waxes, polyethylene-polyoxypropylene-block polymers, polyethylene glycol and wool fat.

Compositions of the present invention may be administered orally, parenterally, by inhalation spray, topically, rectally, nasally, buccally, vaginally or via an implanted reservoir. The term "parenteral" as used herein includes subcutaneous, intravenous, intramuscular, intra-articular, intra-synovial, intrasternal, intrathecal, intrahepatic, intralesional and intracranial injection or infusion techniques. Preferably, the compositions are administered orally, intraperitoneally or intravenously. Sterile injectable forms of the compositions of this invention may be aqueous or oleaginous suspension. These suspensions may be formulated according to techniques known in the art using suitable dispersing or wetting agents and suspending agents. The sterile injectable preparation may also be a sterile injectable solution or suspension in a non-toxic parenterally acceptable diluent or solvent, for example as a solution in 1,3-butanediol. Among the acceptable vehicles and solvents that may be employed are water, Ringer's solution and isotonic sodium chloride solution. In addition, sterile, fixed oils are conventionally employed as a solvent or suspending medium.

For this purpose, any bland fixed oil may be employed including synthetic mono- or di-glycerides. Fatty acids, such as oleic acid and its glyceride derivatives are useful in the preparation of injectables, as are natural pharmaceutically-acceptable oils, such as olive oil or castor oil, especially in their polyoxyethylated versions. These oil solutions or suspensions may also contain a long-chain alcohol diluent or dispersant, such as carboxymethyl cellulose or similar dispersing agents that are commonly used in the formulation of pharmaceutically acceptable dosage forms including emulsions and suspensions. Other commonly used surfactants, such as Tweens, Spans and other emulsifying agents or bioavailability enhancers which are commonly used in the manufacture of pharmaceutically acceptable solid, liquid, or other dosage forms may also be used for the purposes of formulation.

Pharmaceutically acceptable compositions of this invention may be orally administered in any orally acceptable dosage form including, but not limited to, capsules, tablets, aqueous suspensions or solutions. In the case of tablets for oral use, carriers commonly used include lactose and corn starch. Lubricating agents, such as magnesium stearate, are also typically added. For oral administration in a capsule form, useful diluents include lactose and dried cornstarch. When aqueous suspensions are required for oral use, the active ingredient is combined with emulsifying and suspending agents. If desired, certain sweetening, flavoring or coloring agents may also be added.

Alternatively, pharmaceutically acceptable compositions of this invention may be administered in the form of suppositories for rectal administration. These can be prepared by mixing the agent with a suitable non-irritating excipient that is solid at room temperature but liquid at rectal temperature and therefore will melt in the rectum to release the drug. Such materials include cocoa butter, beeswax and polyethylene glycols.

Pharmaceutically acceptable compositions of this invention may also be administered topically, especially when the target of treatment includes areas or organs readily accessible by topical application, including diseases of the eye, the skin, or the lower intestinal tract. Suitable topical formulations are readily prepared for each of these areas or organs.

Topical application for the lower intestinal tract can be effected in a rectal suppository formulation (see above) or in a suitable enema formulation. Topically-transdermal patches may also be used.

For topical applications, provided pharmaceutically acceptable compositions may be formulated in a suitable ointment containing the active component suspended or dissolved in one or more carriers. Carriers for topical administration of compounds of this invention include, but are not limited to, mineral oil, liquid petrolatum, white petrolatum, propylene glycol, polyoxyethylene, polyoxypropylene compound, emulsifying wax and water. Alternatively, provided pharmaceutically acceptable compositions can be formulated in a suitable lotion or cream containing the active components suspended or dissolved in one or more pharmaceutically acceptable carriers. Suitable carriers include, but are not limited to, mineral oil, sorbitan monostearate, polysorbate 60, cetyl esters wax, cetearyl alcohol, 2-octyldodecanol, benzyl alcohol and water.

For ophthalmic use, provided pharmaceutically acceptable compositions may be formulated as micronized suspensions in isotonic, pH adjusted sterile saline, or, preferably, as solutions in isotonic, pH adjusted sterile saline, either with or without a preservative such as benzylalkonium chloride. Alternatively, for ophthalmic uses, the pharmaceutically acceptable compositions may be formulated in an ointment such as petrolatum.

Pharmaceutically acceptable compositions of this invention may also be administered by nasal aerosol or inhalation. Such compositions are prepared according to techniques well-known in the art of pharmaceutical formulation and may be prepared as solutions in saline, employing benzyl alcohol or other suitable preservatives, absorption promoters to enhance bioavailability, fluorocarbons, and/or other conventional solubilizing or dispersing agents.

Most preferably, pharmaceutically acceptable compositions of this invention are formulated for oral administration. Such formulations may be administered with or without food. In some embodiments, pharmaceutically acceptable compositions of this invention are administered without food. In other embodiments, pharmaceutically acceptable compositions of this invention are administered with food.

Pharmaceutically acceptable compositions of this invention can be administered to humans and other animals orally, rectally, parenterally, intracisternally, intravaginally, intraperitoneally, topically (as by powders, ointments, or drops), bucally, as an oral or nasal spray, or the like, depending on the severity of the infection being treated. In certain embodiments, the compounds of the invention may be administered orally or parenterally at dosage levels of about 0.01 mg/kg to about 50 mg/kg and preferably from about 1 mg/kg to about 25 mg/kg, of subject body weight per day, one or more times a day, to obtain the desired therapeutic effect.

Liquid dosage forms for oral administration include, but are not limited to, pharmaceutically acceptable emulsions, microemulsions, solutions, suspensions, syrups and elixirs. In addition to the active compounds, the liquid dosage forms may contain inert diluents commonly used in the art such as, for example, water or other solvents, solubilizing agents and emulsifiers such as ethyl alcohol, isopropyl alcohol, ethyl carbonate, ethyl acetate, benzyl alcohol, benzyl benzoate, propylene glycol, 1,3-butylene glycol, dimethylformamide, oils (in particular, cottonseed, groundnut, corn, germ, olive, castor, and sesame oils), glycerol, tetrahydrofurfuryl alcohol, polyethylene glycols and fatty acid esters of sorbitan, and mixtures thereof. Besides inert diluents, the oral compositions can also include adjuvants such as wetting agents, emulsifying and suspending agents, sweetening, flavoring, and perfuming agents.

Injectable preparations, for example, sterile injectable aqueous or oleaginous suspensions may be formulated according to the known art using suitable dispersing or wetting agents and suspending agents. The sterile injectable preparation may also be a sterile injectable solution, suspension or emulsion in a nontoxic parenterally acceptable diluent or solvent, for example, as a solution in 1,3-butanediol. Among the acceptable vehicles and solvents that may be employed are water, Ringer's solution, U.S.P. and isotonic sodium chloride solution. In addition, sterile, fixed oils are conventionally employed as a solvent or suspending medium. For this purpose any bland fixed oil can be employed including synthetic mono- or diglycerides. In addition, fatty acids such as oleic acid are used in the preparation of injectables.

Injectable formulations can be sterilized, for example, by filtration through a bacterial-retaining filter, or by incorporating sterilizing agents in the form of sterile solid compositions which can be dissolved or dispersed in sterile water or other sterile injectable medium prior to use.

In order to prolong the effect of a compound of the present invention, it is often desirable to slow the absorption of the compound from subcutaneous or intramuscular injection. This may be accomplished by the use of a liquid suspension of crystalline or amorphous material with poor water solubility. The rate of absorption of the compound then depends upon its rate of dissolution that, in turn, may depend upon crystal size and crystalline form. Alternatively, delayed absorption of a parenterally administered compound form is accomplished by dissolving or suspending the compound in an oil vehicle. Injectable depot forms are made by forming microencapsule matrices of the compound in biodegradable polymers such as polylactide-polyglycolide. Depending upon the ratio of compound to polymer and the nature of the particular polymer employed, the rate of compound release can be controlled. Examples of other biodegradable polymers include poly(orthoesters) and poly(anhydrides). Depot injectable formulations are also prepared by entrapping the compound in liposomes or microemulsions that are compatible with body tissues.

Compositions for rectal or vaginal administration are preferably suppositories which can be prepared by mixing the compounds of this invention with suitable non-irritating excipients or carriers such as cocoa butter, polyethylene glycol or a suppository wax which are solid at ambient temperature but liquid at body temperature and therefore melt in the rectum or vaginal cavity and release the active compound.

Solid dosage forms for oral administration include capsules, tablets, pills, powders, and granules. In such solid dosage forms, the active compound is mixed with at least one inert, pharmaceutically acceptable excipient or carrier such as sodium citrate or dicalcium phosphate and/or a) fillers or extenders such as starches, lactose, sucrose, glucose, mannitol, and silicic acid, b) binders such as, for example, carboxymethylcellulose, alginates, gelatin, polyvinylpyrrolidinone, sucrose, and acacia, c) humectants such as glycerol, d) disintegrating agents such as agar-agar, calcium carbonate, potato or tapioca starch, alginic acid, certain silicates, and sodium carbonate, e) solution retarding agents such as paraffin, f) absorption accelerators such as quaternary ammonium compounds, g) wetting agents such as, for example, cetyl alcohol and glycerol monostearate, h) absorbents such as kaolin and bentonite clay, and i) lubricants such as talc, calcium stearate, magnesium stearate, solid polyethylene glycols, sodium lauryl sulfate, and mixtures thereof. In the case of capsules, tablets and pills, the dosage form may also comprise buffering agents.

Solid compositions of a similar type may also be employed as fillers in soft and hard-filled gelatin capsules using such excipients as lactose or milk sugar as well as high molecular weight polyethylene glycols and the like. The solid dosage forms of tablets, dragees, capsules, pills, and granules can be prepared with coatings and shells such as enteric coatings and other coatings well known in the pharmaceutical formulating art. They may optionally contain opacifying agents and can also be of a composition that they release the active ingredient(s) only, or preferentially, in a certain part of the intestinal tract, optionally, in a delayed manner. Examples of embedding compositions that can be used include polymeric substances and waxes. Solid compositions of a similar type may also be employed as fillers in soft and hard-filled gelatin capsules using such excipients as lactose or milk sugar as well as high molecular weight polethylene glycols and the like.

The active compounds can also be in micro-encapsulated form with one or more excipients as noted above. The solid dosage forms of tablets, dragees, capsules, pills, and granules can be prepared with coatings and shells such as enteric coatings, release controlling coatings and other coatings well known in the pharmaceutical formulating art. In such solid dosage forms the active compound may be admixed with at least one inert diluent such as sucrose, lactose or starch. Such dosage forms may also comprise, as is normal practice, additional substances other than inert diluents, e.g., tableting lubricants and other tableting aids such a magnesium stearate and microcrystalline cellulose. In the case of capsules, tablets and pills, the dosage forms may also comprise buffering agents. They may optionally contain opacifying agents and can also be of a composition that they release the active ingredient(s) only, or preferentially, in a certain part of the intestinal tract, optionally, in a delayed manner. Examples of embedding compositions that can be used include polymeric substances and waxes.

Dosage forms for topical or transdermal administration of a compound of this invention include ointments, pastes, creams, lotions, gels, powders, solutions, sprays, inhalants or patches. The active component is admixed under sterile conditions with a pharmaceutically acceptable carrier and any needed preservatives or buffers as may be required. Ophthalmic formulation, ear drops, and eye drops are also contemplated as being within the scope of this invention. Additionally, the present invention contemplates the use of transdermal patches, which have the added advantage of providing controlled delivery of a compound to the body. Such dosage forms can be made by dissolving or dispensing the compound in the proper medium. Absorption enhancers can also be used to increase the flux of the compound across the skin. The rate can be controlled by either providing a rate controlling membrane or by dispersing the compound in a polymer matrix or gel.

The amount of compounds of the present invention that may be combined with the carrier materials to produce a composition in a single dosage form will vary depending upon the host treated, the particular mode of administration. Preferably, provided compositions should be formulated so that a dosage of between 0.01-100 mg/kg body weight/day of the inhibitor can be administered to a patient receiving these compositions.

A compound of the current invention can be administered alone or in combination with one or more other therapeutic compounds, possible combination therapy taking the form of fixed combinations or the administration of a compound of the invention and one or more other therapeutic compounds being staggered or given independently of one another, or the combined administration of fixed combinations and one or more other therapeutic compounds. Exemplary of such other therapeutic agents include corticosteroids, rolipram, calphostin, cytokine-suppressive anti-inflammatory drugs (CSAIDs), Interleukin-10, glucocorticoids, salicylates, nitric oxide, and other immunosuppressants; nuclear translocation inhibitors, such as deoxyspergualin (DSG); non-steroidal antiinflammatory drugs (NSAIDs) such as ibuprofen, celecoxib and rofecoxib; steroids such as prednisone or dexamethasone; antiviral agents such as abacavir; antiproliferative agents such as methotrexate, leflunomide, FK506 (tacrolimus, Prograf); cytotoxic drugs such as azathiprine and cyclophosphamide; TNF-α inhibitors such as tenidap, anti-TNF antibodies or soluble TNF receptor, and rapamycin (sirolimus or Rapamune) or derivatives thereof. A compound of the current invention can besides or in addition be administered especially for tumor therapy in combination with chemotherapy, radiotherapy, immunotherapy, phototherapy, surgical intervention, or a combination of these. Long-term therapy is equally possible as is adjuvant therapy in the context of other treatment strategies, as described above. Other possible treatments are therapy to maintain the patient's status after tumor regression, or even chemopreventive therapy, for example in patients at risk.

Those additional agents may be administered separately from an inventive compound-containing composition, as part of a multiple dosage regimen. Alternatively, those agents may be part of a single dosage form, mixed together with a compound of this invention in a single composition. If administered as part of a multiple dosage regime, the two active agents may be submitted simultaneously, sequentially or within a period of time from one another normally within five hours from one another.

As used herein, the term "combination," "combined," and related terms refers to the simultaneous or sequential administration of therapeutic agents in accordance with this invention. For example, a compound of the present invention may be administered with another therapeutic agent simultaneously or sequentially in separate unit dosage forms or together in a single unit dosage form. Accordingly, the present invention provides a single unit dosage form comprising a compound of the current invention, an additional therapeutic agent, and a pharmaceutically acceptable carrier, adjuvant, or vehicle.

The amount of both an inventive compound and additional therapeutic agent (in those compositions which comprise an additional therapeutic agent as described above) that may be combined with the carrier materials to produce a single dosage form will vary depending upon the host treated and the particular mode of administration. Preferably, compositions of this invention should be formulated so that a dosage of between 0.01-100 mg/kg body weight/day of an inventive compound can be administered.

In those compositions which comprise an additional therapeutic agent, that additional therapeutic agent and the compound of this invention may act synergistically. Therefore, the amount of additional therapeutic agent in such compositions will be less than that required in a monotherapy utilizing only that therapeutic agent.

The amount of additional therapeutic agent present in the compositions of this invention will be no more than the amount that would normally be administered in a composition comprising that therapeutic agent as the only active agent. Preferably the amount of additional therapeutic agent in the presently disclosed compositions will range from about 50% to 100% of the amount normally present in a composition comprising that agent as the only therapeutically active agent.

It should also be understood that a specific dosage and treatment regimen for any particular patient will depend upon a variety of factors, including the activity of the specific compound employed, the age, body weight, general health, sex, diet, time of administration, rate of excretion, drug combination, and the judgment of the treating physician and the severity of the particular disease being treated. The amount of a compound of the present invention in the composition will also depend upon the particular compound in the composition.

5. Uses, Formulation and Administration

Compounds and compositions described herein are generally useful for the inhibition of PAD4.

The activity of a compound utilized in this invention as an inhibitor of PAD4, may be assayed in vitro, in vivo or in a cell line. In vitro assays include assays that determine the inhibition of PAD4. Detailed conditions for assaying a compound utilized in this invention as an inhibitor of PAD4 are set forth in the Examples below. In some embodiments, a provided compound inhibits PAD4 selectively as compared to PAD2.

As used herein, the terms "treatment," "treat," and "treating" refer to reversing, alleviating, delaying the onset of, or inhibiting the progress of a disease or disorder, or one or more symptoms thereof, as described herein. In some embodiments, treatment may be administered after one or more symptoms have developed. In other embodiments, treatment may be administered in the absence of symptoms. For example, treatment may be administered to a susceptible individual prior to the onset of symptoms (e.g., in light of a history of symptoms and/or in light of genetic or other susceptibility factors). Treatment may also be continued after symptoms have resolved, for example to prevent or delay their recurrence.

Provided compounds are inhibitors of PAD4 and are therefore useful for treating one or more disorders associated with activity of PAD4. Thus, in certain embodiments, the present invention provides a method for treating a PAD4-mediated disorder comprising the step of administering to a patient in need thereof a compound of the present invention, or pharmaceutically acceptable composition thereof.

In one embodiment, a PAD4-mediated disorder is a disease, condition, or disorder mediated by inappropriate PAD4 activity. In some embodiments, a PAD4-mediated disorder is selected from the group consisting of rheumatoid arthritis, vasculitis, systemic lupus erythematosus, ulcerative colitis, cancer, cystic fibrosis, asthma, cutaneous lupus erythematosus, and psoriasis. In a further embodiment, the disorder mediated by inappropriate PAD4 activity is rheumatoid arthritis. In a further embodiment, the disorder mediated by inappropriate PAD4 activity is systemic lupus. In a further embodiment, the disorder mediated by inappropriate PAD4 activity is vasculitis. In a further embodiment, the disorder mediated by inappropriate PAD4 activity is cutaneous lupus erythematosus. In a further embodiment, the disorder mediated by inappropriate PAD4 activity is psoriasis.

In one embodiment there is provided a method of treatment of rheumatoid arthritis, vasculitis, systemic lupus erythematosus, ulcerative colitis, cancer, cystic fibrosis, asthma, cutaneous lupus erythematosus, or psoriasis, which method comprises administering to a human subject in need thereof, a therapeutically effective amount of a provided compound or a pharmaceutically acceptable salt thereof.

In one embodiment there is provided a method of treatment of rheumatoid arthritis, which method comprises administering to a human subject in need thereof, a therapeutically effective amount of a provided compound, or a pharmaceutically acceptable salt thereof. In one embodiment there is provided a method of treatment of systemic lupus, which method comprises administering to a human subject in need thereof, a therapeutically effective amount of a provided compound, or a pharmaceutically acceptable salt thereof. In one embodiment there is provided a method of treatment of vasculitis, which method comprises administering to a human subject in need thereof, a therapeutically effective amount of a provided compound, or a pharmaceutically acceptable salt thereof. In one embodiment there is provided a method of treatment of cutaneous lupus erythematosus, which method comprises administering to a human subject in need thereof, a therapeutically effective amount of a provided compound, or a pharmaceutically acceptable salt thereof. In one embodiment there is provided a method of treatment of psoriasis, which method comprises administering to a human subject in need thereof, a therapeutically effective amount of a provided compound, or a pharmaceutically acceptable salt thereof.

In some embodiments, a PAD4-mediated disorder is selected from the group consisting of acid-induced lung injury, acne (PAPA), acute lymphocytic leukemia, acute, respiratory distress syndrome, Addison's disease, adrenal hyperplasia, adrenocortical insufficiency, ageing, AIDS, alcoholic hepatitis, alcoholic hepatitis, alcoholic liver disease, allergen induced asthma, allergic bronchopulmonary, aspergillosis, allergic conjunctivitis, alopecia, Alzheimer's disease, amyloidosis, amyotropic lateral sclerosis, and weight loss, angina pectoris, angioedema, anhidrotic ecodermal dysplasia-ID, ankylosing spondylitis, anterior segment, inflammation, antiphospholipid syndrome, aphthous stomatitis, appendicitis, arthritis, asthma, atherosclerosis, atopic dermatitis, autoimmune diseases, autoimmune hepatitis, bee sting-induced inflammation, Bechet's disease, Bechet's syndrome, Bells Palsey, berylliosis, Blau syndrome, bone pain, bronchiolitis, burns, bursitis, cancer, cardiac hypertrophy, carpal tunnel syndrome, catabolic disorders, cataracts, cerebral aneurysm, chemical irritant-induced inflammation, chorioretinitis, chronic heart failure, chronic lung disease of prematurity, chronic lymphocytic leukemia, chronic obstructive pulmonary disease, colitis, complex regional pain syndrome, connective tissue disease, corneal ulcer, crohn's disease, cryopyrin-associated periodic syndromes, cyrptococcosis, cystic fibrosis, deficiency of the interleukin-1-receptor antagonist (DIRA), dermatitis, dermatitis endotoxemia, dermatomyositis, diffuse intrinsic pontine glioma, endometriosis, endotoxemia, epicondylitis, erythroblastopenia, familial amyloidotic polyneuropathy, familial cold urticarial, familial Mediterranean fever, fetal growth retardation, glaucoma, glomerular disease, glomerular nephritis, gout, gouty arthritis, graft-versus-host disease, gut diseases, head injury, headache, hearing loss, heart disease, hemolytic anemia, Henoch-Scholein purpura, hepatitis, hereditary periodic fever syndrome, herpes zoster and simplex, HIV-1, Hodgkin's disease, Huntington's disease, hyaline membrane disease, hyperammonemia, hypercalcemia, hypercholesterolemia, hyperimmunoglobulinemia D with recurrent fever (HIDS), hypoplastic and other anemias, hypoplastic anemia, idiopathic thrombocytopenic purpura, incontinentia pigmenti, infectious mononucleosis, inflammatory bowel disease, inflammatory lung disease, inflammatory neuropathy, inflammatory pain, insect bite-induced inflammation, iritis, irritant-induced inflammation, ischemia/reperfusion, juvenile rheumatoid arthritis, keratitis, kidney disease, kidney injury caused by parasitic infections, kidney injury caused by parasitic infections, kidney transplant rejection prophylaxis, leptospiriosis, leukemia, Loeffler's syndrome, lung injury, lung injury, lupus, lupus, lupus nephritis, lymphoma, meningitis, mesothelioma, mixed connective tissue disease, Muckle-Wells syndrome (urticaria deafness amyloidosis), multiple sclerosis, muscle wasting, muscular dystrophy, myasthenia gravis, myocarditis, mycosis fungiodes, mycosis fungoides, myelodysplastic syndrome, myositis, nasal sinusitis, necrotizing enterocolitis, neonatal onset multisystem inflammatory disease (NOMID), nephrotic syndrome, neuritis, neuropathological diseases, non-allergen induced asthma, obesity, ocular allergy, optic neuritis, organ transplant, osteoarthritis, otitis media, Paget's disease, pain, pancreatitis, Parkinson's disease, pemphigus, pericarditis, periodic fever, periodontitis, peritoneal endometriosis, pertussis, pharyngitis and adenitis (PFAPA syndrome), plant irritant-induced inflammation, pneumonia, pneumonitis, pneumosysts infection, poison ivy/urushiol oil-induced inflammation, polyarteritis nodosa, polychondritis, polycystic kidney disease, polymyositis, psoriasis, psoriasis, psoriasis, psoriasis, psychosocial stress diseases, pulmonary disease, pulmonary hypertension, pulmonayr fibrosis, pyoderma gangrenosum, pyogenic sterile arthritis, renal disease, retinal disease, rheumatic carditis, rheumatic disease, rheumatoid arthritis, sarcoidosis, seborrhea, sepsis, severe pain, sickle cell, sickle cell anemia, silica-induced disease, Sjogren's syndrome, skin diseases, sleep apnea, solid tumors, spinal cord injury, Stevens-Johnson syndrome, stroke, subarachnoid hemorrhage, sunburn, temporal arteritis, tenosynovitis, thrombocytopenia, thyroiditis, tissue transplant, TNF receptor associated periodic syndrome (TRAPS), toxoplasmosis, transplant, traumatic brain injury, tuberculosis, type 1 diabetes, type 2 diabetes, ulcerative colitis, urticarial, uveitis, Wegener's granulomatosis, interstitial lung disease, psoriatic arthritis, juvenile idiopathic arthritis, Sjögren's syndrome, antineutrophil cytoplasmic antibody (ANCA)-associated vasculitis, antiphospholipid antibody syndrome, sepsis, deep vein thrombosis, fibrosis, Alzheimer's, scleroderma and CREST syndrome.

In one embodiment, the invention provides a provided compound, or a pharmaceutically acceptable salt thereof, for use in therapy. In another embodiment, the invention provides a provided compound, or a pharmaceutically acceptable salt thereof, for use in the treatment of a disorder mediated by inappropriate PAD4 activity. In another embodiment, the invention provides a provided compound, or a pharmaceutically acceptable salt thereof, for use in the treatment of rheumatoid arthritis, vasculitis, systemic lupus erythematosus, ulcerative colitis, cancer, cystic fibrosis, asthma, cutaneous lupus erythematosus, or psoriasis. In another embodiment, the invention provides a provided compound, or a pharmaceutically acceptable salt thereof, for use in the treatment of rheumatoid arthritis. In another embodiment, the invention provides a provided compound, or a pharmaceutically acceptable salt thereof, for use in the treatment of systemic lupus. In another embodiment, the invention provides a provided compound, or a pharmaceutically acceptable salt thereof, for use in the treatment of vasculitis. In another embodiment, the invention provides a provided compound, or a pharmaceutically acceptable salt thereof, for use in the treatment of cutaneous lupus erythematosus. In another embodiment, the invention provides a provided compound, or a pharmaceutically acceptable salt thereof, for use in the treatment of psoriasis. In another embodiment, the invention provides the use of a provided compound, or a pharmaceutically acceptable salt thereof, in the manufacture of a medicament for use in the treatment of a disorder mediated by inappropriate PAD4 activity. In another embodiment, the invention provides the use of a provided compound, or a pharmaceutically acceptable salt thereof, in the manufacture of a medicament for use in the treatment of rheumatoid arthritis, vasculitis, systemic lupus erythematosus, ulcerative colitis, cancer, cystic fibrosis, asthma, cutaneous lupus erythematosus, or psoriasis. In another embodiment, the invention provides the use of a provided compound, or a pharmaceutically acceptable salt thereof, in the manufacture of a medicament for use in the treatment of rheumatoid arthritis. In another embodiment, the invention provides the use of a provided compound, or a pharmaceutically acceptable salt thereof, in the manufacture of a medicament for use in the treatment of systemic lupus. In another embodiment, the invention provides the use of a provided compound, or a pharmaceutically acceptable salt thereof, in the manufacture of a medicament for use in the treatment of vasculitis. In another embodiment, the invention provides the use of a provided compound, or a pharmaceutically acceptable salt thereof, in the manufacture of a medicament for use in the treatment of cutaneous lupus erythematosus. In another embodiment, the invention provides the use of a provided compound, or a pharmaceutically acceptable salt thereof, in the manufacture of a medicament for use in the treatment of psoriasis. In a further embodiment, the invention provides a pharmaceutical composition for the treatment or prophylaxis of a disorder mediated by inappropriate PAD4 activity comprising a provided compound, or a pharmaceutically acceptable salt thereof. In a further embodiment, the invention provides a pharmaceutical composition for the treatment or prophylaxis of rheumatoid arthritis, vasculitis, systemic lupus erythematosus, ulcerative colitis, cancer, cystic fibrosis, asthma, cutaneous lupus erythematosus, or psoriasis, comprising a provided compound, or a pharmaceutically acceptable salt thereof. In a further embodiment, the invention provides a pharmaceutical composition for the treatment or prophylaxis of rheumatoid arthritis comprising a provided compound, or a pharmaceutically acceptable salt thereof. In a further embodiment, the invention provides a pharmaceutical composition for the treatment or prophylaxis of systemic lupus comprising a provided compound, or a pharmaceutically acceptable salt thereof. In a further embodiment, the invention provides a pharmaceutical composition for the treatment or prophylaxis of vasculitis comprising a provided compound, or a pharmaceutically acceptable salt thereof. In a further embodiment, the invention provides a pharmaceutical composition for the treatment or prophylaxis of cutaneous lupus erythematosus comprising a provided compound, or a pharmaceutically acceptable salt thereof. In a further embodiment, the invention provides a pharmaceutical composition for the treatment or prophylaxis of psoriasis comprising a provided compound, or a pharmaceutically acceptable salt thereof All features of each of the aspects of the invention apply to all other aspects mutatis mutandis.

In order that the invention described herein may be more fully understood, the following examples are set forth. It should be understood that these examples are for illustrative purposes only and are not to be construed as limiting this invention in any manner.

6. Exemplification

As depicted in the Examples below, in certain exemplary embodiments, compounds are prepared according to the following general procedures. It will be appreciated that, although the general methods depict the synthesis of certain compounds of the present invention, the following general methods, and other methods known to one of ordinary skill in the art, can be applied to all compounds and subclasses and species of each of these compounds, as described herein.

Synthetic Schemes

Examples where linker B contains a nucleophilic residue such as an NH in a pyrazole or imidazole, for example, can form macrocycles as shown in the generic chemistry Scheme 1. For those skilled in the art, a similar synthetic route can be designed where the linker between group C and the bicyclic ring can be variable.

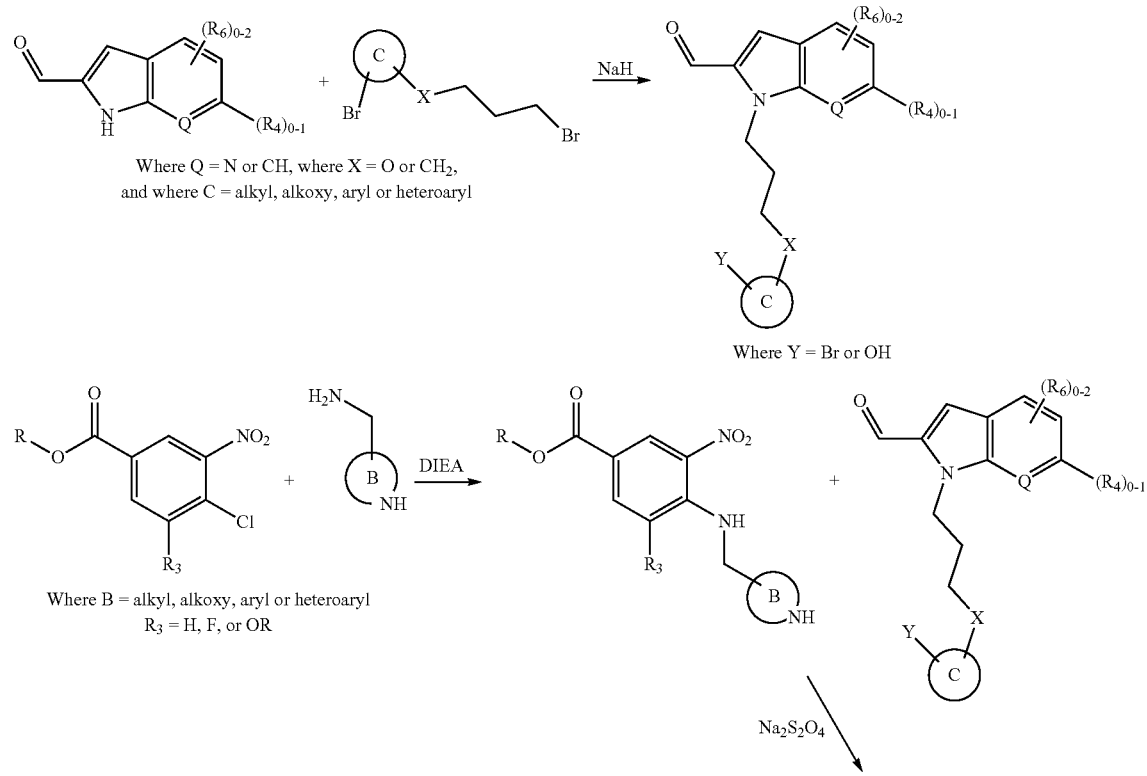

Scheme 1

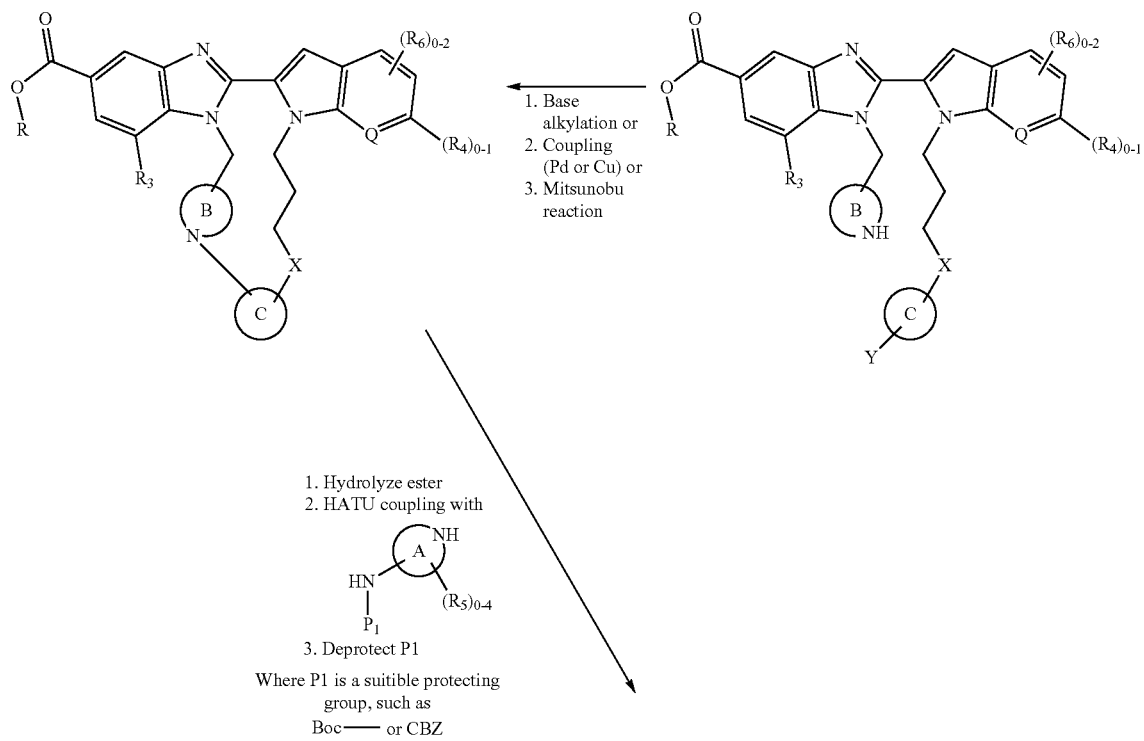
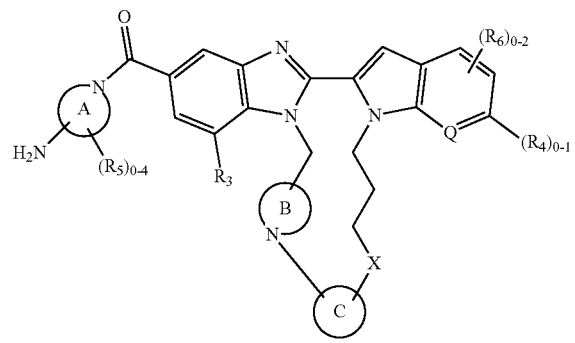

Examples where linkers B and C can be coupled using a Suzuki coupling, followed by final macrocyclization through simultaneous formation of the benzimidazole ring can be prepared as shown in the generic chemistry Scheme 2.
Scheme 2
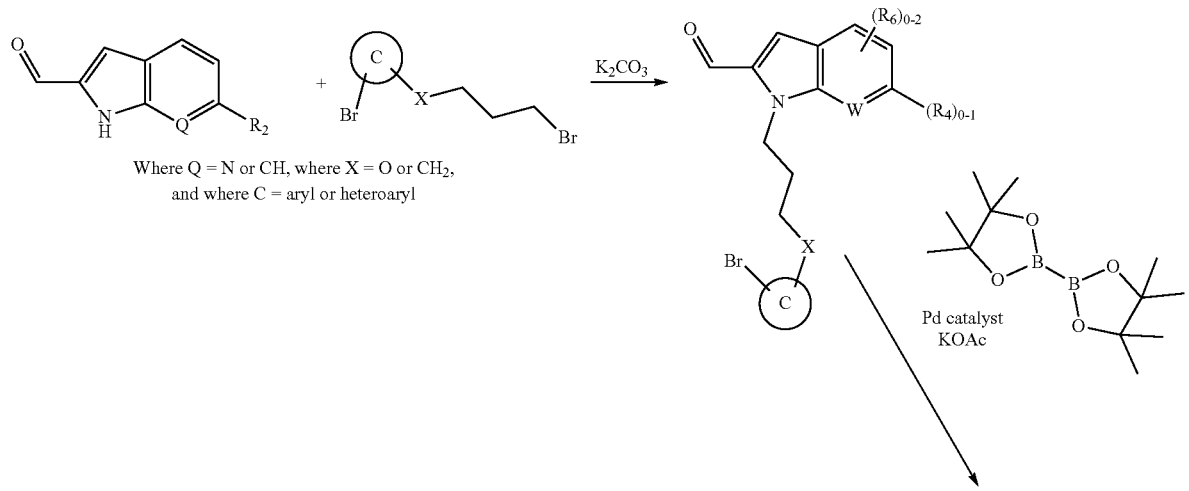
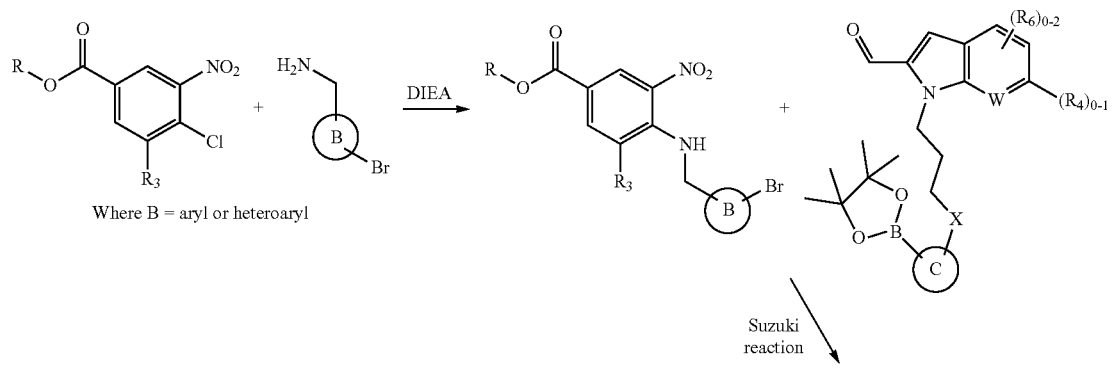

-continued
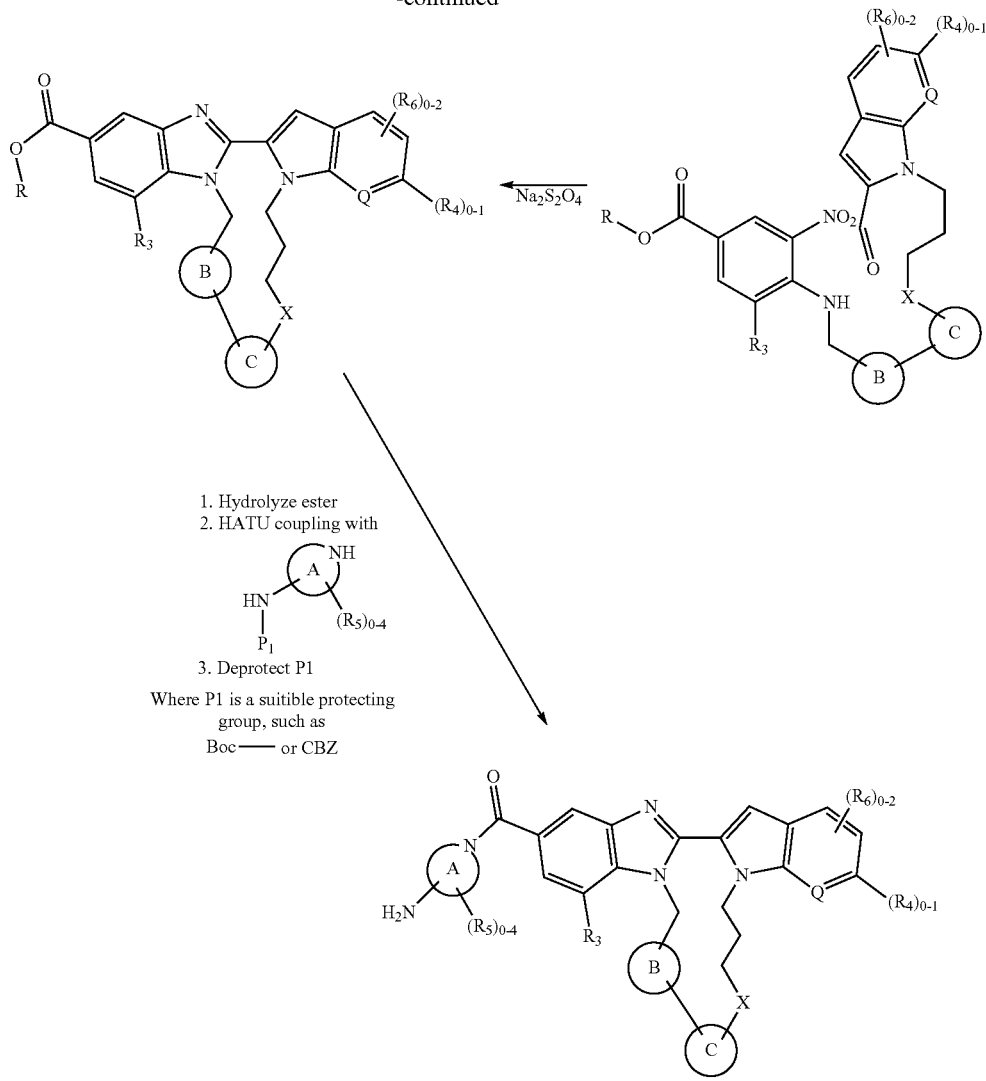
The generic chemistry Scheme 3 depicts macrocycles which are cyclized via ring-closing metathesis followed by cycloaddition, hydroxylation, or hydrogenation of the newly generated olefin to yield compounds containing group C as defined in the scheme.
Scheme 3
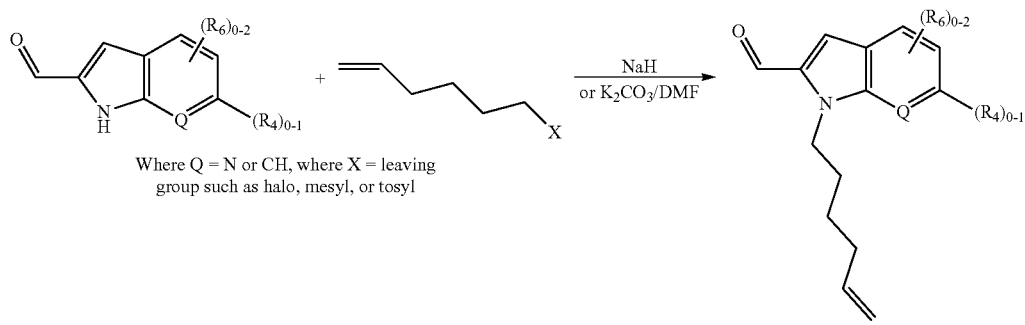
Where Q = N or CH, where X = leaving group such as halo, mesyl, or tosyl

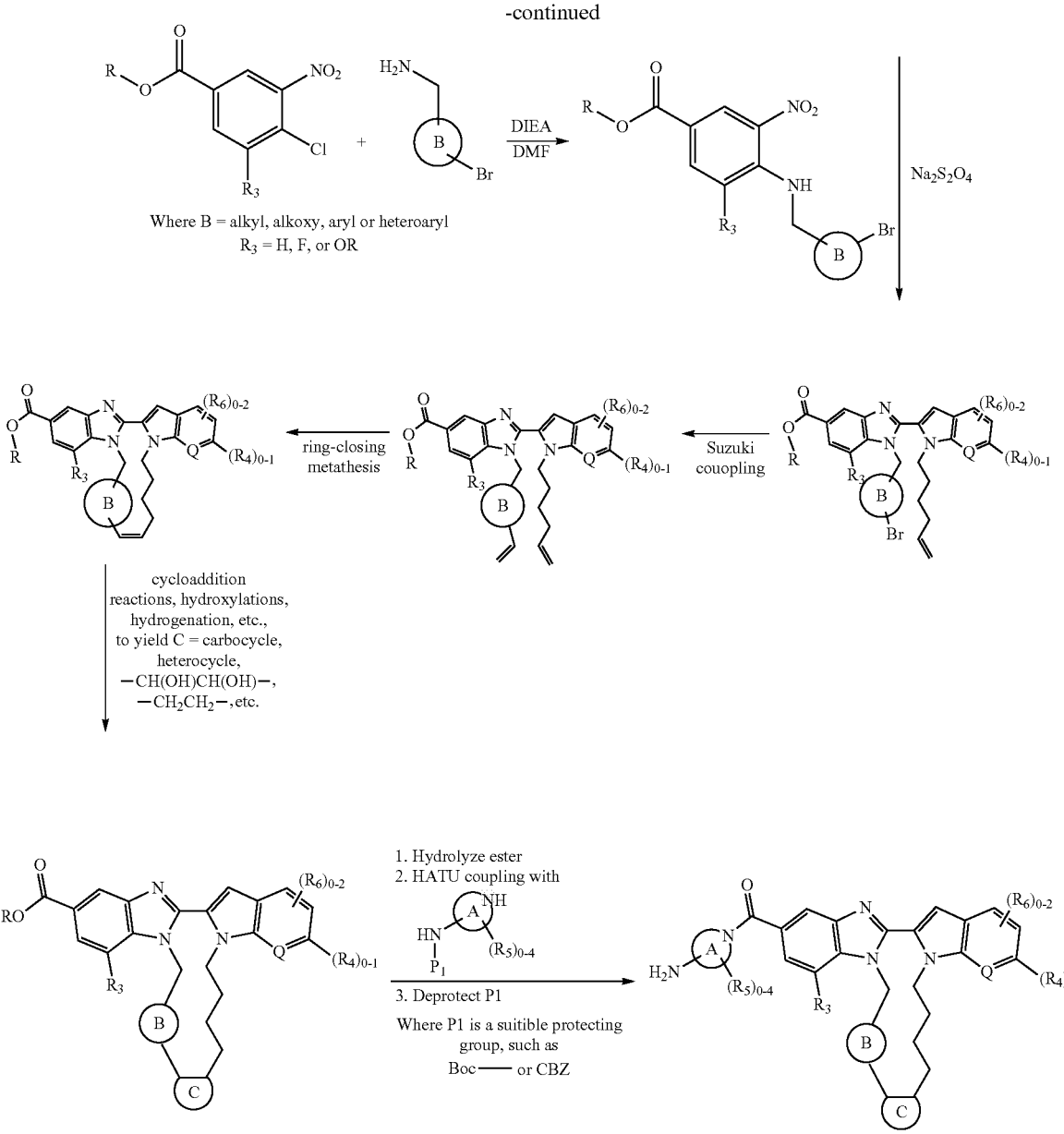
The generic chemistry Scheme 4 depicts macrocycles which are cyclized via ring-closing metathesis followed by dihydroxylation of the newly generated olefin to yield compounds containing the vicinal diol as shown in the scheme. Other transformation to the olefin can be conducted by those skilled in the art.
Scheme 4
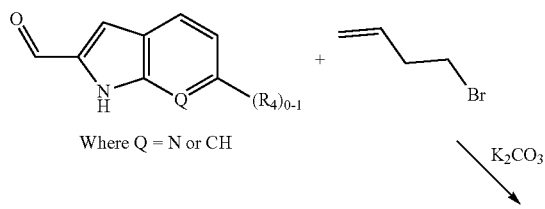
Where Q = N or CH

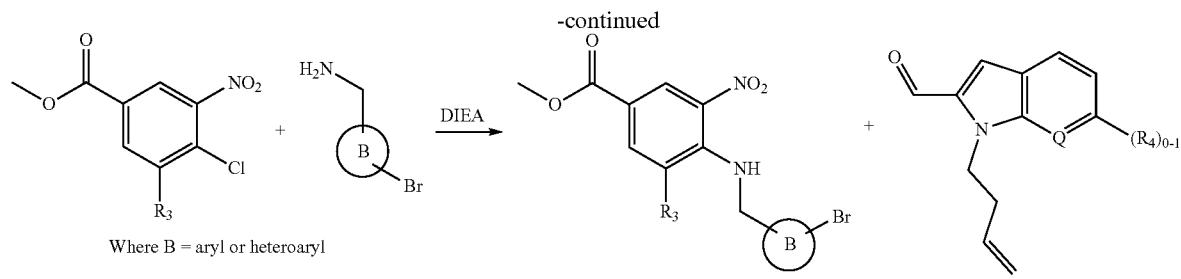
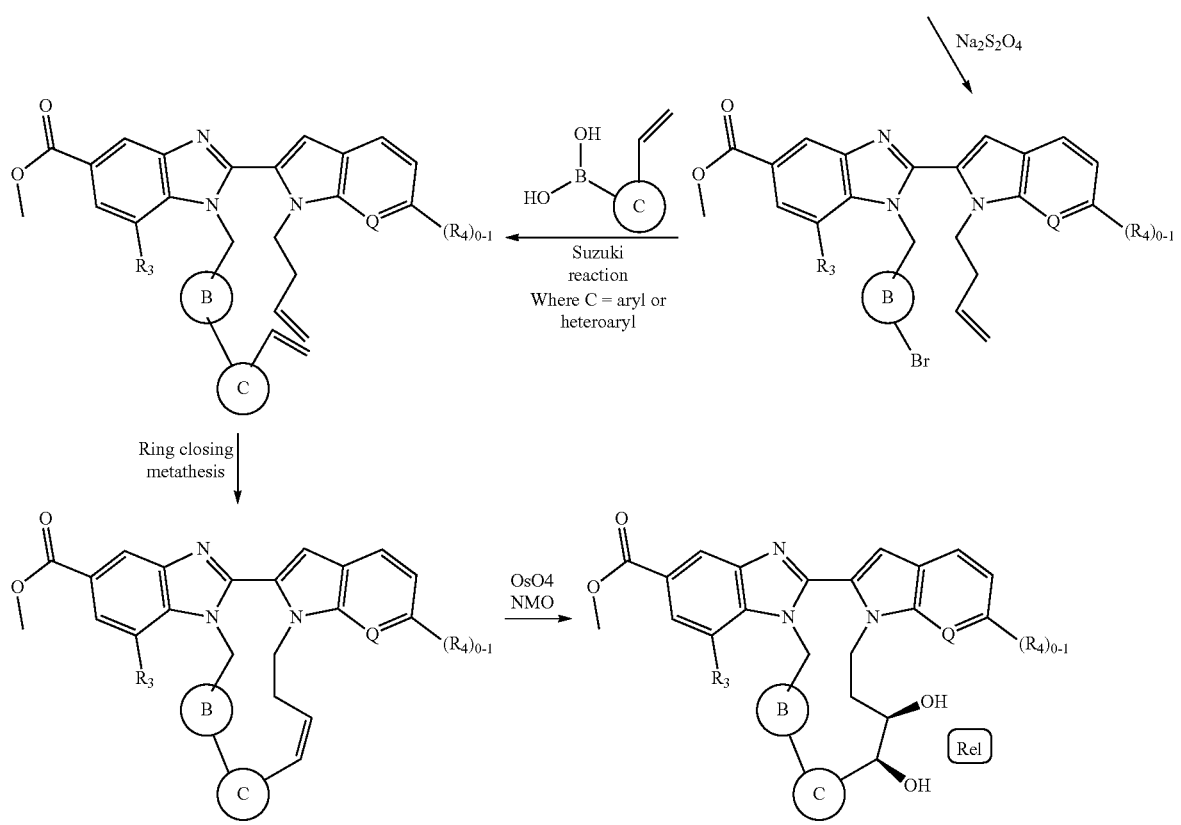
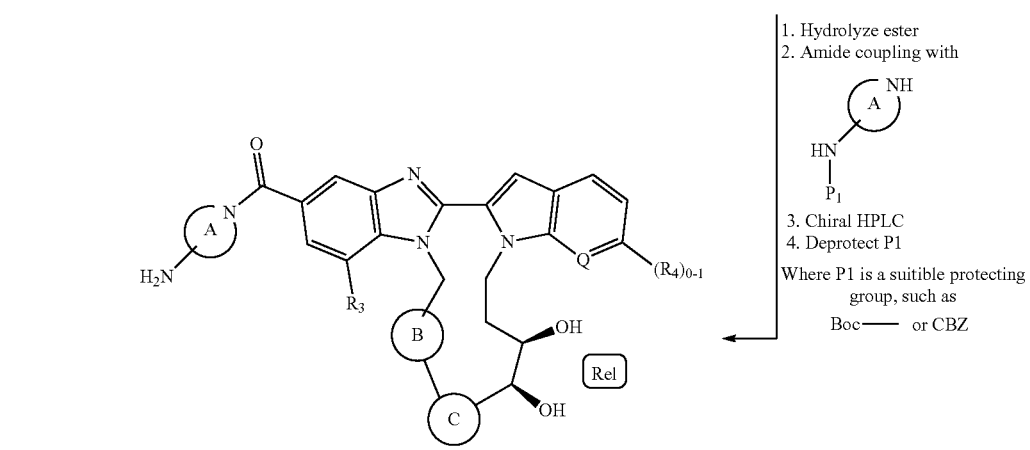
The generic chemistry Scheme 5 depicts macrocycles which are cyclized via amide bond formation as shown in the scheme.

Scheme 5

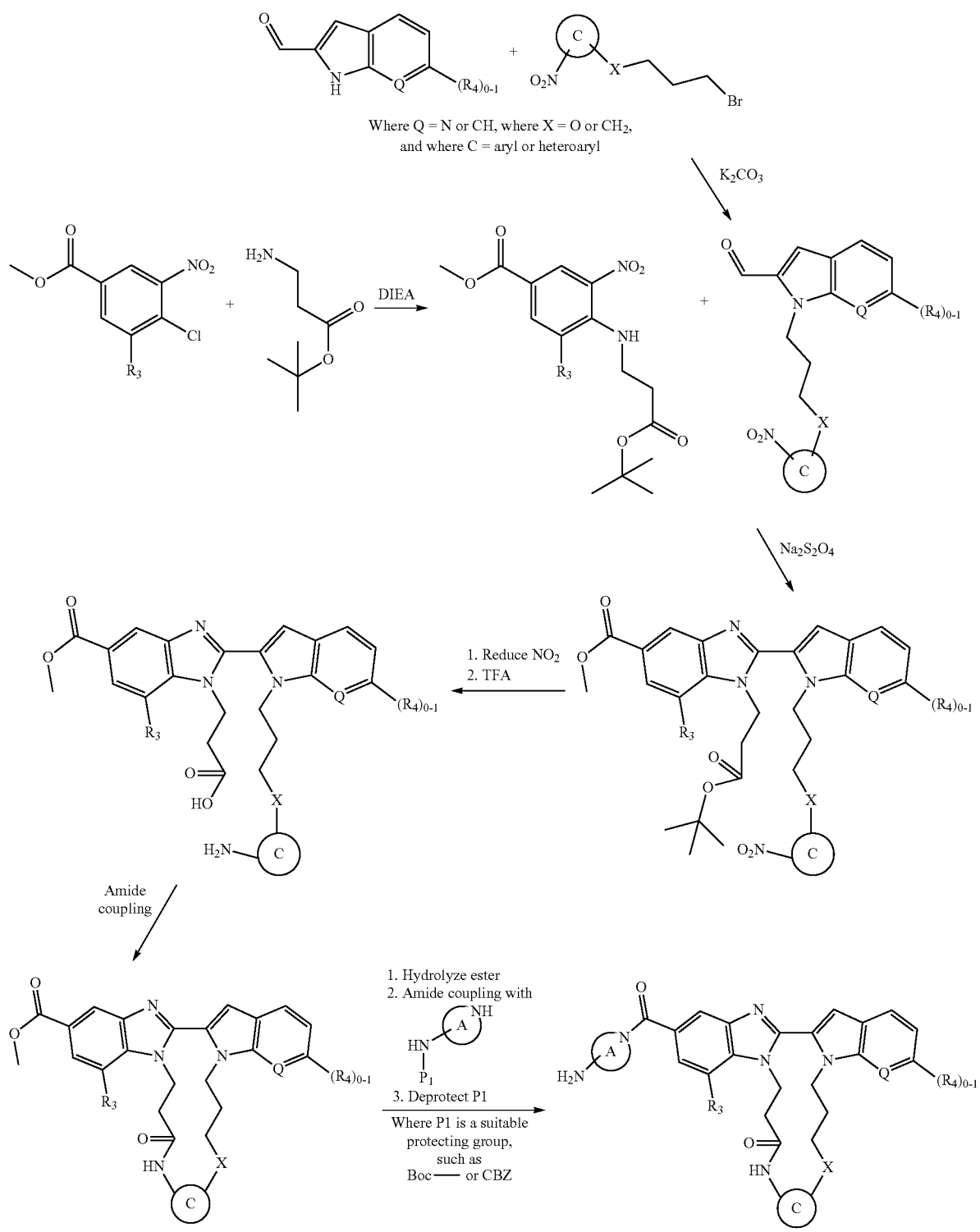

Description of Analytical LCMS Methods:

Method 1: Column: Waters XBridge C18, 2.1 mm×50 mm, 1.7 μm particles; Mobile Phase A: 5:95 acetonitrile:water with 10 mM ammonium acetate; Mobile Phase B: 95:5 acetonitrile:water with 10 mM ammonium acetate; Temperature: 50° C.; Gradient: 0% B to 100% B over 3 min, then a 0.75 min hold at 100% B; Flow: 1 mL/min; Detection: MS and UV (220 nm).

Method 2: Column: Waters XBridge C18, 2.1 mm×50 mm, 1.7 μm particles; Mobile Phase A: 5:95 acetonitrile:water with 0.1% trifluoroacetic acid; Mobile Phase B: 95:5 acetonitrile:water with 0.1% trifluoroacetic acid; Temperature: 50° C.; Gradient: 0% B to 100% B over 3 min, then a 0.75 min hold at 100% B; Flow: 1 mL/min; Detection: MS and UV (220 nm).

Method 3: Waters Acquity UPLC BEH C18, 2.1×50 mm, 1.7 μm particles; Mobile Phase A: water with 0.05% TFA; Mobile Phase B: ACN with 0.05% TFA; Gradient: 2-98% B over 1 minute, then a 0.5 minute hold at 98% B; Flow: 0.8 mL/min; Detection: MS and UV (220 nm).

Method 4: Shimadzu UPLC C18, 2.1×50 mm, 1.9 μm particles; Mobile Phase A: 5:95 ACN:water with 0.05% TFA; Mobile Phase B: 95:5 ACN:water with 0.05% TFA; Temperature: 50° C.; Gradient: 0-100% B over 1.5 minutes, then a 0.30 minute hold at 100% B; Flow: 0.60 mL/min; Detection: UV at 254 nm.

Method 5: Shimadzu UPLC BEH C18, 2.1×50 mm, 1.7 μm particles; Mobile Phase A: water with 0.05% TFA; Mobile Phase B: ACN with 0.05% TFA; Gradient: 2-98% B over 3 minute, then a 0.5 minute hold at 98% B; Flow: 1.0 mL/min; Detection: MS and UV (220 nm).

Method 6: Shimadzu UPLC C18, 2.1×50 mm, 1.9 μm particles; Mobile Phase A: 5:95 ACN:water with 0.05% TFA; Mobile Phase B: 95:5 ACN:water with 0.05% TFA; Temperature: 50° C.; Gradient: 0-100% B over 3.5 minutes, then a 0.30 minute hold at 100% B; Flow: 0.60 mL/min; Detection: UV at 254 nm.

The final products were all treated with a resin to remove trace metals as follows. The purified material was diluted with DMF, treated with Si-Pyridine and shaken for a minimum of 2 h. The resulting mixture was filtered and dried, usually by centrifugal evaporation.

The structures drawn in the current application generically as A and B below (FIG. 1) are meant as a representation of the fully chiral structures C or D, with the chiral azabicycloheptane moiety named as ((1R,4R,7R)-7-amino-2-azabicyclo[2.2.1]heptan-2-yl).

FIG. 1

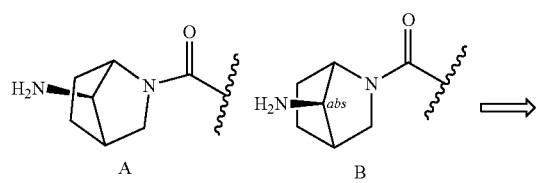

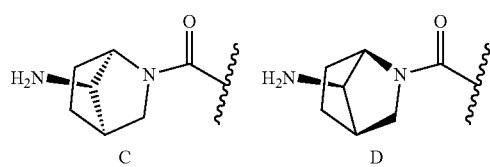

Example 1

((7R)-7-Amino-2-azabicyclo[2.2.1]heptan-2-yl)((Z)-2$^7$-methoxy-1$^1$H,2$^1$H,4$^1$H-2(2,1)-benzo[d]imidazola-1(2,1)-indola-4(4,1)-pyrazolacyclononaphane-2$^5$-yl)methanone

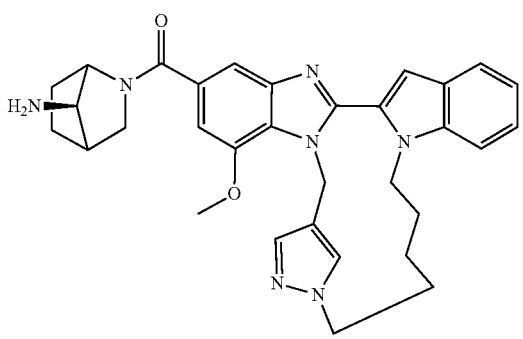 [SMILES: COc1cc(C(=O)N2CC3CCC2[C@@H]3N)cc2nc3n(c12)Cc1cnn(c1)CCCCCn1c-3cc2ccccc21]

Intermediate 1A: Methyl 4-(((1H-pyrazol-4-yl)methyl)amino)-3-methoxy-5-nitrobenzoate1-carboxylate

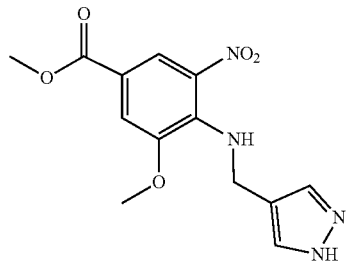 [SMILES: COC(=O)c1cc(OC)c(NCc2cn[nH]c2)c([N+](=O)[O-])c1]

A mixture of methyl 4-chloro-3-methoxy-5-nitrobenzoate (867 mg, 3.53 mmol), 1H-pyrazol-4-ylmethylamine dihydrochloride (600 mg, 3.53 mmol) and TEA (2.45 mL, 17.64 mmol) in DMF (5 mL) was stirred at 60° C. for 18 hours. The mixture was diluted with EtOAc (15 mL) and was washed with a solution of aqueous saturated sodium bicarbonate (2×15 mL). The ethyl acetate layer was dried over sodium sulfate and concentrated. The crude product was subjected to ISCO flash chromatography (silica gel/DCM-EtOAc 100:0 to 0:100 gradient). Yield methyl 4-(((1H-pyrazol-4-yl)methyl)amino)-3-methoxy-5-nitrobenzoate (790 mg, 2.45 mmol, 69.4% yield) as red solid. LC/MS (M+H): 307; LC retention time: 0.77 min (analytical HPLC Method 3). $^1$H NMR (499 MHz, CHLOROFORM-d) δ 8.49 (d, J=1.9 Hz, 1H), 7.59 (s, 2H), 7.54 (d, J=1.8 Hz, 1H), 4.80 (s, 2H), 3.94 (s, 3H), 3.93 (s, 3H).

Intermediate 1B: Methyl 1-((1H-pyrazol-4-yl)methyl)-2-(1H-indol-2-yl)-7-methoxy-1H-benzo[d]imidazole-5-carboxylate

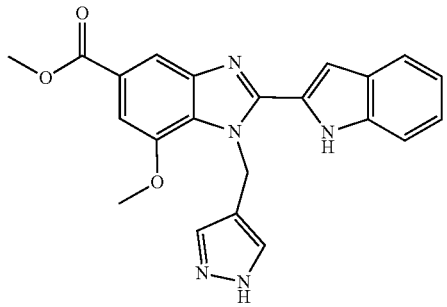 [SMILES: COC(=O)c1cc(OC)c2c(c1)nc(-c1cc3ccccc3[nH]1)n2Cc1cn[nH]c1]

To a solution of methyl 4-(((1H-pyrazol-4-yl)methyl)amino)-3-methoxy-5-nitrobenzoate (200 mg, 0.65 mmol) and 1H-indole-2-carbaldehyde (95 mg, 0.65 mmol) in EtOH (6 mL) was added a solution of sodium hydrosulfite (341 mg, 1.95 mmol) in water (3 mL) at RT under nitrogen. The mixture was stirred at 80° C. for 18 hour. The mixture was diluted with EtOAc (15 mL). Ppt was filtered and washed with water (20 mL) and EtOAc (30 mL). Crude yield methyl 1-((1H-pyrazol-4-yl)methyl)-2-(1H-indol-2-yl)-7-methoxy-1H-benzo[d]imidazole-5-carboxylate (170 mg, 0.402 mmol, 61.6% yield) as off-white solid. LC/MS (M+H): 402; LC retention time: 0.77 min (analytical HPLC Method 3). $^1$H NMR (499 MHz, DMSO-$d_6$) δ 12.75 (br s, 1H), 11.95 (s, 1H), 7.93 (s, 1H), 7.70-7.66 (m, 1H), 7.60-7.50 (m, 2H), 7.42-7.39 (m, 1H), 7.35-7.28 (m, 1H), 7.25-7.19 (m, 2H), 7.11-7.05 (m, 1H), 5.89 (s, 2H), 4.04 (s, 3H), 3.90 (s, 3H).

Intermediate 1C: Methyl (Z)-2$^7$-methoxy-1$^1$H,2$^1$H,4$^1$H-2(2,1)-benzo[d]imidazola-1(2,1)-indola-4(4,1)-pyrazolacyclononaphane-2$^5$-carboxylate

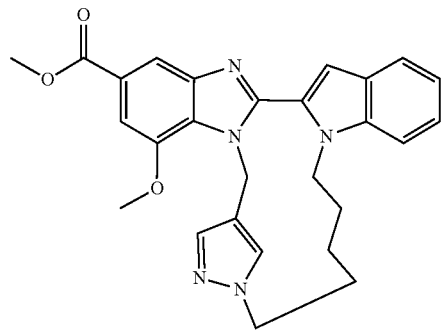 [SMILES: COC(=O)c1cc(OC)c2c(c1)nc1n2Cc2cnn(c2)CCCCCn2c-1cc1ccccc12]

A mixture of methyl 1-((1H-pyrazol-4-yl)methyl)-2-(1H-indol-2-yl)-7-methoxy-1H-benzo[d]imidazole-5-carboxylate (25 mg, 0.062 mmol), 1,5-diiodopentane (20.17 mg, 0.062 mmol) and cesium carbonate (40.6 mg, 0.12 mmol) in DMF (0.50 mL) was stirred at 80° C. for 2 hours. The mixture was diluted with EtOAc (5 mL) and was washed with a solution of aqueous saturated sodium bicarbonate (2×5 mL). The ethyl acetate layer was dried over sodium sulfate and concentrated. The crude product was subjected to ISCO flash chromatography (silica gel/hexane-EtOAc 100:0 to 0:100 gradient). Yield methyl (Z)-2$^7$-methoxy-1$^1$H,2$^1$H, 4$^1$H-2(2,1)-benzo[d]imidazola-1(2,1)-indola-4(4,1)-pyrazolacyclononaphane-2$^5$-carboxylate (7.0 mg, 0.014 mmol, 22.74% yield) as white solid. LC/MS (M+H): 470; LC retention time: 0.95 min (analytical HPLC Method 3). $^1$H NMR (400 MHz, METHANOL-$d_4$) δ 8.05-8.03 (m, 1H), 7.79-7.74 (m, 1H), 7.67-7.65 (m, 1H), 7.59-7.56 (m, 1H), 7.37-7.31 (m, 1H), 7.23-7.17 (m, 3H), 6.50-6.47 (m, 1H), 6.28-6.21 (m, 1H), 5.78-5.72 (m, 1H), 4.73-4.62 (m, 1H), 4.23 (s, 3H), 4.12-4.01 (m, 2H), 3.98 (s, 3H), 3.62-3.49 (m, 1H), 1.76-1.60 (m, 2H), 1.40-1.29 (m, 1H), 0.95-0.76 (m, 2H), −0.69-−0.86 (m, 1H).

Example 1

((7R)-7-Amino-2-azabicyclo[2.2.1]heptan-2-yl)((Z)-2$^7$-methoxy-1$^1$H,2$^1$H,4$^1$H-2(2,1)-benzo[d]imidazola-1(2,1)-indola-4(4,1)-pyrazolacyclononaphane-2$^5$-yl)methanone

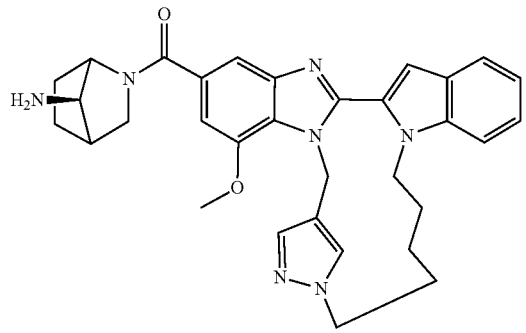 [SMILES: COc1cc(C(=O)N2CC3CCC2[C@@H]3N)cc2nc3n(c12)Cc1cnn(c1)CCCCCn1c-3cc2ccccc21]

A mixture of methyl (Z)-2$^7$-methoxy-1$^1$H,2$^1$H,4$^1$H-2(2,1)-benzo[d]imidazola-1(2,1)-indola-4(4,1)-pyrazolacyclononaphane-2$^5$-carboxylate (7.0 mg, 0.015 mmol) and 1.0 M aqueous sodium hydroxide (0.075 mL, 0.075 mmol) in MeOH (1 mL) was stirred at 50° C. for 3 hours. The mixture was cooled to RT. A solution of 1.0 N aqueous HCl (0.080 mL) was added and the mixture was concentrated to give crude (Z)-2$^7$-methoxy-1$^1$H,2$^1$H,4$^1$H-2(2,1)-benzo[d]imidazola-1(2,1)-indola-4(4,1)-pyrazolacyclononaphane-2$^5$-carboxylic acid. LC/MS (M+H): 456; LC retention time: 0.84 min (analytical HPLC Method 3).

A mixture of (Z)-2$^7$-methoxy-1$^1$H,2$^1$H,4$^1$H-2(2,1)-benzo[d]imidazola-1(2,1)-indola-4(4,1)-pyrazolacyclononaphane-2$^5$-carboxylic acid, tert-butyl ((7R)-2-azabicyclo[2.2.1]heptan-7-yl)carbamate (3.16 mg, 0.015 mmol), BOP (6.59 mg, 0.015 mmol) and TEA (6.23 µl, 0.045 mmol) in DMF (1 mL) was stirred at RT for 2 hours. The mixture was diluted with EtOAc (5 mL) and was washed with a solution of aqueous saturated sodium bicarbonate (2×5 mL). The ethyl acetate layer was dried over sodium sulfate and concentrated to give crude tert-butyl ((7R)-2-((Z)-2$^7$-methoxy-1$^1$H,2$^1$H,4$^1$H-2(2,1)-benzo[d]imidazola-1(2,1)-indola-4(4,1)-pyrazolacyclononaphane-2$^5$-carbonyl)-2-azabicyclo[2.2.1]heptan-7-yl)carbamate. LC/MS (M+H): 650; LC retention time: 0.91 min (analytical HPLC Method 3).

A mixture of tert-butyl ((7R)-2-((Z)-2$^7$-methoxy-1$^1$H,2$^1$H,4$^1$H-2(2,1)-benzo[d]imidazola-1(2,1)-indola-4(4,1)-pyrazolacyclononaphane-2$^5$-carbonyl)-2-azabicyclo[2.2.1]heptan-7-yl)carbamate in DCM (0.5 mL) and TFA (0.5 mL) was stirred at RT for 30 min. The mixture was concentrated. The crude material was purified via preparative LC/MS with the following conditions: Column: XBridge C18, 200 mm×19 mm, 5-μm particles; Mobile Phase A: 5:95 acetonitrile:water with 10-mM ammonium acetate; Mobile Phase B: 95:5 acetonitrile:water with 10-mM ammonium acetate; Gradient: a 0-minute hold at 18% B, 1⁸-58% B over 20 minutes, then a 4-minute hold at 100% B; Flow Rate: 20 mL/min; Column Temperature: 25 C. Fraction collection was triggered by MS and UV signals. Fractions containing the desired product were combined and dried via centrifugal evaporation. Yield ((7R)-7-amino-2-azabicyclo[2.2.1]heptan-2-yl)((Z)-2⁷-methoxy-1¹H,2¹H,4¹H-2(2,1)-benzo[d]imidazola-1(2,1)-indola-4(4,1)-pyrazolacyclononaphane-2⁵-yl)methanone (8.20 mg, 0.015 mmol, 98% yield). LC/MS (M+H): 550; LC retention time: 1.31 min (analytical HPLC Method 2). ¹H NMR (500 MHz, DMSO-d₆) δ 7.76-7.71 (m, 1H), 7.64-7.59 (m, 1H), 7.45-7.21 (m, 3H), 7.18-7.02 (m, 3H), 6.41-6.36 (m, 1H), 6.06-5.99 (m, 1H), 5.68-5.61 (m, 1H), 4.70-4.63 (m, 1H), 4.19-4.03 (m, 4H), 4.00-3.77 (m, 2H), 3.64-3.46 (m, 6H), 3.22-2.99 (m, 2H), 2.08-1.93 (m, 2H), 1.67-1.40 (m, 3H), 1.19-1.04 (m, 1H), 0.83-0.57 (m, 2H), −0.81--0.93 (m, 1H).

Example 2

((7R)-7-Amino-2-azabicyclo[2.2.1]heptan-2-yl)((Z)-2⁷-methoxy-1¹H,2¹H,4¹H-1,2(2,1)-dipyrrolo[2,3-b]pyridina-4(4,1)-pyrazolacyclodecaphane-2⁵-yl)methanone

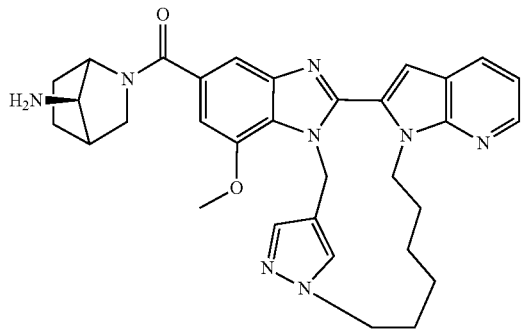 [SMILES: COc1cc(C(=O)N2CC3CCC2[C@@H]3N)cc2nc3n(c12)Cc1cnn(c1)CCCCCCn1c-3cc2cccnc21]

Intermediate 2A: 1-(6-((Tert-butyldimethylsilyl)oxy)hexyl)-1H-pyrrolo[2,3-b]pyridine-2-carbaldehyde

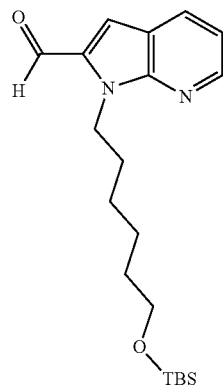

To a suspension of sodium hydride (71.2 mg, 1.779 mmol) in anhydrous DMF (5 mL) was added a solution of 1H-pyrrolo[2,3-b]pyridine-2-carbaldehyde (200 mg, 1.36 mmol) in DMF (2 mL) under nitrogen, the mixture was stirred at RT for 45 min. (6-bromohexyloxy)-tert-butyldimethylsilane (445 mg, 1.50 mmol) in DMF (1 mL) was added to the mixture and the reaction was stirred at RT for 18 hours. The mixture was diluted with EtOAc (20 mL) and was washed with a solution of aqueous saturated sodium bicarbonate (2×20 mL). The ethyl acetate layer was dried over sodium sulfate and concentrated. The crude product was subjected to ISCO flash chromatography (silica gel/hexane-EtOAc 100:0 to 60:40 gradient). Yield 1-(6-((tert-butyldimethylsilyl)oxy)hexyl)-1H-pyrrolo[2,3-b]pyridine-2-carbaldehyde (417 mg, 1.099 mmol, 80% yield) as clear oil. LC/MS (M+H): 361; LC retention time: 1.30 min (analytical HPLC Method 3). ¹H NMR (499 MHz, CHLOROFORM-d) δ 9.95 (s, 1H), 8.57 (dd, J=4.6, 1.6 Hz, 1H), 8.08 (dd, J=8.0, 1.7 Hz, 1H), 7.23 (s, 1H), 7.17 (dd, J=8.0, 4.6 Hz, 1H), 4.75-4.67 (m, 2H), 3.59 (t, J=6.6 Hz, 2H), 1.87-1.78 (m, 2H), 1.55-1.45 (m, 2H), 1.42-1.28 (m, 4H), 0.94-0.84 (m, 9H), 0.04--0.02 (m, 6H)

Intermediate 2B: Methyl 1-((1H-pyrazol-4-yl)methyl)-2-(1-(6-hydroxyhexyl)-1H-pyrrolo[2,3-b]pyridin-2-yl)-7-methoxy-1H-benzo[d]imidazole-5-carboxylate

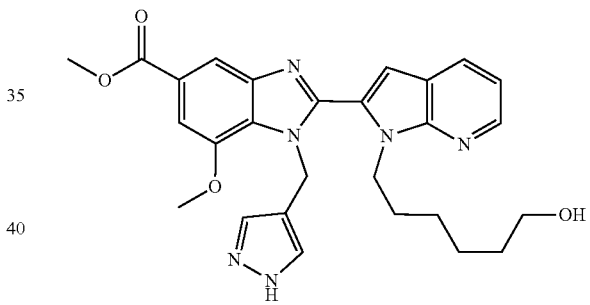

To a solution of 1-(6-((tert-butyldimethylsilyl)oxy)hexyl)-1H-pyrrolo[2,3-b]pyridine-2-carbaldehyde (177 mg, 0.49 mmol) and methyl 4-(((1H-pyrazol-4-yl)methyl)amino)-3-methoxy-5-nitrobenzoate (150 mg, 0.49 mmol) in EtOH (4 mL) was added a solution of sodium dithionite (256 mg, 1.46 mmol) in Water (2 mL), the mixture was stirred at 80° C. for 18 hour. The mixture was diluted with EtOAc (15 mL) and was washed with a solution of aqueous saturated sodium bicarbonate (2×15 mL). The ethyl acetate layer was dried over sodium sulfate and concentrated. The crude product was subjected to ISCO flash chromatography (silica gel/hexane-EtOAc 100:0 to 0:100 gradient). Yield methyl 1-((1H-pyrazol-4-yl)methyl)-2-(1-(6-hydroxyhexyl)-1H-pyrrolo[2,3-b]pyridin-2-yl)-7-methoxy-1H-benzo[d]imidazole-5-carboxylate (159 mg, 0.301 mmol, 61.4% yield) as tan foam. LC/MS (M+H): 503; LC retention time: 0.75 min (analytical HPLC Method 3). ¹H NMR (499 MHz, CHLOROFORM-d) δ 8.48-8.45 (m, 1H), 8.23-8.21 (m, 1H), 8.03-8.00 (m, 1H), 7.56-7.54 (m, 1H), 7.21-7.15 (m, 3H), 6.85 (s, 1H), 5.84-5.78 (m, 2H), 4.62-4.56 (m, 2H), 4.10 (s, 3H), 3.99 (s, 3H), 3.53-3.47 (m, 2H), 1.37-1.24 (m, 6H), 1.18-1.03 (m, 4H).

Intermediate 2C: Methyl (Z)-2⁷-methoxy-1¹H,2¹H, 4¹H-1,2(2,1)-dipyrrolo[2,3-b]pyridina-4(4,1)-pyrazolacyclodecaphane-2⁵-carboxylate

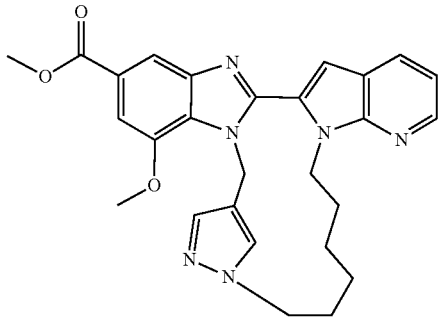 [SMILES: COC(=O)c1cc(OC)c2c(c1)nc1n2Cc2cnn(c2)CCCCCCn2c-1cc1cccnc12]

To a solution of methyl 1-((1H-pyrazol-4-yl)methyl)-2-(1-(6-hydroxyhexyl)-1H-pyrrolo[2,3-b]pyridin-2-yl)-7-methoxy-1H-benzo[d]imidazole-5-carboxylate (110 mg, 0.22 mmol) and tri-n-butylphosphine (48.7 mg, 0.24 mmol) in toluene (5 mL) and THF (3 mL) under nitrogen was added a solution of Diamide (41.5 mg, 0.24 mmol) in THE (1 mL), the mixture was stirred at RT for 18 hours. The mixture was concentrated. The crude product was purified by prep-HPLC (Phenomenex, Luna 5 micron 30×250 mm, flow rate=30 ml/min., gradient=20% A to 100% B in 30 min., A=H2O/ACN/TFA (90:10:0.1), B=H2O/ACN/TFA (10:90:0.1)). Yield methyl (Z)-2⁷-methoxy-1¹H,2¹H,4¹H-1,2(2,1)-dipyrrolo[2,3-b]pyridina-4(4,1)-pyrazolacyclodecaphane-2⁵-carboxylate (26 mg, 0.051 mmol, 23.29% yield). LC/MS (M+H): 485; LC retention time: 0.80 min (analytical HPLC Method 3). ¹H NMR (499 MHz, METHANOL-d₄) δ 8.42-8.40 (m, 1H), 8.31-8.28 (m, 1H), 8.10 (d, J=1.2 Hz, 1H), 7.69-7.66 (m, 1H), 7.43 (s, 1H), 7.33-7.29 (m, 1H), 7.25 (s, 1H), 7.00 (s, 1H), 6.48-6.43 (m, 1H), 5.85-5.80 (m, 1H), 4.76-4.64 (m, 2H), 4.20 (s, 3H), 3.99 (s, 3H), 3.98-3.88 (m, 2H), 1.84-1.59 (m, 2H), 1.42-1.27 (m, 2H), 0.93-0.81 (m, 2H), 0.45-0.33 (m, 1H), −0.33--0.43 (m, 1H).

Example 2

((7R)-7-Amino-2-azabicyclo[2.2.1]heptan-2-yl)((Z)-2⁷-methoxy-1¹H,2¹H,4¹H-1,2(2,1)-dipyrrolo[2,3-b]pyridina-4(4,1)-pyrazolacyclodecaphane-2⁵-yl) methanone

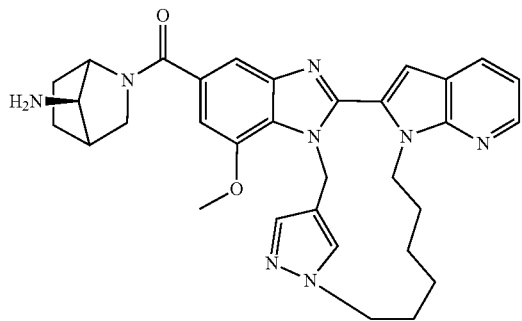 [SMILES: COc1cc(C(=O)N2CC3CCC2[C@@H]3N)cc2nc3n(c12)Cc1cnn(c1)CCCCCCn1c-3cc2cccnc21]

A mixture of methyl (Z)-2⁷-methoxy-1¹H,2¹H,4¹H-1,2(2, 1)-dipyrrolo[2,3-b]pyridina-4(4,1)-pyrazolacyclodecaphane-2⁵-carboxylate (15 mg, 0.031 mmol) and 1.0 M sodium hydroxide (155 μl, 0.16 mmol) in MeOH (2 mL) was stirred at 55° C. for 18 hours. A solution of 1.0 M aqueous HCl (0.32 mL) was added and the mixture was concentrated. The crude product was purified by prep-HPLC (Phenomenex, Luna 5 micron 30×250 mm, flow rate=30 ml/min., gradient=20% A to 100% B in 30 min., A=H₂O/ACN/TFA (90:10:0.1), B=H2O/ACN/TFA (10:90:0.1)). Yield (Z)-2⁷-methoxy-1¹H,2¹H,4¹H-1,2(2,1)-dipyrrolo[2,3-b]pyridina-4 (4,1)-pyrazolacyclodecaphane-2⁵-carboxylic acid. LC/MS (M+H): 471; LC retention time: 0.74 min (analytical HPLC Method 3).

A mixture of (Z)-27-methoxy-11H,21H,41H-1,2(2,1)-dipyrrolo[2,3-b]pyridina-4(4,1)-pyrazolacyclodecaphane-25-carboxylic acid, tert-butyl ((7R)-2-azabicyclo[2.2.1]heptan-7-yl)carbamate (6.57 mg, 0.031 mmol), BOP (13.69 mg, 0.031 mmol) and TEA (21.57 μl, 0.16 mmol) in DMF (1 mL) was stirred at RT for 1 hours. The mixture was diluted with EtOAc (5 mL) and was washed with a solution of aqueous saturated sodium bicarbonate (2×5 mL). The ethyl acetate layer was dried over sodium sulfate and concentrated to give crude tert-butyl ((7R)-2-((Z)-27-methoxy-11H,21H,41H-1, 2(2,1)-dipyrrolo[2,3-b]pyridina-4(4,1)-pyrazolacyclodecaphane-25-carbonyl)-2-azabicyclo[2.2.1]heptan-7-yl)carbamate. LC/MS (M+H): 665; LC retention time: 0.86 min (analytical HPLC Method 3).

A mixture of tert-butyl ((7R)-2-((Z)-2⁷-methoxy-1¹H, 2¹H,4¹H-1,2(2,1)-dipyrrolo[2,3-b]pyridina-4(4,1)-pyrazolacyclodecaphane-2⁵-carbonyl)-2-azabicyclo[2.2.1]heptan-7-yl)carbamate in DCM (1 mL) and TFA (1 mL) was stirred at RT for 30 min. The mixture was concentrated. The crude product was purified by prep-HPLC (XBridge C18, 200 mm×19 mm, 5-μm particles; Mobile Phase A: 5:95 acetonitrile:water with 10-mM ammonium acetate; Mobile Phase B: 95:5 acetonitrile:water with 10-mM ammonium acetate; Gradient: a 0-minute hold at 11% B, 11-51% B over 20 minutes, then a 0-minute hold at 100% B; Flow Rate: 20 mL/min; Column Temperature: 25 C). Yield ((7R)-7-amino-2-azabicyclo[2.2.1]heptan-2-yl)((Z)-2⁷-methoxy-1¹H,2¹H, 4¹H-1,2(2,1)-dipyrrolo[2,3-b]pyridina-4(4,1)-pyrazolacyclodecaphane-2⁵-yl)methanone (4.70 mg, 7.92 μmol, 25.6% yield). LC/MS (M+H): 565; LC retention time: 1.11 min (analytical HPLC Method 2). ¹H NMR (500 MHz, DMSO-d₆) δ 8.39-8.33 (m, 1H), 8.18-8.11 (m, 1H), 7.54-7.35 (m, 2H), 7.23-7.03 (m, 3H), 6.91 (s, 1H), 6.26-6.13 (m, 1H), 5.83-5.71 (m, 1H), 4.70-4.61 (m, 2H), 4.13-4.03 (m, 3H), 3.95-3.77 (m, 2H), 3.75-3.30 (m, 1H), 3.26-2.66 (m, 2H), 2.30-2.16 (m, 1H), 2.08-1.68 (m, 4H), 1.56-1.12 (m, 6H), 1.07-0.67 (m, 3H), 0.37-0.22 (m, 1H), −0.39--0.59 (m, 1H).

Example 3

((3R,5R)-3-Amino-5-fluoropiperidin-1-yl)((Z)-2$^7$-methoxy-1$^1$H,2$^1$H,4$^1$H-6-oxa-2(2,1)-benzo[d]imidazola-1(2,1)-indola-4(4,1)-pyrazola-5(1,2)-benzenacyclononaphane-2$^5$-yl)methanone

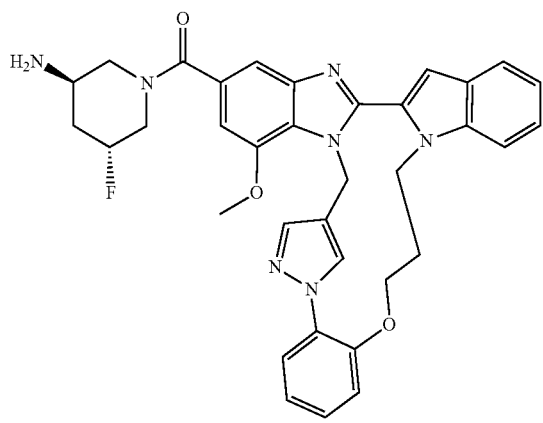 [SMILES: COc1cc(C(=O)N2C[C@H](N)C[C@@H](F)C2)cc2nc3n(c12)Cc1cnn(c1)-c1ccccc1OCCCn1c-3cc2ccccc21]

Intermediate 3A: 1-(3-(2-Bromophenoxy)propyl)-1H-indole-2-carbaldehyde

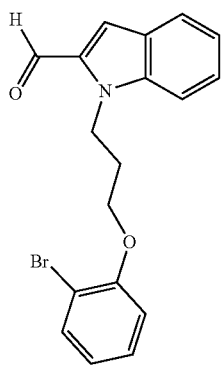 [SMILES: O=Cc1cc2ccccc2n1CCCOc1ccccc1Br]

To a suspension of sodium hydride (0.303 g, 7.58 mmol) in anhydrous DMF (10 mL) was added a solution of indole-2-carboxaldehyde (1.0 g, 6.89 mmol) in DMF (10 mL), the mixture was stirred at RT under nitrogen for 60 min. 1-bromo-2-(3-bromopropoxy)benzene (2.23 g, 7.58 mmol) was then added and the mixture was stirred at RT for 2 hours. The mixture was diluted with EtOAc (45 mL) and was washed with a solution of aqueous saturated sodium bicarbonate (2×45 mL). The ethyl acetate layer was dried over sodium sulfate and concentrated. The crude product was subjected to ISCO flash chromatography (silica gel/hexane-EtOAc 100:0 to 0:100 gradient). Yield 1-(3-(2-bromophenoxy)propyl)-1H-indole-2-carbaldehyde (1.98 g, 5.25 mmol, 76% yield) as brown gum. LC/MS (M+H): 359; LC retention time: 1.15 min (analytical HPLC Method 3).

Intermediate 3B: Methyl 1-((1H-pyrazol-4-yl)methyl)-2-(1-(3-(2-bromophenoxy)propyl)-1H-indol-2-yl)-7-methoxy-1H-benzo[d]imidazole-5-carboxylate

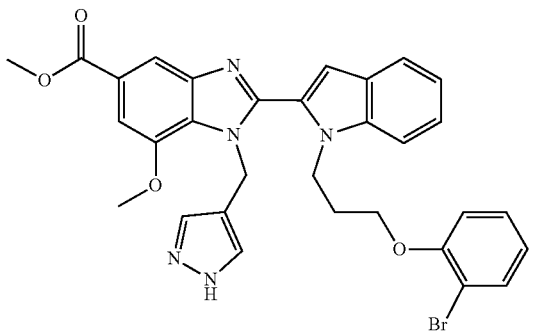 [SMILES: COC(=O)c1cc(OC)c2c(c1)nc(-c1cc3ccccc3n1CCCOc1ccccc1Br)n2Cc1cn[nH]c1]

To a solution of 1-(3-(2-bromophenoxy)propyl)-1H-indole-2-carbaldehyde (339 mg, 0.95 mmol) and methyl 4-(((1H-pyrazol-4-yl)methyl)amino)-3-methoxy-5-nitrobenzoate (290 mg, 0.95 mmol) in EtOH (6 mL) was added a solution of sodium dithionite (495 mg, 2.84 mmol) in Water (3 mL), the mixture was stirred at 80° C. for 18 hour. The mixture was diluted with EtOAc (25 mL) and was washed with a solution of aqueous saturated sodium bicarbonate (2×25 mL). The ethyl acetate layer was dried over sodium sulfate and concentrated. The crude product was subjected to ISCO flash chromatography (silica gel/hexane-5% MeOH/EtOAc 100:0 to 0:100 gradient). Yield methyl 1-((1H-pyrazol-4-yl)methyl)-2-(1-(3-(2-bromophenoxy)propyl)-1H-indol-2-yl)-7-methoxy-1H-benzo[d]imidazole-5-carboxylate (321 mg, 0.522 mmol, 55.2% yield) as tan foam. LC/MS (M+H): 615; LC retention time: 0.96 min (analytical HPLC Method 3).

Intermediate 3C: (Z)-2$^7$-Methoxy-1$^1$H,2$^1$H,4$^1$H-6-oxa-2(2,1)-benzo[d]imidazola-1(2,1)-indola-4(4,1)-pyrazola-5(1,2)-benzenacyclononaphane-2$^5$-carboxylic acid

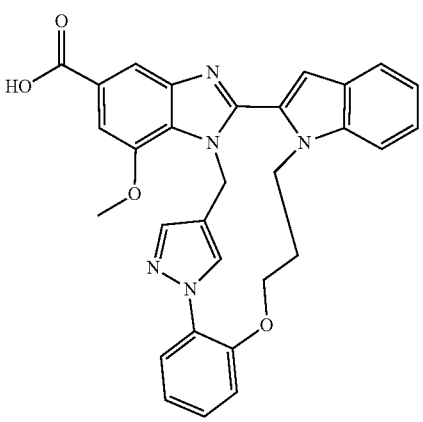 [SMILES: COc1cc(C(=O)O)cc2nc3n(c12)Cc1cnn(c1)-c1ccccc1OCCCn1c-3cc2ccccc21]

A mixture of methyl 1-((1H-pyrazol-4-yl)methyl)-2-(1-(3-(2-bromophenoxy)propyl)-1H-indol-2-yl)-7-methoxy-1H-benzo[d]imidazole-5-carboxylate (80 mg, 0.13 mmol), copper(I) iodide (24.79 mg, 0.13 mmol), potassium phosphate (83 mg, 0.39 mmol) and (1R,2R)—N1,N2-dimethylcyclohexane-1,2-diamine (18.52 mg, 0.13 mmol) in degassed dioxane (12 mL) under nitrogen in a sealed vial was stirred at 110° C. for 18 hours. The mixture was diluted with EtOAc (5 mL) and Ppt was filtered off and the filtrate was concentrated. The crude product was subjected to ISCO flash chromatography (silica gel/hexane-EtOAc 100:0 to 0:100 gradient). Yield methyl (Z)-$2^7$-methoxy-$1^1$H,$2^1$H,$4^1$H-6-oxa-2(2,1)-benzo[d]imidazola-1(2,1)-indola-4(4,1)-pyrazola-5(1,2)-benzenacyclononaphane-$2^5$-carboxylate (32 mg, 0.057 mmol, 43.8% yield). LC/MS (M+H): 534; LC retention time: 1.03 min (analytical HPLC Method 3). $^1$H NMR (499 MHz, CHLOROFORM-d) δ 8.29 (s, 1H), 7.77-7.72 (m, 1H), 7.66-7.59 (m, 2H), 7.52-7.47 (m, 2H), 7.41-7.36 (m, 1H), 7.27-7.21 (m, 2H), 7.16 (s, 1H), 7.11-7.06 (m, 1H), 7.01-6.97 (m, 1H), 6.89 (s, 1H), 6.38-6.33 (m, 1H), 5.96-5.90 (m, 1H), 4.80-4.70 (m, 1H), 4.62-4.51 (m, 1H), 4.16 (s, 3H), 4.02-3.91 (m, 5H), 2.03-1.93 (m, 1H), 1.80-1.69 (m, 1H).

A mixture of methyl (Z)-$2^7$-methoxy-$1^1$H,$2^1$H,$4^1$H-6-oxa-2(2,1)-benzo[d]imidazola-1(2,1)-indola-4(4,1)-pyrazola-5(1,2)-benzenacyclononaphane-$2^5$-carboxylate (32 mg, 0.057 mmol, 43.8% yield) and 2.0 N aqueous lithium hydroxide (0.33 mL, 0.65 mmol) in MeOH (2 mL) was stirred at 50° C. for 2 hours. A solution of 1.0 N aqueous HCl (0.66 mL) was added and the mixture was concentrated. Crude yield (Z)-$2^7$-methoxy-$1^1$H,$2^1$H,$4^1$H-6-oxa-2(2,1)-benzo[d]imidazola-1(2,1)-indola-4(4,1)-pyrazola-5(1,2)-benzenacyclononaphane-$2^5$-carboxylic acid (123 mg, 0.11 mmol, 91% yield). LC/MS (M+H): 520; LC retention time: 0.92 min (analytical HPLC Method 3).

Example 3

((3R,5R)-3-Amino-5-fluoropiperidin-1-yl)((Z)-$2^7$-methoxy-$1^1$H,$2^1$H,$4^1$H-6-oxa-2(2,1)-benzo[d]imidazola-1(2,1)-indola-4(4,1)-pyrazola-5(1,2)-benzenacyclononaphane-$2^5$-yl)methanone

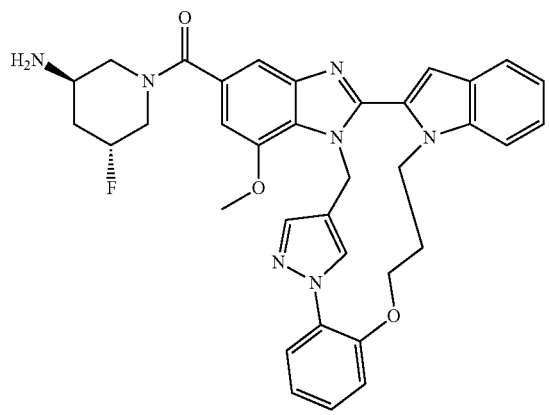 [SMILES: COc1cc(C(=O)N2C[C@H](N)C[C@@H](F)C2)cc2nc3n(c12)Cc1cnn(c1)-c1ccccc1OCCCn1c-3cc2ccccc21]

A mixture of (Z)-$2^7$-methoxy-$1^1$H,$2^1$H,$4^1$H-6-oxa-2(2,1)-benzo[d]imidazola-1(2,1)-indola-4(4,1)-pyrazola-5(1,2)-benzenacyclononaphane-$2^5$-carboxylic acid (60 mg, 0.12 mmol), tert-butyl ((3R,5R)-5-fluoropiperidin-3-yl)carbamate (25.2 mg, 0.12 mmol), BOP (51.1 mg, 0.12 mmol) and TEA (80 μl, 0.58 mmol) in DMF (1 mL) was stirred at RT for 2 hours. The mixture was diluted with EtOAc (5 mL) and was washed with a solution of aqueous saturated sodium bicarbonate (2×5 mL). The ethyl acetate layer was dried over sodium sulfate and concentrated to give crude tert-butyl ((3R,5R)-5-fluoro-1-((Z)-$2^7$-methoxy-$1^1$H,$2^1$H,$4^1$H-6-oxa-2(2,1)-benzo[d]imidazola-1(2,1)-indola-4(4,1)-pyrazola-5(1,2)-benzenacyclononaphane-$2^5$-carbonyl)piperidin-3-yl)carbamate. LC/MS (M+H): 720; LC retention time: 0.96 min (analytical HPLC Method 3).

A mixture of tert-butyl ((3R,5R)-5-fluoro-1-((Z)-$2^7$-methoxy-$1^1$H,$2^1$H,$4^1$H-6-oxa-2(2,1)-benzo[d]imidazola-1(2,1)-indola-4(4,1)-pyrazola-5(1,2)-benzenacyclononaphane-$2^5$-carbonyl)piperidin-3-yl)carbamate in DCM (1 mL) and TFA (0.5 mL) was stirred at RT for 30 min. The mixture was concentrated. The crude product was purified by prep-HPLC (Phenomenex, Luna 5 micron 30×250 mm, flow rate=30 ml/min., gradient=20% A to 100% B in 30 min., A=H2O/ACN/TFA (90:10:0.1), B=H2O/ACN/TFA (10:90:0.1)). Yield ((3R,5R)-3-amino-5-fluoropiperidin-1-yl)((Z)-$2^7$-methoxy-$1^1$H,$2^1$H,$4^1$H-6-oxa-2(2,1)-benzo[d]imidazola-1(2,1)-indola-4(4,1)-pyrazola-5(1,2)-benzenacyclononaphane-$2^5$-yl)methanone (11.38 mg, 0.018 mmol, 15.58% yield) as white powder. LC/MS (M+H): 620; LC retention time: 0.81 min (analytical HPLC Method 3). $^1$H NMR (499 MHz, CHLOROFORM-d) δ 7.73-7.68 (m, 1H), 7.53-7.47 (m, 3H), 7.44-7.40 (m, 1H), 7.32-7.29 (m, 1H), 7.25-7.14 (m, 2H), 7.09-6.94 (m, 4H), 6.85-6.80 (m, 1H), 6.28-6.22 (m, 1H), 5.87-5.81 (m, 1H), 5.23-5.15 (m, 1H), 4.44-4.33 (m, 1H), 4.07 (s, 3H), 3.93-3.82 (m, 1H), 3.57-3.51 (m, 1H), 3.42-3.33 (m, 1H), 3.27-3.09 (m, 1H), 2.79-2.48 (m, 1H), 2.43-2.32 (m, 1H), 1.87-1.77 (m, 2H), 1.71-1.08 (m, 6H).

Example 4 to Example 20 in Table 1 were prepared as described by the general procedure given for Examples 1-3.

TABLE 1

| Ex # | Structure | Name | LC/MS Rt (min) | LC/MS Method | M + H (obs ion) |
|---|---|---|---|---|---|
| 4 | | ((7R)-7-amino-2-azabicyclo[2.2.1]heptan-2-yl)((Z)-2⁷-methoxy-1¹H,2¹H,4¹H-2(2,1)-benzo[d]imidazola-1(2,1)-indola-4(4,1)-pyrazolacyclodecaphane-2⁵-yl)methanone | 1.36 | 2 | 564 |
| 5 | | ((3R,5R)-3-amino-5-fluoropiperidin-1-yl)((Z)-2⁷-methoxy-1¹H,2¹H,4¹H-2(2,1)-benzo[d]imidazola-1(2,1)-indola-4(4,1)-pyrazolacycloundecaphane-2⁵-yl)methanone | 2.38 | 2 | 584 |
| 6 | | ((7R)-7-amino-2-azabicyclo[2.2.1]heptan-2-yl)((Z)-2⁷-methoxy-1¹H,2¹H,4¹H-2(2,1)-benzo[d]imidazola-1(2,1)-indola-4(4,1)-pyrazolacycloundecaphane-2⁵-yl)methanone | 1.66 | 2 | 578 |
| 7 | | ((3R,5R)-3-amino-5-fluoropiperidin-1-yl)((Z)-2⁷-methoxy-1¹H,2¹H,4¹H-2(2,1)-benzo[d]imidazola-1(2,1)-indola-4(4,1)-pyrazolacyclodecaphane-2⁵-yl)methanone | 1.36 | 2 | 570 |

TABLE 1-continued

| Ex # | Structure | Name | LC/MS Rt (min) | LC/MS Method | M + H (obs ion) |
|---|---|---|---|---|---|
| 8 | | ((3R,5R)-3-amino-5-fluoropiperidin-1-yl)((Z)-$2^7$-methoxy-$1^1$H,$2^1$H,$4^1$H-1,2(2,1)-dipyrrolo[2,3-b]pyridina-4(4,1)-pyrazolacyclodecaphane-$2^5$-yl)methanone | 1.37 | 2 | 571 |
| 9 | | ((3R,5R)-3-amino-5-fluoropiperidin-1-yl)((Z)-$2^7$-methoxy-$1^1$H,$2^1$H,$4^1$H-1,2(2,1)-dipyrrolo[2,3-b]pyridina-4(4,1)-pyrazolacycloundecaphane-$2^5$-yl)methanone | 1.21 | 2 | 585 |
| 10 | | ((7R)-7-amino-2-azabicyclo[2.2.1]heptan-2-yl)((Z)-$2^7$-methoxy-$1^1$H,$2^1$H,$4^1$H-1,2(2,1)-dipyrrolo[2,3-b]pyridina-4(4,1)-pyrazolacycloundecaphane-$2^5$-yl)methanone | 1.17 | 2 | 579 |
| 11 | | ((R)-3-aminopiperidin-1-yl)((Z)-$2^7$-methoxy-$1^1$H,$2^1$H,$4^1$H-1,2(2,1)-dipyrrolo[2,3-b]pyridina-4(4,1)-pyrazolacyclodecaphane-$2^5$-yl)methanone | 1.28 | 2 | 553 |

TABLE 1-continued

| Ex # | Structure | Name | LC/MS Rt (min) | LC/MS Method | M + H (obs ion) |
|---|---|---|---|---|---|
| 12 | | ((7R)-7-amino-2-azabicyclo[2.2.1]heptan-2-yl)((E)-2$^7$-methoxy-1$^1$H,2$^1$H,4$^1$H-2(2,1)-benzo[d]imidazola-1(2,1)-indola-4(3,1)-pyrazolacyclodecaphane-2$^5$-yl)methanone | 1.56 | 2 | 564 |
| 13 | | ((3R,5R)-3-amino-5-fluoropiperidin-1-yl)((E)-2$^7$-methoxy-1$^1$H,2$^1$H,4$^1$H-2(2,1)-benzo[d]imidazola-1(2,1)-indola-4(3,1)-pyrazolacyclodecaphane-2$^5$-yl) methanone | 1.60 | 2 | 570 |
| 14 | | ((7R)-7-amino-2-azabicyclo[2.2.1]heptan-2-yl)((Z)-2$^7$-methoxy-1$^1$H,2$^1$H,4$^1$H-6-oxa-2(2,1)-benzo[d]imidazola-1(2,1)-indola-4(4,1)-pyrazola-5(1,2)-benzenacyclononaphane-2$^5$-yl) methanone | 0.80 | 3 | 614 |
| 15 | | ((3R,5R)-3-amino-5-fluoropiperidin-1-yl)((Z)-2$^7$-methoxy-1$^1$H,2$^1$H,4$^1$H-6-oxa-1,2(2,1)-dipyrrolo[2,3-b]pyridina-4(4,1)-pyrazola-5(1,2)-benzenacyclononaphane-2$^5$-yl)methanone | 0.73 | 3 | 621 |

TABLE 1-continued

| Ex # | Structure | Name | LC/MS Rt (min) | LC/MS Method | M + H (obs ion) |
|---|---|---|---|---|---|
| 16 | | ((7R)-7-amino-2-azabicyclo[2.2.1]heptan-2-yl)((Z)-2$^7$-methoxy-1$^1$H,2$^1$H,4$^1$H-6-oxa-1,2(2,1)-dipyrrolo[2,3-b]pyridina-4(4,1)-pyrazola-5(1,2)-benzenacyclononaphane-2$^5$-yl)methanone | 0.71 | 3 | 615 |
| 17 | | ((7R)-7-amino-2-azabicyclo[2.2.1]heptan-2-yl)((E)-2$^7$-methoxy-1$^1$H,2$^1$H,4$^1$H-6-oxa-1,2(2,1)-dipyrrolo[2,3-b]pyridina-4(3,1)-pyrazola-5(1,2)-benzenacyclononaphane-2$^5$-yl) methanone | 1.43 | 5 | 615 |
| 18 | | ((3R,5R)-3-amino-5-fluoropiperidin-1-yl)((E)-2$^7$-methoxy-1$^1$H,2$^1$H,4$^1$H-6-oxa-1,2(2,1)-dipyrrolo[2,3-b]pyridina-4(3,1)-pyrazola-5(1,2)-benzenacyclononaphane-2$^5$-yl)methanone | 1.46 | 5 | 621 |

TABLE 1-continued

| Ex # | Structure | Name | LC/MS Rt (min) | LC/MS Method | M + H (obs ion) |
|---|---|---|---|---|---|
| 19 | | ((7R)-7-amino-2-azabicyclo[2.2.1]heptan-2-yl)((E)-2⁷-methoxy-1¹H,2¹H,4¹H-6-oxa-2(2,1)-benzo[d]imidazola-1(2,1)-indola-4(3,1)-pyrazola-5(1,2)-benzenacyclononaphane-2⁵-yl)methanone | 1.60 | 5 | 614 |
| 20 | | ((3R,5R)-3-amino-5-fluoropiperidin-1-yl)((E)-2⁷-methoxy-1¹H,2¹H,4¹H-6-oxa-2(2,1)-benzo[d]imidazola-1(2,1)-indola-4(3,1)-pyrazola-5(1,2)-benzenacyclononaphane-2⁵-yl)methanone | 1.63 | 5 | 620 |

Example 21

((3R,5R)-3-amino-5-fluoropiperidin-1l-yl)(2⁷-methoxy-1¹ʳH,2¹H-2(2,1)-benzo[d]imidazola-1(2,1)-indola-4(1,3),5(1,2)-dibenzenacyclononaphane-2⁵-yl)methanone

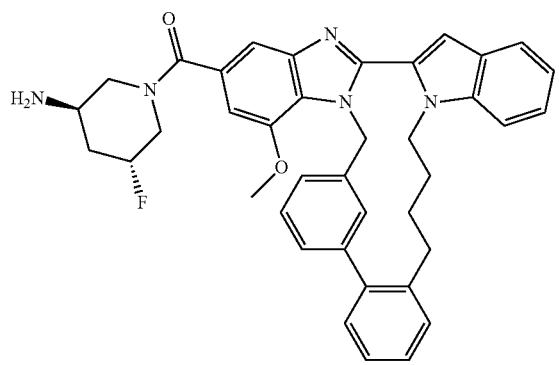

Step 1: 1-(4-(2-bromophenyl)butyl)-1H-indole-2-carbaldehyde: In a 40 mL scintillation vial, a stirring mixture of 1H-indole-2-carbaldehyde (145 mg, 0.999 mmol) and potassium carbonate (369 mg, 2.67 mmol) in anhydrous DMF (3 mL) was treated with 1-bromo-2-(4-bromobutyl)benzene (260 mg, 0.890 mmol). The vial was sealed, and the reaction was stirred at 70° C. for 5 hours, at which point it was judged to be complete by LCMS. The mixture was diluted with ethyl acetate (25 mL), and the turbid solution was washed once with water, twice with 10% lithium chloride solution, and once with brine, then dried over sodium sulfate and concentrated in vacuo. The residue was absorbed onto celite and chromatographed via MPLC over a 40 g silica gel column, eluting at 40 mL/min with a 0% to 50% ethyl acetate/hexanes gradient over 15 column volumes. Fractions containing the desired product were pooled and concentrated in vacuo to yield the title compound. ¹H NMR (499 MHz, CHLOROFORM-d) δ 9.91 (s, 1H), 7.76 (dt, J=8.1, 0.9 Hz, 1H), 7.53 (dd, J=7.9, 1.1 Hz, 1H), 7.46-7.41 (m, 2H), 7.29 (s, 1H), 7.24-7.16 (m, 3H), 7.06 (td, J=7.6, 1.9 Hz, 1H), 4.63

(t, J=7.4 Hz, 2H), 2.78 (t, J=7.7 Hz, 2H), 1.91 (dt, J=15.1, 7.6 Hz, 2H), 1.76-1.66 (m, 2H). LCMS retention time=1.17 m, MS ESI m/z=356.2 (M+H) (Method 3).

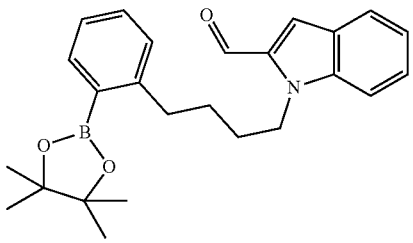 [SMILES: CC1(C)OB(c2ccccc2CCCCn2c(C=O)cc3ccccc32)OC1(C)C]

Step 2: 1-(4-(2-(4,4,5,5-tetramethyl-1,3,2-dioxaborolan-2-yl)phenyl)butyl)-1H-indole-2-carbaldehyde: In a 40 mL scintillation vial, a mixture of 1-(4-(2-bromophenyl)butyl)-1H-indole-2-carbaldehyde (235 mg, 0.660 mmol), 4,4,4',4',5,5,5',5'-octamethyl-2,2'-bi(1,3,2-dioxaborolane) (201 mg, 0.792 mmol), potassium acetate (129 mg, 1.319 mmol), and PdCl$_2$(dppf)-dichloromethane adduct (48.3 mg, 0.066 mmol) in dioxane (4 mL) was degassed with bubbling nitrogen for 10 minutes. The vial was sealed, and the reaction was stirred at 85° C. for 18 hours, at which point it was judged to be complete by LCMS. The mixture was diluted with ethyl acetate (5 mL) and filtered, and the filtrate was concentrated in vacuo. The residue was chromatographed via MPLC over a 40 g silica gel column, eluting at 40 mL/min with a 0% to 50% ethyl acetate/hexanes gradient over 16 column volumes. Fractions containing the desired product were pooled and concentrated in vacuo to yield the title compound (220 mg, 0.545 mmol, 83% yield). $^1$H NMR (400 MHz, CHLOROFORM-d) δ 9.89 (s, 1H), 7.83-7.71 (m, 2H), 7.43-7.40 (m, 2H), 7.37-7.32 (m, 1H), 7.27 (s, 1H), 7.22-7.13 (m, 3H), 4.61 (t, J=7.4 Hz, 2H), 2.99-2.86 (m, 2H), 1.89 (quin, J=7.5 Hz, 2H), 1.70-1.59 (m, 2H), 1.31 (s, 12H). LCMS retention time=1.28 m, MS ESI m/z=404.4 (M+H) (Method 3).

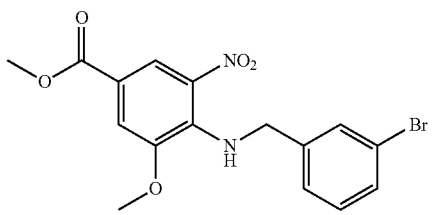 [SMILES: COC(=O)c1cc(OC)c(NCc2cccc(Br)c2)c([N+](=O)[O-])c1]

Step 3: methyl 4-((3-bromobenzyl)amino)-3-methoxy-5-nitrobenzoate: A stirring solution of methyl 4-chloro-3-methoxy-5-nitrobenzoate (1.79 g, 7.29 mmol) and Hunig's base (2.55 mL, 14.58 mmol) in DMF (15 mL) was treated with (3-bromophenyl)methanamine (2.71 g, 14.58 mmol). The reaction was stirred at room temperature for 60 hours. LCMS indicated that the reaction had not gone to completion. The mixture was treated with (3-bromophenyl)methanamine (2.71 g, 14.58 mmol), and the reaction was stirred at 50° C. for 24 hours, at which point it was judged to be complete by LCMS. The mixture was concentrated in vacuo, and the residue was taken up in ethyl acetate (200 mL). The turbid solution was washed once with water, twice with 10% lithium chloride, and once with brine, then dried over sodium sulfate and concentrated in vacuo. The residue was chromatographed via MPLC over a 220 g silica gel column, eluting at 100 mL/min with a 20% to 40% ethyl acetate/hexanes gradient over 12 column volumes. Fractions containing the desired product were pooled and concentrated in vacuo to yield the title compound (2.23 g, 5.64 mmol, 77% yield). $^1$H NMR (499 MHz, CHLOROFORM-d) δ 8.56-8.47 (m, 2H), 7.52 (d, J=1.7 Hz, 1H), 7.47 (s, 1H), 7.45-7.40 (m, 1H), 7.26-7.22 (m, 2H), 4.85 (d, J=6.2 Hz, 2H), 3.92 (s, 3H), 3.83 (s, 3H). LCMS retention time=1.04 m, MS ESI m/z=395.2 (M+H) (Method 3).

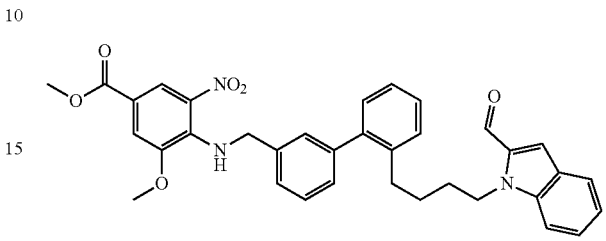

Step 4: methyl 4-(((2'-(4-(2-formyl-1H-indol-1-yl)butyl)-[1,1'-biphenyl]-3-yl)methyl)amino)-3-methoxy-5-nitrobenzoate: In a two dram vial, a stirring mixture of methyl 4-((3-bromobenzyl)amino)-3-methoxy-5-nitrobenzoate (184 mg, 0.466 mmol), 1-(4-(2-(4,4,5,5-tetramethyl-1,3,2-dioxaborolan-2-yl)phenyl)butyl)-1H-indole-2-carbaldehyde (188 mg, 0.466 mmol), and 2 M potassium phosphate, tribasic (0.932 mL, 1.864 mmol) in dioxane (4 mL) was degassed with bubbling nitrogen for 10 minutes. XPhos-Pd G2 (35.8 mg, 0.047 mmol) was added, and degassing was continued for another 10 minutes. At this point, the volume of the solution was reduced by about half. The vial was sealed, and the reaction was stirred at 50° C. for 6 hours, at which point it was judged to be complete by LCMS. The mixture was diluted with ethyl acetate and filtered. The filtrate was washed twice with water and once with brine, then dried over sodium sulfate and concentrated in vacuo. The residue was chromatographed via MPLC over a 40 g silica gel column, eluting at 40 mL/min with a 0% to 100% ethyl acetate/hexanes gradient over 15 column volumes. Fractions containing the desired product were pooled and concentrated in vacuo to yield the title compound (171 mg, 0.289 mmol, 62.0% yield). $^1$H NMR (499 MHz, CHLOROFORM-d) δ 9.83 (s, 1H), 8.54-8.43 (m, 2H), 7.73 (d, J=8.1 Hz, 1H), 7.48 (d, J=1.7 Hz, 1H), 7.40-7.33 (m, 2H), 7.30-7.29 (m, 1H), 7.28-7.21 (m, 6H), 7.19-7.14 (m, 3H), 4.89 (d, J=5.8 Hz, 2H), 4.43 (t, J=7.3 Hz, 2H), 3.91 (s, 3H), 3.82 (s, 3H), 2.64-2.52 (m, 2H), 1.67 (dt, J=14.9, 7.6 Hz, 2H), 1.51-1.41 (m, 2H). LCMS retention time=1.28 m, MS ESI m/z=592.5 (M+H) (Method 3).

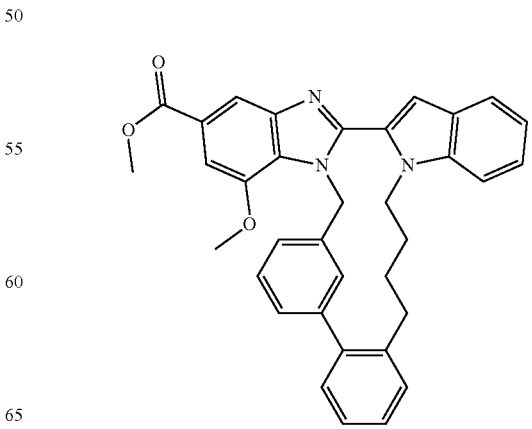

Step 5: methyl $2^7$-methoxy-$1^1$H,$2^1$H-2(2,1)-benzo[d]imidazola-1(2,1)-indola-4(1,3),5(1,2)-dibenzenacyclononaphane-$2^5$-carboxylate: In a 2-dram vial, a stirring suspension of methyl 4-(((2'-(4-(2-formyl-1H-indol-1-yl)butyl)-[1,1'-biphenyl]-3-yl)methyl)amino)-3-methoxy-5-nitrobenzoate (122 mg, 0.206 mmol) in 2:1 EtOH/water (20 mL) was treated with sodium dithionite (264 mg, 2.062 mmol). The reaction was stirred at 80° C. for 2 hours. LCMS detected 5:1 starting material/product. After stirring for an additional 2 hours at 80° C. LCMS detected the same ratio. The mixture was cooled to room temperature and treated with sodium dithionite (134 mg, 1.048 mmol). The vial was sealed, and the reaction was stirred at 80° C. for 2 hours, at which point it was judged to be complete by LCMS. Some of the ethanol was evaporated, and the remaining mixture was poured into ethyl acetate (25 mL). The turbid solution was washed 3× with water and once with brine, then dried over sodium sulfate and concentrated in vacuo. The residue was chromatographed via MPLC over a 12 g silica gel column, eluting at 30 mL/min with 20% ethyl acetate/hexanes. Fractions containing the desired product were pooled and concentrated in vacuo to yield the title compound (55 mg, 0.102 mmol, 49.2% yield) as an amber solid. $^1$H NMR (499 MHz, CHLOROFORM-d) δ 8.18 (d, J=1.3 Hz, 1H), 7.68 (d, J=7.9 Hz, 1H), 7.55 (d, J=1.2 Hz, 1H), 7.47 (d, J=8.0 Hz, 1H), 7.40 (d, J=8.3 Hz, 1H), 7.28-7.23 (m, 2H), 7.19-7.09 (m, 4H), 7.08-7.02 (m, 4H), 6.63 (s, 1H), 6.29 (d, J=15.1 Hz, 1H), 6.06 (d, J=15.1 Hz, 1H), 5.29 (dt, J=14.5, 4.7 Hz, 1H), 4.31 (ddd, J=14.2, 10.1, 3.8 Hz, 1H), 4.17 (s, 3H), 3.98 (s, 3H), 2.26 (ddd, J=13.3, 11.1, 6.3 Hz, 1H), 2.01 (ddd, J=13.5, 10.3, 3.5 Hz, 1H), 1.36-1.17 (m, 2H), 0.84-0.71 (m, 1H). LCMS retention time=1.20 m, MS ESI m/z=542.4 (M+H) (Method 3).

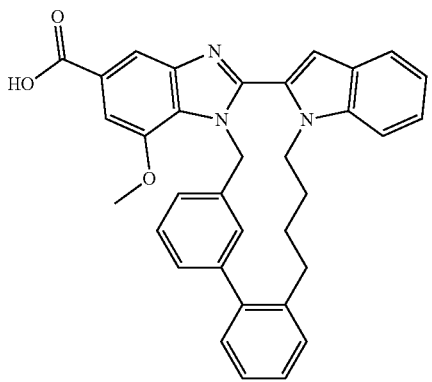 [SMILES: COc1cc(C(=O)O)cc2nc3n(c12)Cc1cccc(c1)-c1ccccc1CCCCn1c-3cc2ccccc21]

Step 6: $2^7$-methoxy-$1^1$H,$2^1$H-2(2,1)-benzo[d]imidazola-1(2,1)-indola-4(1,3),5(1,2)-dibenzenacyclononaphane-$2^5$-carboxylic acid (55 mg, 0.102 mmol) in THF (1 mL) was treated with 0.5 M lithium hydroxide (0.406 mL, 0.203 mmol). The reaction was stirred over night at 50° C., at which point it was judged to be complete by LCMS. The mixture was adjusted to pH 5 with 1M HCl, and extracted 3× with ethyl acetate. The combined organic phases were washed once with brine, dried over sodium sulfate, and concentrated in vacuo to yield the title compound (46 mg, 0.087 mmol, 86% yield). LCMS retention time=1.10 m, MS ESI m/z=528.5 (M+H) (Method 3).

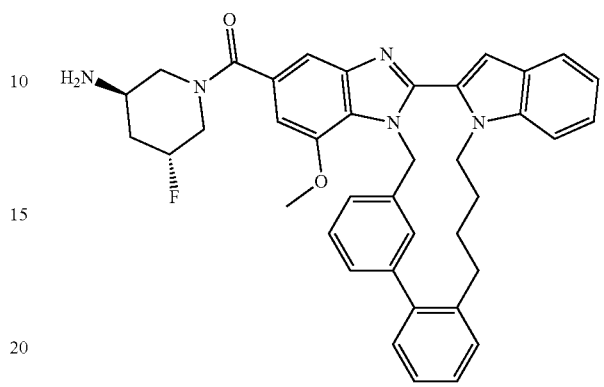

Step 7: Example 21, A stirring solution of $2^7$-methoxy-$1^1$H,$2^1$H-2(2,1)-benzo[d]imidazola-1(2,1)-indola-4(1,3),5(1,2)-dibenzenacyclononaphane-$2^5$-carboxylic acid (19 mg, 0.036 mmol), tert-butyl ((3R,5R)-5-fluoropiperidin-3-yl)carbamate (8.65 mg, 0.040 mmol), and triethylamine (0.015 mL, 0.108 mmol) was treated with BOP (17.52 mg, 0.040 mmol). The reaction was allowed to come to room temperature and stirred for 4 hours, at which point it was judged to be complete by LCMS. The mixture was treated with 4M HCl in dioxane (1 mL), and the reaction was stirred at room temperature for 1 hour, at which point it was judged be complete by LCMS. The mixture was concentrated in vacuo. The crude material was purified via preparative LC/MS with the following conditions: Column: XBridge C18, 200 mm×19 mm, 5-μm particles; Mobile Phase A: 5:95 acetonitrile:water with 0.05% trifluoroacetic acid; Mobile Phase B: 95:5 acetonitrile:water with 0.05% trifluoroacetic acid; Gradient: a 0-minute hold at 33% B, 33-73% B over 20 minutes, then a 0-minute hold at 100% B; Flow Rate: 20 mL/min; Column Temperature: 25 C. Fraction collection was triggered by MS and UV signals. Fractions containing the desired product were combined and dried via centrifugal evaporation. The purified material was then diluted with DMF, treated with Si-Pyridine and shaken for a minimum of 2 h. The resulting mixture was filtered and dried via centrifugal evaporation to yield the title compound (20.9 mg, 0.033 mmol, 92% yield). $^1$H NMR (500 MHz, DMSO-$d_6$) δ 7.65 (d, J=7.6 Hz, 1H), 7.59 (br t, J=8.2 Hz, 2H), 7.44-7.32 (m, 3H), 7.24 (br t, J=7.8 Hz, 1H), 7.18-7.02 (m, 5H), 7.00-6.95 (m, 2H), 6.48 (s, 1H), 6.26-6.06 (m, 2H), 5.23-5.13 (m, 1H), 5.08-4.90 (m, 1H), 4.40 (br t, J=11.0 Hz, 1H), 4.14 (s, 3H), 2.43-2.34 (m, 1H), 2.32-2.23 (m, 1H), 1.96-1.71 (m, 2H), 1.62-1.47 (m, 1H), 1.42-1.28 (m, 1H), 1.04-0.87 (m, 1H), 0.49-0.31 (m, 1H). MS ESI m/z 628.0 (M+H). Anal. HPLC Retention time: 2.32 minutes, (Method 1).

TABLE 2

| Ex # | Structure | Name | M + H (obs ion) | LC/MS Method | LC/MS Rt (min) |
|---|---|---|---|---|---|
| 22 | | ((1R,4R,7R)-7-amino-2-azabicyclo[2.2.1]heptan-2-yl)(2$^7$-methoxy-1$^1$H,2$^1$H-2(2,1)-benzo[d]imidazola-1(2,1)-indola-4(1,3),5(1,2)-dibenzenacyclononaphane-2$^5$-yl)methanone | 622.2 | 1 | 2.32 |
| 23 | | ((3R,5R)-3-amino-5-fluoropiperidin-1-yl)(2$^7$-methoxy-1$^1$H,2$^1$H,2(2,1)-dipyrrolo[2,3-b]pyridina-4(1,3),5(1,2)-dibenzenacyclononaphane-2$^5$-yl)methanone | 629.1 | 1 | 2.00 |
| 24 | | ((1R,4R,7R)-7-amino-2-azabicyclo[2.2.1]heptan-2-yl)(2$^7$-methoxy-1$^1$H,2$^1$H-1,2(2,1)-dipyrrolo[2,3-b]pyridina-4(1,3),5(1,2)-dibenzenacyclononaphane-2$^5$-yl)methanone | 623.1 | 1 | 2.04 |
| 25 | | ((3R,5R)-3-amino-5-fluoropiperidin-1-yl)(4$^5$-fluoro-2$^7$-methoxy-1$^1$H,2$^1$H-1,2(2,1)-dipyrrolo[2,3-b]pyridina-4(1,3),5(1,2)-dibenzenacyclononaphane-2$^5$-yl)methanone | 647.1 | 1 | 2.10 |

TABLE 2-continued

| Ex # | Structure | Name | M + H (obs ion) | LC/MS Method | LC/MS Rt (min) |
|---|---|---|---|---|---|
| 26 | | 2⁵-((3R,5R)-3-amino-5-fluoropiperidine-1-carbonyl)-2⁷-methoxy-1¹H,2¹H-1,2(2,1)-dipyrrolo[2,3-b]pyridina-4(1,3),5(1,2)-dibenzenacyclononaphane-4⁵-carbonitrile | 654.3 | 1 | 1.90 |
| 27 | | 2⁵-((1R,4R,7R)-7-amino-2-azabicyclo[2.2.1]heptane-2-carbonyl)-2⁷-methoxy-1¹H,2¹H-1,2(2,1)-dipyrrolo[2,3-b]pyridina-4(1,3),5(1,2)-dibenzenacyclononaphane-4⁵-carbonitrile | 648.3 | 1 | 1.96 |
| 28 | | 2⁵-((3R,5R)-3-amino-5-fluoropiperidine-1-carbonyl)-2⁷-methoxy-1¹H,2¹H-1,2(2,1)-dipyrrolo[2,3-b]pyridina-4(1,3),5(1,2)-dibenzenacyclononaphane-4⁵-carboxamide | 672.0 | 1 | 1.58 |
| 29 | | 2⁵-((1R,4R,7R)-7-amino-2-azabicyclo[2.2.1]heptane-2-carbonyl)-2⁷-methoxy-1¹H,2¹H-1,2(2,1)-dipyrrolo[2,3-b]pyridina-4(1,3),5(1,2)-dibenzenacyclononaphane-4⁵-carboxamide | 666.0 | 1 | 1.60 |

TABLE 2-continued

| Ex # | Structure | Name | M + H (obs ion) | LC/MS Method | LC/MS Rt (min) |
|---|---|---|---|---|---|
| 30 | | ((3R,5R)-3-amino-5-fluoropiperidin-1-yl)(2$^7$-methoxy-1$^1$H, 2$^1$H-1,2(2,1)-dipyrrolo[2,3-b]pyridina-4(3,5)-pyridina-5(1,2)-benzenacyclononaphane-2$^5$-yl)methanone | 630.1 | 1 | 1.73 |
| 31 | | ((1R,4R,7R)-7-amino-2-azabicyclo[2.2.1]heptan-2-yl)(2$^7$-methoxy-1$^1$H,2$^1$H-1,2(2,1)-dipyrrolo[2,3-b]pyridina-4(3,5)-pyridina-5(1,2)-benzenacyclononaphane-2$^5$-yl)methanone | 623.9 | 1 | 1.81 |
| 32 | | ((1R,4R,7R)-7-amino-2-azabicyclo[2.2.1]heptan-2-yl)(2$^7$-methoxy-1$^1$H,2$^1$H-1,2(2,1)-dipyrrolo[2,3-b]pyridina-4(2,4)-pyridina-5(1,2)-benzenacyclononaphane-2$^5$-yl)methanone | 624.2 | 1 | 1.81 |
| 33 | | ((3R,5R)-3-amino-5-fluoropiperidin-1-yl)(2$^7$-methoxy-1$^1$H,2$^1$H-6-oxa-1,2(2,1)-dipyrrolo[2,3-b]pyridina-4(1,3),5(1,2)-dibenzenacyclononaphane-2$^5$-yl)methanone | 631.4 | 1 | 1.95 |

TABLE 2-continued

| Ex # | Structure | Name | M + H (obs ion) | LC/MS Method | LC/MS Rt (min) |
|---|---|---|---|---|---|
| 34 | | ((1R,4R,7R)-7-amino-2-azabicyclo[2.2.1]heptan-2-yl)(2$^7$-methoxy-1$^1$H,2$^1$H-6-oxa-1,2(2,1)-dipyrrolo[2,3-b]pyridina-4(1,3),5(1,2)-dibenzenacyclononaphane-2$^5$-yl)methanone | 625.4 | 1 | 1.96 |
| 35 | | ((3R,5R)-3-amino-5-fluoropiperidin-1-yl)(2$^7$-methoxy-1$^1$H,2$^1$H-6-oxa-1,2(2,1)-dipyrrolo[2,3-b]pyridina-4(3,5)-pyridina-5(1,2)-benzenacyclononaphane-2$^5$-yl)methanone | 632.2 | 1 | 1.65 |
| 36 | | ((1R,4R,7R)-7-amino-2-azabicyclo[2.2.1]heptan-2-yl)(2$^7$-methoxy-1$^1$H,2$^1$H-6-oxa-1,2(2,1)-dipyrrolo[2,3-b]pyridina-4(3,5)-pyridina-5(1,2)-benzenacyclononaphane-2$^5$-yl)methanone | 626.2 | 1 | 1.70 |

The following compounds can be made by the procedures described in Example 21, substituting 1H-pyrrolo[2,3-b]pyridine-2-carbaldehyde for 1H-indole-2-carbaldehyde and/or 1-bromo-2-(3-bromopropoxy)benzene for 1-bromo-2-(4-bromobutyl)benzene in step 1, the appropriate benzylamine derivative for (3-bromophenyl)methanamine in Step 3, or tert-butyl ((1R,4R,7R)-2-azabicyclo[2.2.1]heptan-7-yl)carbamate for tert-butyl ((3R,5R)-5-fluoropiperidin-3-yl)carbamate in Example 21, step 7.

Examples 37 and 38

2⁵-((1R,4R,7R)-7-amino-2-azabicyclo[2.2.1]heptane-2-carbonyl)-2⁷-methoxy-1¹H,2¹H-1,2(2,1)-dipyrrolo[2,3-b]pyridina-4(3,1)-pyrrolidina-5(1,2)-benzenacyclononaphan-4⁵-one,TFA, (isomer one and isomer two)

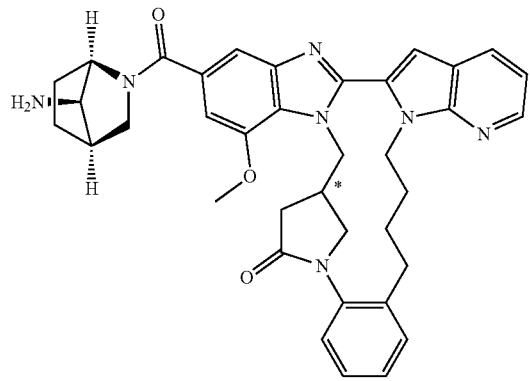

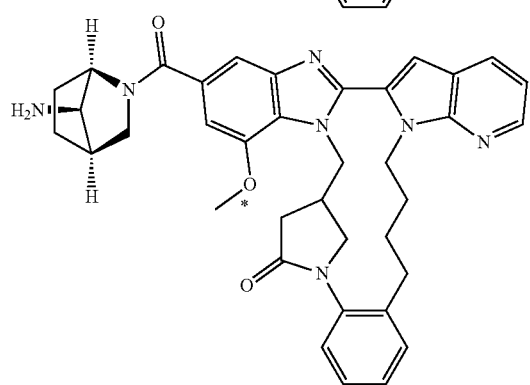

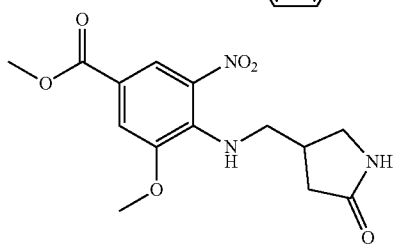

Step 1: methyl 3-methoxy-5-nitro-4-(((5-oxopyrrolidin-3-yl)methyl)amino)benzoate: The title compound was prepared using the conditions described in Example 21, step 3, substituting 4-(aminomethyl)pyrrolidin-2-one for 1H-indole-2-carbaldehyde. LCMS retention time=0.72 minutes, MS ESI m/z=324.2 (M+H) (Method 3).

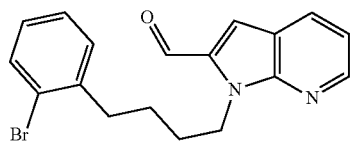 [SMILES: O=Cc1cc2cccnc2n1CCCCc1ccccc1Br]

Step 2: 1-(4-(2-bromophenyl)butyl)-1H-pyrrolo[2,3-b]pyridine-2-carbaldehyde: The title compound was prepared using the conditions described in Example 21, step 1, substituting 1H-pyrrolo[2,3-b]pyridine-2-carbaldehyde for (3-bromophenyl)methanamine. LCMS retention time=1.13 minutes, MS ESI m/z=357.1 (M+H) (Method 3).

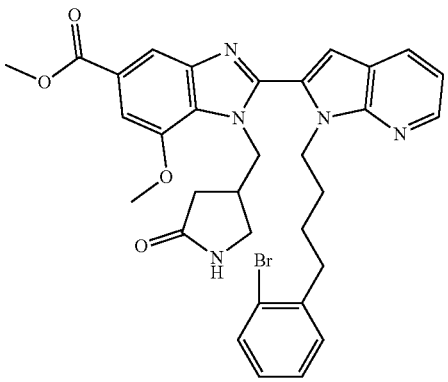 [SMILES: COC(=O)c1cc(OC)c2c(c1)nc(-c1cc3cccnc3n1CCCCc1ccccc1Br)n2CC1CNC(=O)C1]

Step 3: methyl 2-(1-(4-(2-bromophenyl)butyl)-1H-pyrrolo[2,3-b]pyridin-2-yl)-7-methoxy-1-((5-oxopyrrolidin-3-yl)methyl)-1H-benzo[d]imidazole-5-carboxylate: In a 2-dram vial, a stirring suspension of methyl 3-methoxy-5-nitro-4-(((5-oxopyrrolidin-3-yl)methyl)amino)benzoate (100 mg, 0.311 mmol) and 1-(4-(2-bromophenyl)butyl)-1H-pyrrolo[2,3-b]pyridine-2-carbaldehyde in 2:1 EtOH/water (5 mL) was treated with sodium dithionite (119 mg, 0.932 mmol). The reaction was stirred at 80° C. for 6 hours. LCMS indicated that the reaction had not gone to completion. The mixture was allowed to come to room temperature and treated with sodium dithionite (119 mg, 0.932 mmol). The reaction was stirred at 80° C. for 18 hours, at which point it was judged to be complete by LCMS. Most of the ethanol was evaporated on the rotary evaporator, and the remaining mixture was extracted 3× with ethyl acetate. The combined organic phases were washed once with brine, then dried over sodium sulfate and concentrated in vacuo. The residue was chromatographed via MPLC over a 24 g silica gel column, eluting at 40 mL/min with 1-10% methanol/dichloromethane (product eluted in 7% methanol). Fractions containing the desired product were pooled and concentrated in vacuo to yield methyl 2-(1-(4-(2-bromophenyl)butyl)-1H-pyrrolo[2,3-b]pyridin-2-yl)-7-methoxy-1-((5-oxopyrrolidin-3-yl)methyl)-1H-benzo[d]imidazole-5-carboxylate (150 mg, 0.238 mmol, 77% yield) as a colorless solid. LCMS retention time=0.95 minutes, MS ESI m/z=630.3 (M+H) (Method 3).

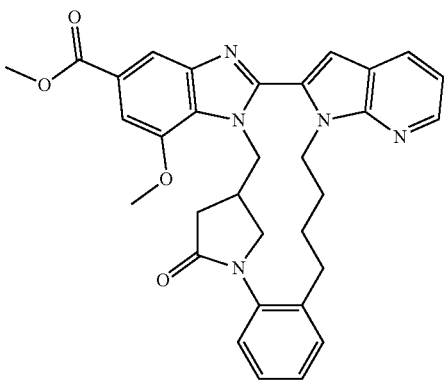 [SMILES: COC(=O)c1cc(OC)c2c(c1)nc1n2CC2CC(=O)N(C2)c2ccccc2CCCCn2c-1cc1cccnc12]

Step 4: methyl 2⁷-methoxy-4⁵-oxo-1¹H,2'H-1,2(2,1)-dipyrrolo[2,3-b]pyridina-4(3,1)-pyrrolidina-5(1,2)-benzenacyclononaphane-2⁵-carboxylate: A stirring mixture of methyl 2-(1-(4-(2-bromophenyl)butyl)-1H-pyrrolo[2,3-b]pyridin-2-yl)-7-methoxy-1-((5-oxopyrrolidin-3-yl)methyl)-1H-benzo[d]imidazole-5-carboxylate (117 mg, 0.186 mmol), xantphos (32.2 mg, 0.056 mmol), Pd₂(dba)₃ (16.99 mg, 0.019 mmol), and cesium carbonate (91 mg, 0.278 mmol) in dioxane (5 mL) was degassed with bubbling nitrogen for 10 minutes. The vial was sealed, and the reaction was stirred at 110° C. for 18 hours, at which point it was judged to be complete by LCMS. The mixture was filtered, and the filtrate was concentrated in vacuo. The residue was chromatographed via MPLC over a 24 g silica gel column, eluting at 40 mL/min with a 1% to 7% methanol/dichloromethane gradient over 15 column volumes. Fractions containing the desired product were pooled and concentrated in vacuo to yield the title compound (80 mg, 0.146 mmol, 78% yield). LCMS retention time=0.89 minutes, MS ESI m/z=550.3 (M+H) (Method 3).

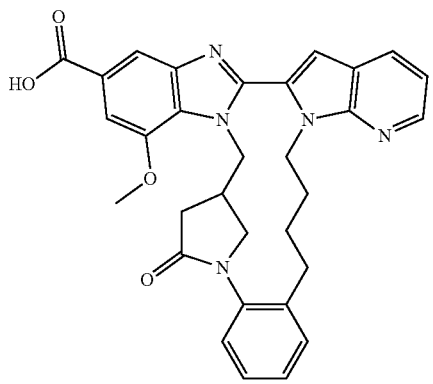 [SMILES: COc1cc(C(=O)O)cc2nc3n(c12)CC1CC(=O)N(C1)c1ccccc1CCCCn1c-3cc2cccnc21]

Step 5: 2⁷-methoxy-4⁵-oxo-1¹H,2¹H-1,2(2,1)-dipyrrolo[2,3-b]pyridina-4(3,1)-pyrrolidina-5(1,2)-benzenacyclononaphane-2⁵-carboxylic acid: The title compound was prepared from methyl 2⁷-methoxy-4⁵-oxo-1¹H,2¹H-1,2(2,1)-dipyrrolo[2,3-b]pyridina-4(3,1)-pyrrolidina-5(1,2)-benzenacyclononaphane-2⁵-carboxylate using the conditions described in Example 21, step 6. LCMS retention time=0.78 minutes, MS ESI m/z=536.3 (M+H) (Method 3).

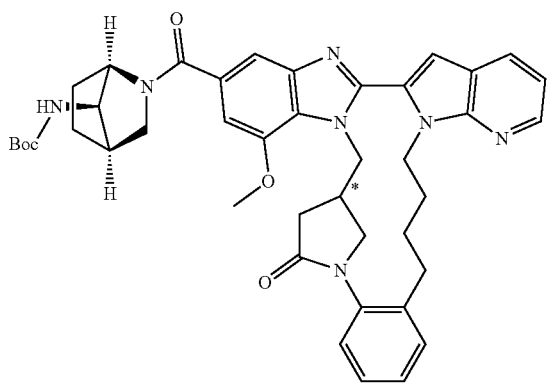

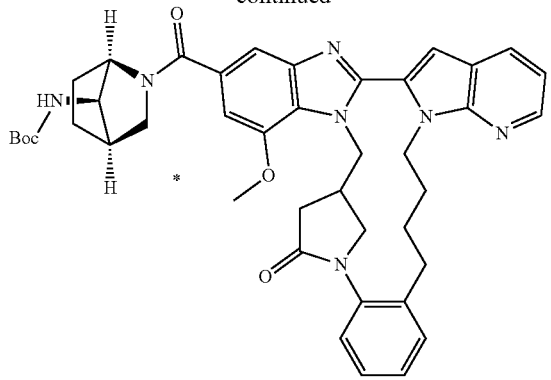

Step 6: tert-butyl ((1R,4R,7R)-2-(2⁷-methoxy-4⁵-oxo-1¹H,2'H-1,2(2,1)-dipyrrolo[2,3-b]pyridina-4(3,1)-pyrrolidina-5(1,2)-benzenacyclononaphane-2⁵-carbonyl)-2-azabicyclo[2.2.1]heptan-7-yl)carbamate, (isomer 1 and 2): A stirring solution of 2⁷-methoxy-4⁵-oxo-1¹H,2¹H-1,2(2,1)-dipyrrolo[2,3-b]pyridina-4(3,1)-pyrrolidina-5(1,2)-benzenacyclononaphane-2⁵-carboxylic acid (78 mg, 0.146 mmol), tert-butyl ((7R)-2-azabicyclo[2.2.1]heptan-7-yl)carbamate (34.1 mg, 0.161 mmol), and triethylamine (0.061 mL, 0.438 mmol) was treated with BOP (71.0 mg, 0.161 mmol). The reaction was allowed to come to room temperature and stirred for 4 hours, at which point it was judged to be complete by LCMS. The reaction mixture was chromatographed via MPLC over a 24 g silica gel column, eluting at 40 mL/min with a 1% to 20% [7M ammonia in methanol]/dichloromethane gradient over 15 column volumes. Fractions containing the desired product were pooled and concentrated in vacuo. The residue was taken up in ethyl acetate, and the solution was washed twice with 10% lithium chloride and once with brine, then dried over sodium sulfate and concentrated in vacuo. The residue was chromatographed via MPLC over an ISCO GOLD 40 g silica gel column, eluting at 40 mL/min with a 2% to 10% 7M ammonia in methanol]/dichloromethane gradient over 15 column volumes. Fractions containing the desired product were pooled and concentrated in vacuo to yield the title compound as a mixture of diastereomers (77 mg, 0.105 mmol, 72.3% yield). LCMS retention time=0.87 minutes, MS ESI m/z=730.5 (M+H) (Method 3). The isomers were resolved by SFC using the conditions described below to yield 37 mg of isomer 1 (first eluting), LCMS retention time=0.87 minutes, MS ESI m/z=730.5 (M+H) (method 3); and 35 mg of isomer 2 (second eluting), LCMS retention time=0.87 minutes, MS ESI m/z=730.5 (M+H) (Method 3).

Preparative Chromatographic Conditions:
- Instrument: Berger SFC
- Column: AD 25×3 cm ID, 5 mm
- Temperature: 40C
- Flow rate: 85 mL/min
- Mobile Phase: 60/40 CO₂/IPA
- Detector Wavelength: 215 nm
- Injection Volume: 1000 μL
- Sample Preparation: 70 mg of the sample dissolved in 2 mL IPA/1 mlMeOH.

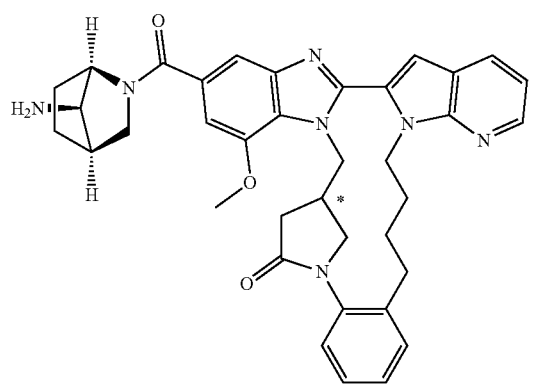 [SMILES: COc1cc(C(=O)N2C[C@H]3CC[C@@H]2[C@@H]3N)cc2nc3n(c12)CC1CC(=O)N(C1)c1ccccc1CCCCn1c-3cc2cccnc21]

Step 7-1: Example 37: A stirring solution of tert-butyl ((7R)-2-(2⁷-methoxy-4⁵-oxo-1¹H,2¹H-1,2(2,1)-dipyrrolo[2,3-b]pyridina-4(3,1)-pyrrolidina-5(1,2)-benzenacyclononaphane-2⁵-carbonyl)-2-azabicyclo[2.2.1]heptan-7-yl)carbamate, (isomer 1) (37 mg, 0.051 mmol) in dichloromethane (1 mL) was treated with TFA (1 mL). The reaction was stirred at room temperature for 1 hour, at which point it was judged to be complete by LCMS. The mixture was concentrated 3× from dichloromethane to remove residual TFA, and the crude material was purified via preparative LC/MS with the following conditions: Column: XBridge C18, 200 mm×19 mm, 5-μm particles; Mobile Phase A: 5:95 acetonitrile:water with 0.05% trifluoroacetic acid; Mobile Phase B: 95:5 acetonitrile:water with 0.05% trifluoroacetic acid; Gradient: a 0-minute hold at 11% B, 11-51% B over 20 minutes, then a 0-minute hold at 100% B; Flow Rate: 20 mL/min; Column Temperature: 25 C. Fraction collection was triggered by MS and UV signals. Fractions containing the desired product were combined and dried via centrifugal evaporation. The purified material was then diluted with a 1:1 mixture of ethylene dichloride and methanol, treated with Si-Pyridine and shaken for a minimum of 2 h. The resulting mixture was filtered and dried via centrifugal evaporation to yield the title compound (23.4 mg, 0.031 mmol, 62.1% yield). ¹H NMR (500 MHz, DMSO-d₆) (rotomers) δ 8.46 (br d, J=4.9 Hz, 0.3H), 8.32 (d, J=3.4 Hz, 0.7H), 8.13 (br d, J=7.6 Hz, 0.3H), 8.06 (br d, J=7.5 Hz, 0.7H), 7.66-7.55 (m, 0.3H), 7.51-7.41 (m, 0.7H), 7.27 (s, 1H), 7.18-6.98 (m, 6H), 5.33-4.71 (m, 3.7H), 4.55 (br s, 0.3H), 4.24 (br s, 0.5H), 4.06 (br s, 2.5H), 3.87-3.61 (m, 1H), 3.54 (br s, 3H), 3.35-3.15 (m, 2H), 2.79-2.67 (m, 1H), 2.39-2.23 (m, 1H), 2.14-1.66 (m, 6H), 1.55-1.41 (m, 1H), 1.27-1.08 (m, 1H), 0.60-0.42 (m, 1H). MS ESI m/z 630.0 (M+H). Anal. HPLC Retention time: 1.52 minutes, (Method 1).

Step 7-2: Example 38: A stirring solution of tert-butyl ((7R)-2-(2⁷-methoxy-4⁵-oxo-1¹H,2¹H-1,2(2,1)-dipyrrolo[2,3-b]pyridina-4(3,1)-pyrrolidina-5(1,2)-benzenacyclononaphane-2⁵-carbonyl)-2-azabicyclo[2.2.1]heptan-7-yl)carbamate, (isomer 2) (37 mg, 0.051 mmol) in dichloromethane (1 mL) was treated with TFA (1 mL). The reaction was stirred at room temperature for 1 hour, at which point it was judged to be complete by LCMS. The mixture was concentrated 3× from dichloromethane to remove residual TFA, and the crude material was purified via preparative LC/MS with the following conditions: Column: XBridge C18, 200 mm×19 mm, 5-μm particles; Mobile Phase A: 5:95 acetonitrile:water with 0.05% trifluoroacetic acid; Mobile Phase B: 95:5 acetonitrile:water with 0.05% trifluoroacetic acid; Gradient: a 0-minute hold at 11% B, 11-51% B over 20 minutes, then a 0-minute hold at 100% B; Flow Rate: 20 mL/min; Column Temperature: 25° C. Fraction collection was triggered by MS and UV signals. Fractions containing the desired product were combined and dried via centrifugal evaporation. The purified material was then diluted with a 1:1 mixture of ethylene dichloride and methanol (EDM), treated with Si-Pyridine and shaken for a minimum of 2 h. The resulting mixture was filtered and dried via centrifugal evaporation to yield the title compound (26.0 mg, 0.035 mmol, 69% yield). ¹H NMR (500 MHz, DMSO-d₆) (rotomers) δ 8.46 (br s, 0.2H), 8.32 (br d, J=3.7 Hz, 0.8H), 8.14 (br d, J=7.9 Hz, 0.2H), 8.07 (br d, J=7.9 Hz, 0.8H), 7.65-7.55 (m, 0.4H), 7.51-7.41 (m, 0.6H), 7.31-7.26 (m, 1H), 7.20-6.99 (m, 7H), 5.31-4.86 (m, 4H), 4.61-4.52 (m, 0.4H), 4.34-4.18 (m, 0.6H), 4.06 (br s, 3H), 3.63-3.56 (m, 1H), 3.47-3.13 (m, 3H), 2.86-2.59 (m, 2H), 2.49-2.22 (m, 2H), 2.09-1.61 (m, 8H), 1.55-1.13 (m, 3H), 0.67-0.36 (m, 1H). MS ESI m/z 630.2 (M+H). Anal. HPLC Retention time: 1.44 minutes, (Method 1).

Example 39

((1R,4R,7R)-7-amino-2-azabicyclo[2.2.1]heptan-2-yl)((cis)-6,7-dihydroxy-2⁷-methoxy-1¹H,2¹H-1,2(2,1)-dipyrrolo[2,3-b]pyridina-4(1,3),5(1,2)-dibenzenacyclononaphane-2⁵-yl)methanone, (isomer 1)

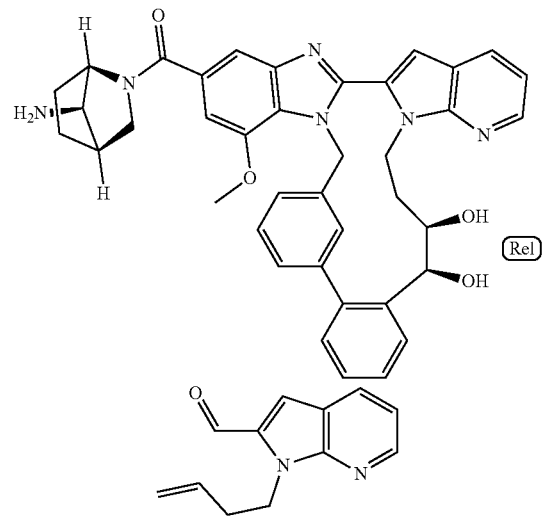

Step 1: 1-(but-3-en-1-yl)-1H-pyrrolo[2,3-b]pyridine-2-carbaldehyde: The title compound was prepared from 1H-pyrrolo[2,3-b]pyridine-2-carbaldehyde and 4-Bromo-1-butene using the conditions described in Example 21, step 1. LCMS retention time=0.86 minutes, MS ESI m/z=201.1 (M+H) (Method 3).

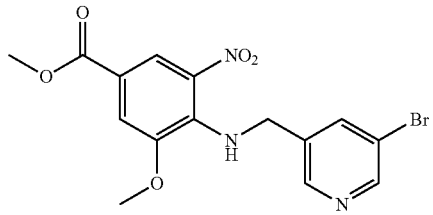 [SMILES: COC(=O)c1cc(OC)c(NCc2cncc(Br)c2)c([N+](=O)[O-])c1]

Step 2: methyl 4-(((5-bromopyridin-3-yl)methyl)amino)-3-methoxy-5-nitrobenzoate: The title compound was prepared using the conditions described in Example 21, step 3, substituting (5-bromopyridin-3-yl)methanamine for (3-bromophenyl)methanamine. LCMS retention time=0.91 minutes, MS ESI m/z=396.1 (M+H) (Method 3).

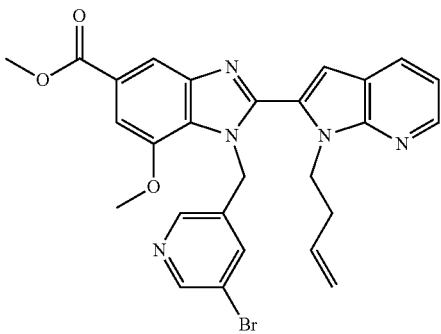 [SMILES: C=CCCn1c(-c2nc3cc(C(=O)OC)cc(OC)c3n2Cc2cncc(Br)c2)cc2cccnc21]

Step 3: methyl 1-((5-bromopyridin-3-yl)methyl)-2-(1-(but-3-en-1-yl)-1H-pyrrolo[2,3-b]pyridin-2-yl)-7-methoxy-1H-benzo[d]imidazole-5-carboxylate: The title compound was prepared from methyl 4-(((5-bromopyridin-3-yl)methyl)amino)-3-methoxy-5-nitrobenzoate and 1-(but-3-en-1-yl)-1H-pyrrolo[2,3-b]pyridine-2-carbaldehyde using the conditions described in Example DG17, step 3. LCMS retention time=1.07 minutes, MS ESI m/z=546.3 (M+H) (Method 3).

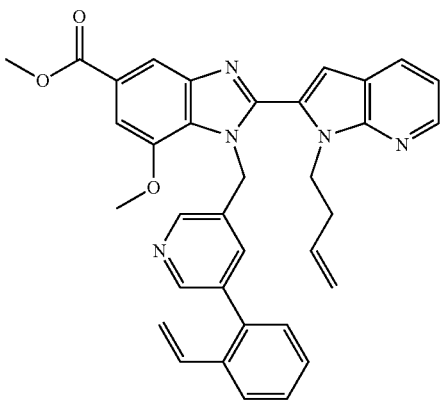 [SMILES: C=CCCn1c(-c2nc3cc(C(=O)OC)cc(OC)c3n2Cc2cncc(-c3ccccc3C=C)c2)cc2cccnc21]

Step 4: methyl 2-(1-(but-3-en-1-yl)-1H-pyrrolo[2,3-b]pyridin-2-yl)-7-methoxy-1-((5-(2-vinylphenyl)pyridin-3-yl)methyl)-1H-benzo[d]imidazole-5-carboxylate: In a two dram vial, a stirring mixture of methyl 1-((5-bromopyridin-3-yl)methyl)-2-(1-(but-3-en-1-yl)-1H-pyrrolo[2,3-b]pyridin-2-yl)-7-methoxy-1H-benzo[d]imidazole-5-carboxylate (189 mg, 0.346 mmol), (2-vinylphenyl)boronic acid (77 mg, 0.519 mmol), and 2 M potassium phosphate, tribasic (0.692 mL, 1.384 mmol) in dioxane (4 mL) was degassed with bubbling nitrogen for 10 minutes. XPhos-Pd G2 (26.6 mg, 0.035 mmol) was added, and degassing was continued for another 10 minutes. At this point, the volume of the solution was reduced by about half. The vial was sealed, and the reaction was stirred at 50° C. for 6 hours, and at room temperature for 14 hours, at which point it was judged to be complete by LCMS. The mixture was diluted with ethyl acetate (20 mL) and filtered, and the filtrate was washed 3× with water and once with brine. The combined aqueous phases were extracted once with ethyl acetate, and the combined organic phases were dried over sodium sulfate and concentrated in vacuo. The residue was chromatographed via MPLC over a 40 g silica gel column, eluting at 40 mL/min with 20% to 100% ethyl acetate/hexanes gradient over 10 column volumes to elute the desired product. Fractions containing the desired product were pooled and concentrated in vacuo to yield the title compound (170 mg, 0.298 mmol, 86% yield). LCMS retention time=0.97 minutes, MS ESI m/z=570.3 (M+H) (Method 3).

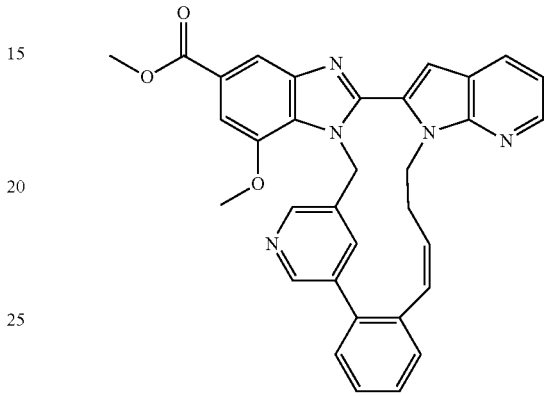

Step 5: methyl (Z)-$2^7$-methoxy-$1^1$H,$2^1$H-1,2(2,1)-dipyrrolo[2,3-b]pyridina-4(3,5)-pyridina-5(1,2)-benzenacyclononaphan-6-ene-$2^5$-carboxylate: A stirring solution of methyl 2-(1-(but-3-en-1-yl)-1H-pyrrolo[2,3-b]pyridin-2-yl)-7-methoxy-1-((5-(2-vinylphenyl)pyridin-3-yl)methyl)-1H-benzo[d]imidazole-5-carboxylate (170 mg, 0.298 mmol) in dichloroethane (50 mL) was degassed with vigorously bubbling nitrogen for 15 minutes. The mixture was treated with dichloro[1,3-bis(2,4,6-trimethylphenyl)-2-imidazolidinylidene][[5-[(dimethylamino)sulfonyl]-2-(1-methylethoxy-O)phenyl]methylene-C]ruthenium(II) (10.95 mg, 0.015 mmol), and degassed for an additional 5 minutes (the volume was now ~4.5 mL). The mixture was heated to 50° C. and stirred under a nitrogen atmosphere for 18 hours. LCMS indicated the reaction was not complete. The mixture was treated with dichloro[1,3-bis(2,4,6-trimethylphenyl)-2-imidazolidinylidene][[5-[(dimethylamino)sulfonyl]-2-(1-methylethoxy-O)phenyl]methylene-C]ruthenium(II) (10.95 mg, 0.015 mmol), and degassed for an additional 5 minutes. The reaction was stirred at 50° C. for 6 hours. LCMS indicated the reaction was not complete. The mixture was treated with dichloro[1,3-bis(2,4,6-trimethylphenyl)-2-imidazolidinylidene][[5-[(dimethylamino)sulfonyl]-2-(1-methylethoxy-O)phenyl]methylene-C]ruthenium(II) (10.95 mg, 0.015 mmol), and degassed for an additional 5 minutes. The reaction was stirred at 50° C. for 6 hours, at which point it was judged to be complete by LCMS. The catalyst was removed by filtration and rinsed with dichloromethane, and the combined filtrate and rinsings were concentrated in vacuo. The residue was chromatographed via MPLC over a 24 g silica gel column, eluting at 40 mL/min with a 1% to 10% methanol/dichloromethane gradient over 24 column volumes. Fractions containing the desired product were pooled and concentrated in vacuo to the title compound (92 mg, 0.170 mmol, 56.9% yield). LCMS retention time=0.91 minutes, MS ESI m/z=542.3 (M+H) (Method 3).

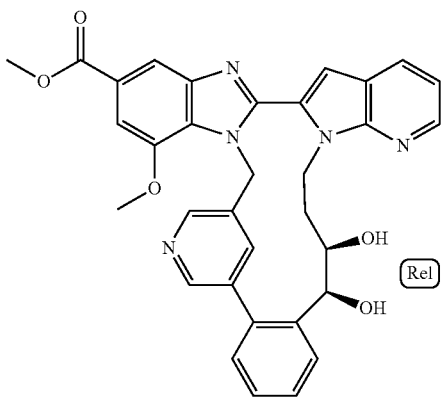 [SMILES: COC(=O)c1cc(OC)c2c(c1)nc1n2Cc2cncc(c2)-c2ccccc2[C@H](O)[C@H](O)CCn2c-1cc1cccnc12]

Step 6: methyl (cis)-6,7-dihydroxy-2⁷-methoxy-1¹H,2¹H-1,2(2,1)-dipyrrolo[2,3-b]pyridina-4(3,5)-pyridina-5(1,2)-benzenacyclononaphane-2⁵-carboxylate: A stirring suspension of methyl (Z)-2⁷-methoxy-1¹H,2¹H-1,2(2,1)-dipyrrolo[2,3-b]pyridina-4(3,5)-pyridina-5(1,2)-benzenacyclononaphan-6-ene-2-carboxylate (90 mg, 0.166 mmol) in 1:1 THF/acetone (2 mL) was cooled to 0° C. and treated with a solution of 4-methylmorpholine N-oxide (38.9 mg, 0.332 mmol) and osmium tetroxide (2.5% in t-BuOH) (0.021 mL, 1.662 μmol) in water (1 mL). The reaction was allowed to come to room temperature, and stirred for 6 hours. LCMS showed mostly starting material, and a trace of product. The organic solvents were evaporated, and the residue was treated with THF (3 mL) (homogeneous solution observed). The mixture was treated with osmium tetroxide (2.5% in t-BuOH) (0.021 mL, 1.662 μmol), and the reaction was stirred at room temperature for 3 days, at which point it was judged to be complete by LCMS. The mixture was concentrated in vacuo, and the residue was concentrated twice from isopropanol to remove residual water. The residue was adsorbed onto celite and chromatographed via MPLC over a 24 g silica gel column, eluting at 40 mL/min with a 0.5 to 10% methanol/dichloromethane gradient over 15 column volumes. Fractions containing the desired product were pooled and concentrated in vacuo to yield the title compound (43 mg, 0.075 mmol, 45.0% yield). LCMS retention time=0.74 minutes, MS ESI m/z=576.3 (M+H) (Method 3).

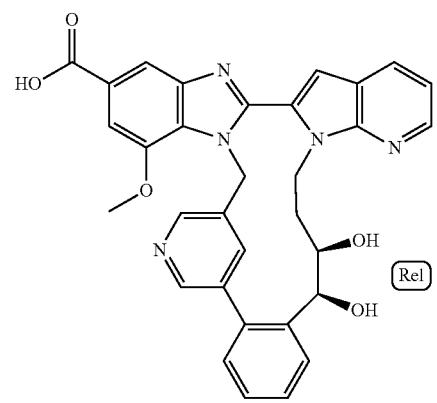 [SMILES: COc1cc(C(=O)O)cc2nc3n(c12)Cc1cncc(c1)-c1ccccc1[C@H](O)[C@H](O)CCn1c-3cc2cccnc21]

Step 7: (cis)-6,7-dihydroxy-2⁷-methoxy-1¹H,2¹H-1,2(2,1)-dipyrrolo[2,3-b]pyridina-4(3,5)-pyridina-5(1,2)-benzenacyclononaphane-2⁵-carboxylic acid: The title compound can be prepared from methyl (cis)-6,7-dihydroxy-2⁷-methoxy-1¹H,2¹H-1,2(2,1)-dipyrrolo[2,3-b]pyridina-4(3,5)-pyridina-5(1,2)-benzenacyclononaphane-2⁵-carboxylate using the procedure described in Example 21, step 6. LCMS retention time=0.67 minutes, MS ESI m/z=562.4 (M+H) (Method 3).

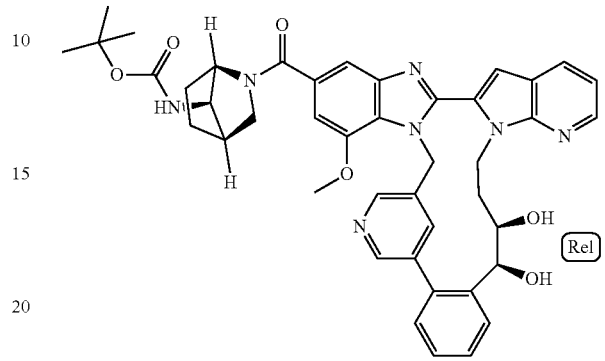

Step 8: Example 39: A stirring solution of (cis)-6,7-dihydroxy-2⁷-methoxy-1¹H,2¹H-1,2(2,1)-dipyrrolo[2,3-b]pyridina-4(3,5)-pyridina-5(1,2)-benzenacyclononaphane-2⁵-carboxylic acid (41.0 mg, 0.073 mmol), tert-butyl ((1R, 4R,7R)-1,4-dimethyl-2-azabicyclo[2.2.1]heptan-7-yl)carbamate, and triethylamine (0.031 mL, 0.219 mmol) was treated with HATU (36.1 mg, 0.095 mmol). The reaction was allowed to come to room temperature and stirred for 4 hours, at which point it was judged to be complete by LCMS. The reaction mixture was chromatographed via MPLC over a 12 g silica gel column, eluting at 30 mL/min with a 3% to 20% methanol/dichloromethane gradient over 25 column volumes. The isomers were resolved by SFC using the following conditions:

Preparative Chromatographic Conditions:
  Instrument: SFC 150
  Column: YMC SB 25×3 cm ID, 5 m
  Temperature: 40° C.
  Flow rate: 100 mL/min
  Mobile Phase: 65/35 $CO_2$/EtOH
  Detector Wavelength: 220 nm
  Injection Volume: 1 mL
  Sample Preparation: 44 mg of the sample dissolved in MeOH.

Fractions containing the first-eluting peak were pooled and concentrated in vacuo to yield (4 mg, 0.053 mmol, 14.5% yield). LCMS retention time=1.54 minutes, MS ESI m/z=756.3 (M+H) (method 6). The material was dissolved in dichloromethane (1 mL), and the solution was treated with TFA (0.25 mL). The reaction was stirred at room temperature for 1 hour, at which point it was judged to be complete by LCMS. The mixture was concentrated 3× from dichloromethane and 3× from methanol to remove residual TFA. The residue was dissolved in 1:1 dichloromethane/methanol, and the mixture was treated with 3 mg of PVP resin. The mixture was shaken for 2 hours, then filtered and concentrated. The residue was taken up in 2:1 acetonitrile/water, and the solution was freeze dried to the title compound (4 mg, 4.94 μmol, 93% yield). ¹H NMR (499 MHz, METHANOL-$d_4$) δ 8.52-8.35 (m, 2H), 8.23 (dd, J=7.9, 1.3 Hz, 1H), 7.62-7.51 (m, 2H), 7.44 (s, 1H), 7.38 (td, J=7.6, 1.0 Hz, 1H), 7.30-7.24 (m, 2H), 7.23-7.19 (m, 1H), 7.06 (d, J=7.3 Hz, 1H), 7.01 (s, 1H), 6.42 (br d, J=15.6 Hz, 1H), 6.30-6.15 (m, 1H), 5.17-4.96 (m, 2H), 4.81-4.69 (m, 1H), 4.43-4.23 (m, 3H), 4.00 (br d, J=3.1 Hz, 1H), 3.89-3.61 (m, 2H), 3.40 (br d, J=11.6 Hz, 1H), 2.90-2.62 (m, 2H), 2.20 (br d, J=13.6 Hz, 1H), 2.08-1.96 (m, 2H), 1.94-1.61 (m, 2H), 1.01-0.81 (m, 2H). MS ESI m/z 656.3 (M+H). Anal. HPLC Retention time: 0.61 minutes, (Method 3).

Example 40

21-((1R,4R,7R)-7-amino-2-azabicyclo[2.2.1]heptane-2-carbonyl)-19-methoxy-7,8,16,17-tetrahydro-6H-benzo[b]benzo[4,5]imidazo[1,2-h]pyrido[3',2':4,5]pyrrolo[2,1-j][1]oxa[4,8,11]triazacyclotetradecin-15(14H)-one

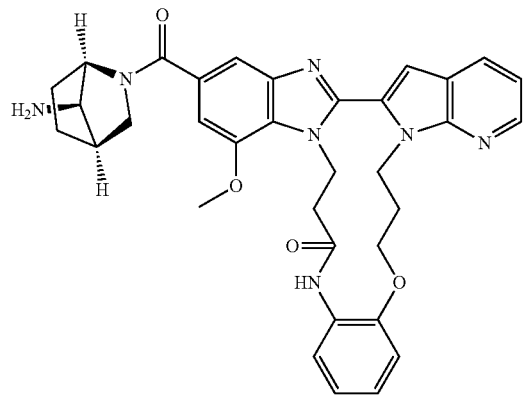

Step 1: 1-(3-(2-nitrophenoxy)propyl)-1H-pyrrolo[2,3-b]pyridine-2-carbaldehyde: The title compound can be prepared from 1H-pyrrolo[2,3-b]pyridine-2-carbaldehyde and 1-(3-bromopropoxy)-2-nitrobenzene using the conditions described in Example 21, step 1. LCMS retention time=0.94 minutes, MS ESI m/z=326.2 (M+H) (Method 3).

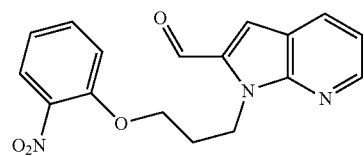

Step 2: methyl 4-((3-tert-butoxy)-3-oxopropyl)amino)-3-methoxy-5-nitrobenzoate: The title compound can be prepared from methyl 4-chloro-3-methoxy-5-nitrobenzoate and tert-butyl 3-aminopropanoate hydrochloride using the conditions described in Example 21, step 3. LCMS retention time=1.03 minutes, MS ESI m/z=355.2 (M+H) (Method 3).

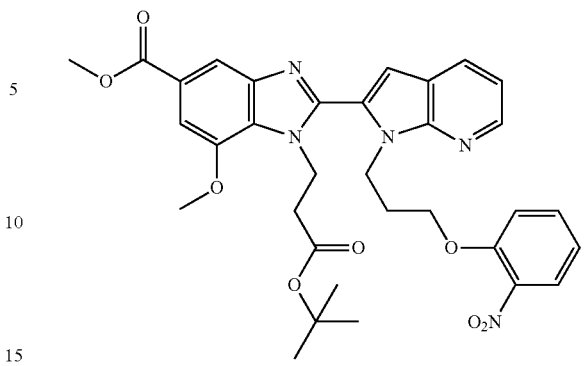

Step 3: methyl 1-(3-(tert-butoxy)-3-oxopropyl)-7-methoxy-2-(1-(3-(2-nitrophenoxy)propyl)-1H-pyrrolo[2,3-b]pyridin-2-yl)-1H-benzo[d]imidazole-5-carboxylate: The title compound can be prepared from methyl 4-((3-(tert-butoxy)-3-oxopropyl)amino)-3-methoxy-5-nitrobenzoate and 1-(3-(2-nitrophenoxy)propyl)-1H-pyrrolo[2,3-b]pyridine-2-carbaldehyde using the conditions described in Example 37, step 3. LCMS retention time=1.06 minutes, MS ESI m/z=630.4 (M+H) (Method 3).

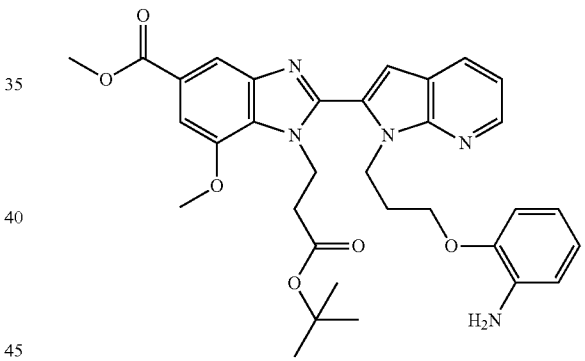

Step 4: methyl 2-(1-(3-(2-aminophenoxy)propyl)-1H-pyrrolo[2,3]-pyridin-2-yl)-1-(3-(tert-butoxy)-3-oxopropyl)-7-methoxy-1H-benzo[d]imidazole-5-carboxylate: A mixture of methyl 1-(3-(tert-butoxy)-3-oxopropyl)-7-methoxy-2-(1-(3-(2-nitrophenoxy)propyl)-1H-pyrrolo[2,3-b]pyridin-2-yl)-1H-benzo[d]imidazole-5-carboxylate (103 mg, 0.164 mmol) and 10% palladium on carbon (30 mg, 0.028 mmol) was degassed under vacuum/nitrogen 3×. The reaction was hydrogenated at 30 psi on a Parr shaker for 4 hours, at which point it was judged to be complete. The mixture was degassed 3× under vacuum/nitrogen, then the catalyst was removed by filtration and rinsed with ethyl acetate and dichloromethane. The combined filtrate and rinsings were concentrated in vacuo to yield the title compound (98 mg, 0.163 mmol, 100% yield), which was used immediately in the next step. LCMS retention time=0.89 minutes, MS ESI m/z=600.3 (M+H) (Method 3).

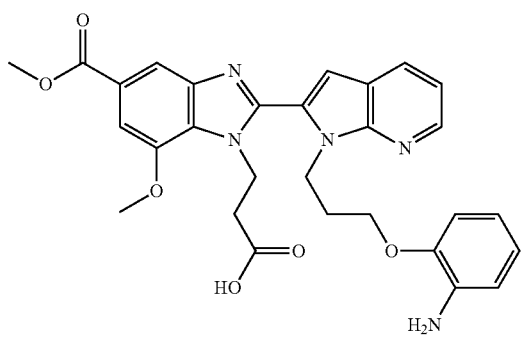 [SMILES: COC(=O)c1cc(OC)c2c(c1)nc(-c1cc3cccnc3n1CCCOc1ccccc1N)n2CCC(=O)O]

Step 5: 3-(2-(1-(3-(2-aminophenoxy)propyl)-1H-pyrrolo[2,3-b]pyridin-2-yl)-7-methoxy-5-(methoxycarbonyl)-1H-benzo[d]imidazol-1-yl)propanoic acid, 3 HCl: A stirring solution of methyl 2-(1-(3-(2-aminophenoxy)propyl)-1H-pyrrolo[2,3-b]pyridin-2-yl)-1-(3-(tert-butoxy)-3-oxopropyl)-7-methoxy-1H-benzo[d]imidazole-5-carboxylate (98 mg, 0.163 mmol) in dichloromethane (3 mL) was treated with 4M HCl in dioxane (2 mL). The reaction was stirred at room temperature for 18 hours, at which point it was judged to be complete by LCMS. The mixture was concentrated from dichloromethane 3× to yield the title compound, which was used immediately in the next step. LCMS retention time=0.71 minutes, MS ESI m/z=544.2 (M+H) (Method 3)

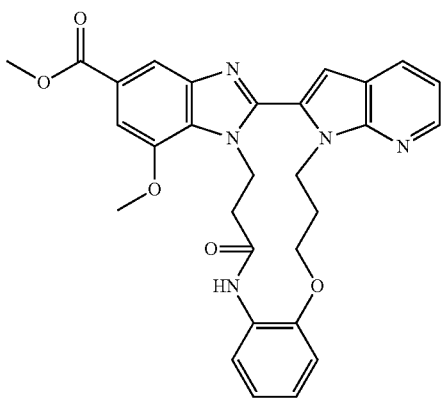 [SMILES: COC(=O)c1cc(OC)c2c(c1)nc1n2CCC(=O)Nc2ccccc2OCCCn2c-1cc1cccnc12]

Step 6: methyl 19-methoxy-15-oxo-7,8,14,15,16,17-hexahydro-6H-benzo[b]benzo[4,5]imidazo[1,2-h]pyrido[3',2':4,5]pyrrolo[2,1-j][1]oxa[4,8,11]triazacyclotetradecine-21-carboxylate: A stirring solution of 3-(2-(1-(3-(2-aminophenoxy)propyl)-1H-pyrrolo[2,3-b]pyridin-2-yl)-7-methoxy-5-(methoxycarbonyl)-1H-benzo[d]imidazol-1-yl)propanoic acid, 3 HCl (106 mg, 0.163 mmol) and triethylamine (0.227 mL, 1.630 mmol) in DMF (2 mL) was treated with HATU (74.4 mg, 0.196 mmol), and the reaction was stirred at room temperature for 3 hours, at which point it was judged to be complete by LCMS. The mixture was poured into ethyl acetate (30 mL), and the solution was washed 3× with 10% lithium chloride and once with brine, then dried over sodium sulfate and concentrated in vacuo. The residue was chromatographed via MPLC over a ISCO GOLD 24 g silica gel column, eluting at 40 mL/min with a 20% to 100% ethyl acetate/hexanes gradient over 15 column volumes. Fractions containing the desired product were pooled and concentrated in vacuo to yield the title compound (50 mg, 0.095 mmol, 58.4% yield). LCMS retention time=0.80 minutes, MS ESI m/z=526.2 (M+H) (Method 3).

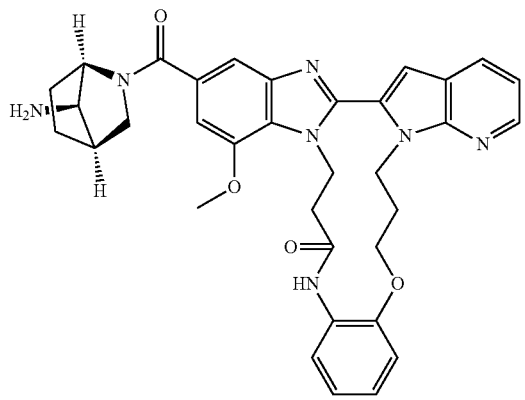 [SMILES: COc1cc(C(=O)N2C[C@H]3CC[C@@H]2[C@@H]3N)cc2nc3n(c12)CCC(=O)Nc1ccccc1OCCCn1c-3cc2cccnc21]

Step 7: Example 40: The title compound can be prepared from met 19-methoxy-15-oxo-7,8,14,15,16,17-hexahydro-6H-benzo[b]benzo[4,5]imidazo[1,2-h]pyrido[3',2':4,5]pyrrolo[2,1-j][1]oxa[4,8,11]triazacyclotetradecine-21-carboxylate and tert-butyl ((1R,4R,7R)-1,4-dimethyl-2-azabicyclo[2.2.1]heptan-7-yl)carbamate using the conditions described in Example 21, steps 6 and 7. $^1$H NMR (500 MHz, DMSO-$d_6$)(rotomers) δ 9.35-9.16 (m, 1H), 8.36 (br s, 1H), 8.08 (br d, J=7.6 Hz, 1H), 7.60 (br d, J=4.6 Hz, 0.4H), 7.49-7.40 (m, 0.6H), 7.21-7.12 (m, 2H), 7.11-7.00 (m, 2H), 6.95-6.82 (m, 3H), 5.51-5.38 (m, 1H), 5.05 (br dd, J=5.2, 2.7 Hz, 1H), 4.97-4.82 (m, 2H), 4.55 (br d, J=5.5 Hz, 0.4H), 4.35-4.20 (m, 0.6H), 3.95-3.80 (m, 1.4H), 3.70-3.60 (m, 0.6H), 3.57-3.50 (m, 0.4H), 3.22 (br d, J=11.3 Hz, 0.6H), 3.00-2.76 (m, 2H), 2.70-2.64 (m, 0.6H), 2.30-2.13 (m, 1H), 2.10-1.75 (m, 5H), 1.72-1.57 (m, 1H). MS ESI m/z 606.3 (M+H). Anal. HPLC Retention time: 1.37 minutes, (Method 1).

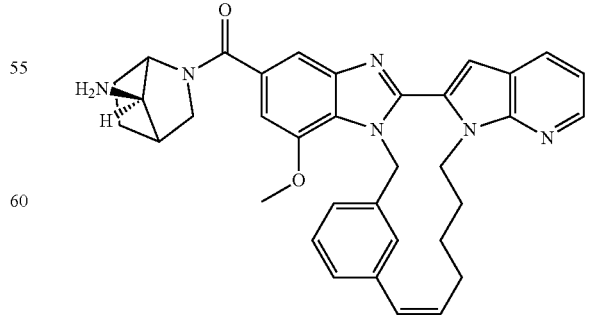

Example 41

(( 1R,4R,7R)-7-Amino-2-azabicyclo[2.2.1]heptan-2-yl)((Z)-27-methoxy-11H,21H-1,2(2,1)-dipyrrolo[2,3-b]pyridina-4(1,3)-benzenacyclodecaphan-5-en-25-yl)methanone

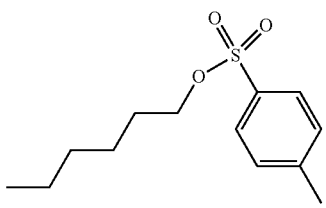 [SMILES: CCCCCCOS(=O)(=O)c1ccc(C)cc1]

Step 1: Hex-5-en-1-yl 4-methylbenzenesulfonate: To a 100 mL RBF was added hex-5-en-1-ol (2 g, 19.97 mmol), triethylamine (5.57 ml, 39.9 mmol) and 4-methylbenzenesulfonyl chloride (5.71 g, 30.0 mmol) in DCM (39.9 ml). The mixture was treated with DMAP (0.244 g, 1.997 mmol). The reaction was stirred at room temperature until the reaction was determined to be complete by $KMnO_4$ stain. The mixture was evaporated to dryness, loaded onto a 40 g silica column and purified by MPLC using a 0% to 10% ethyl acetate to hexanes gradient. Fractions containing the desired product were collected and concentrated in vacuo to yield the title compound (5.078 g, 100% yield). LCMS Tr=0.99 m, MS ESI m/z=255.2 (M+H) (Method 3).

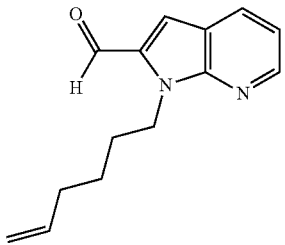 [SMILES: C=CCCCCn1c(C=O)cc2cccnc21]

Step 2: 1-(Hex-5-en-1-yl)-1H-pyrrolo[2,3-b]pyridine-2-carbaldehyde: To a 20 mL vial was added 1H-pyrrolo[2,3-b]pyridine-2-carbaldehyde (200 mg, 1.368 mmol), $K_2CO_3$ (567 mg, 4.11 mmol) in DMF (4562 µl). The solution was stirred for 30 minutes at RT. The stirring mixture was treated with hex-5-en-1-yl 4-methylbenzenesulfonate (383 mg, 1.505 mmol) and the solution was heated to 80° C. until complete by LCMS. The reaction was diluted in ethyl acetate and washed three times with LiCl (10%) once with water and once with brine before drying over sodium sulfate and evaporating to dryness. The mixture was purified by MPLC using a 15% to 25% ethyl acetate to hexanes gradient. Fractions containing the desired product were collected and concentrated in vacuo to yield the title compound (150 mg, 48% yield). $^1$H NMR (499 MHz, DMSO-$d_6$) δ 10.13-9.78 (m, 1H), 8.74-8.42 (m, 1H), 8.42-8.07 (m, 1H), 7.62-7.37 (m, 1H), 7.37-7.08 (m, 1H), 5.86-5.57 (m, 1H), 5.12-4.78 (m, 2H), 4.78-4.39 (m, 2H), 2.17-1.87 (m, 2H), 1.87-1.52 (m, 2H), 1.52-1.21 (m, 2H). LCMS Tr=0.97 m, MS ESI m/z=229.2 (M+H) (Method 3).

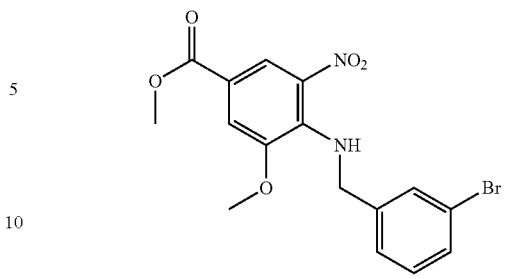

Step 3: Methyl 4-((3-bromobenzyl)amino)-3-methoxy-5-nitrobenzoate: To a 40 mL vial was added methyl 4-chloro-3-methoxy-5-nitrobenzoate (2 g, 8.14 mmol), hunig's base (2.84 mL, 16.29 mmol) and (3-bromophenyl)methanamine (3.03 g, 16.29 mmol) in DMF (15 mL). The mixture was heated to 50° C. overnight. The mixture was diluted in ethyl acetate, and washed twice with LiCl 10%, once water and once with brine. The mixture was purified via MPLC using a 20% to 30% ethyl acetate to hexanes gradient. Fractions containing the desired product were collected and concentrated in vacuo to yield the title compound (2.783 g, 86% yield). LCMS Tr=1.04 m, MS ESI m/z=395.2 (M+H) (Method 3).

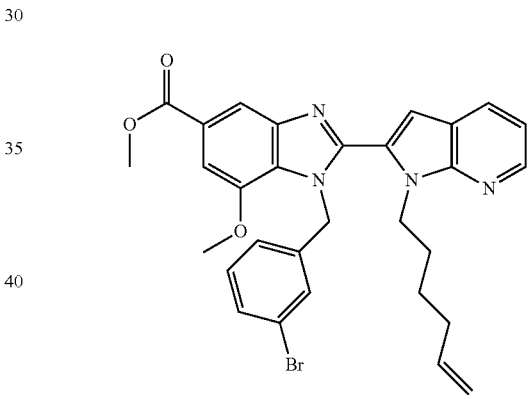

Step 4: Methyl 1-(3-bromobenzyl)-2-(1-(hex-5-en-1-yl)-1H-pyrrolo[2,3-b]pyridin-2-yl)-7-methoxy-1H-benzo[d]imidazole-5-carboxylate: To a vial was added methyl 4-((3-bromobenzyl)amino)-3-methoxy-5-nitrobenzoate (1402 mg, 3.55 mmol) and 1-(hex-5-en-1-yl)-1H-pyrrolo[2,3-b]pyridine-2-carbaldehyde (810 mg, 3.55 mmol) in ethanol/$H_2O$ (2:1) (35.5 ml). The mixture was sonicated for 1 minute. After 15 minutes of mixing at room temperature, sodium hydrosulfite (1544 mg, 8.87 mmol) was added and the reaction was heated to 80° C. overnight. The ethanol was evaporated in vacuo. The mixture was diluted in ethyl acetate and washed twice with water and once with brine before drying over sodium sulfate and evaporating to dryness. The product was purified by MPLC using a 20% to 30% ethyl acetate to hexanes gradient. Fractions containing the desired product were collected and concentrated in vacuo to yield the title compound (409 mg, 20.1% yield). LCMS Tr=1.17 m, MS ESI m/z=575.4 (M+H) (Method 3).

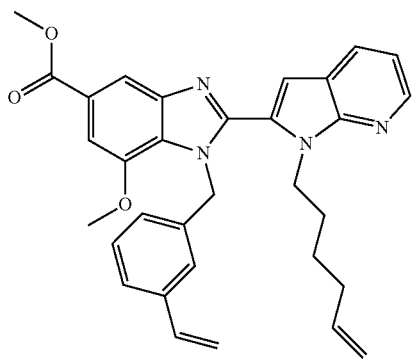 [SMILES: C=CCCCCn1c(-c2nc3cc(C(=O)OC)cc(OC)c3n2Cc2cccc(C=C)c2)cc2cccnc21]

Step 5: Methyl 2-(1-(hex-5-en-1-yl)-1H-pyrrolo[2,3-b]pyridin-2-yl)-7-methoxy-1-(3-vinylbenzyl)-1H-benzo[d]imidazole-5-carboxylate: To a 20 mL vial was added methyl 1-(3-bromobenzyl)-2-(1-(hex-5-en-1-yl)-1H-pyrrolo[2,3-b]pyridin-2-yl)-7-methoxy-1H-benzo[d]imidazole-5-carboxylate (378 mg, 0.659 mmol), potassium phosphate, tribasic, n-hydrate, powder, (1.483 mL, 2.97 mmol) followed by 4,4,5,5-tetramethyl-2-vinyl-1,3,2-dioxaborolane (0.224 mL, 1.318 mmol) in DMF (13.182 mL). The mixture was purged with nitrogen for five minutes before adding PdCl$_2$(dppf) (48.2 mg, 0.066 mmol) and purging for a further five minutes. The reaction was capped and stirred at 80° C. The reaction was stopped after 1 hour mixing. The mixture was diluted in ethyl acetate and filtered through a PTFE membrane. The organic layer was washed twice with LiCl (10%), twice with water and once with brine before drying with sodium sulfate and evaporating to dryness. The crude was purified by MPLC using a 0% to 20% ethyl acetate to hexanes gradient. Fractions containing the desired product were collected and concentrated in vacuo to yield the title compound (265.8 mg, 77% yield). $^1$H NMR (499 MHz, DMSO-d$_6$) δ 8.48-8.31 (m, 1H), 8.15-8.06 (m, 1H), 8.06-7.98 (m, 1H), 7.51-7.40 (m, 1H), 7.40-7.27 (m, 1H), 7.27-7.14 (m, 2H), 7.04-6.89 (m, 2H), 6.86-6.71 (m, 1H), 6.66-6.43 (m, 1H), 5.93-5.80 (m, 2H), 5.68-5.55 (m, 1H), 5.55-5.41 (m, 1H), 5.22-5.05 (m, 1H), 4.88-4.69 (m, 2H), 4.58-4.38 (m, 2H), 4.12-3.98 (m, 2H), 3.94 (s, 3H), 3.91 (s, 3H), 1.99 (s, 3H), 1.90-1.67 (m, 2H), 1.48-1.28 (m, 2H), 1.15-1.04 (m, 2H). LCMS Tr=1.15 m, MS ESI m/z=521.4 (M+H) (Method 3).

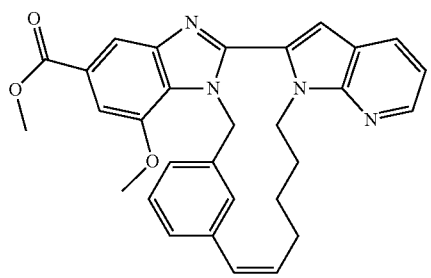 [SMILES: COC(=O)c1cc(OC)c2c(c1)nc1n2Cc2cccc(c2)/C=C\CCCCn2c-1cc1cccnc12]

Step 6: methyl (Z)-2$^7$-methoxy-1$^1$H,2$^1$H-1,2(2,1)-dipyrrolo[2,3-b]pyridina-4(1,3)-benzenacyclodecaphan-5-ene-2$^5$-carboxylate: To a 100 mL RBF fitted with a reflux condenser and thermometer in the sidearm was added methyl 2-(1-(hex-5-en-1-yl)-1H-pyrrolo[2,3-b]pyridin-2-yl)-7-methoxy-1-(3-vinylbenzyl)-1H-benzo[d]imidazole-5-carboxylate (19 mg, 0.036 mmol) in DCE (10 mL). The solution was degassed for 10 minutes before addition of Grubbs Catalyst™ Z-Selective (2.320 mg, 3.65 μmol) followed by stirring at 50° C. under nitrogen. After 1 hour an additional 6 mg of Grubbs Catalyst™ Z-Selective was added and temperature increased to 70° C. The mixture was evaporated in vacuo and the product was purified by MPLC using a 20% to 40% ethyl acetate to hexanes gradient. Fractions containing the desired product were collected and concentrated in vacuo to yield the title compound (15.2 mg, 85% yield). $^1$H NMR (499 MHz, CHLOROFORM-d) δ 8.54-8.33 (m, 1H), 8.30-8.12 (m, 1H), 8.09-7.81 (m, 1H), 7.52-7.39 (m, 1H), 7.39-7.31 (m, 1H), 7.31-7.20 (m, 1H), 7.20-7.05 (m, 1H), 7.04-6.86 (m, 2H), 6.76 (s, 1H), 6.29-6.07 (m, 2H, J=11.6 Hz), 6.01-5.76 (m, 1H), 5.73-5.55 (m, 1H, J=11.6 Hz), 5.31-5.13 (m, 1H), 5.13-4.84 (m, 1H), 4.10-4.01 (m, 3H), 4.01-3.87 (m, 3H), 2.44-2.19 (m, 1H), 2.01-1.86 (m, 1H), 1.86-1.74 (m, 1H), 1.70 (br s, 3H), 1.59-1.39 (m, 1H), 1.19-1.01 (m, 1H), 0.97-0.75 (m, 1H). LCMS Tr=1.15 m, MS ESI m/z=493.5 (M+H) (Method 3).

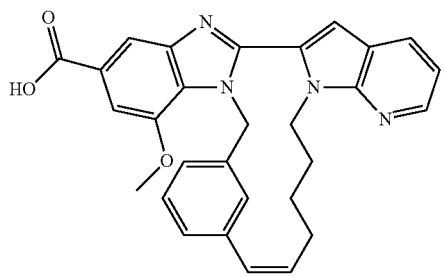 [SMILES: COc1cc(C(=O)O)cc2nc3n(c12)Cc1cccc(c1)/C=C\CCCCn1c-3cc2cccnc21]

Step 7: (Z)-2$^7$-Methoxy-1$^1$H,2$^1$H-1,2(2,1)-dipyrrolo[2,3-b]pyridina-4(1,3)-benzenacyclodecaphan-5-ene-2$^5$-carboxylic acid: To a 20 mL vial was added methyl (Z)-27-methoxy-11H,21H-1,2(2,1)-dipyrrolo[2,3-b]pyridina-4(1,3)-benzenacyclodecaphan-5-ene-25-carboxylate (52 mg, 0.106 mmol) in MeOH/THF 2:1 (1056 μl). The stirring mixture was treated with NaOH (1 M) (158 μl, 0.158 mmol), the vial was sealed and stirred at 50° C. for 1 hour. An additional 1 mL of THF was added to solubilize the substrate. Upon completion, the pH was adjusted to 5 followed by extraction 7 times with EtOAc (5 mL) The combined organic layers were dried with sodium sulfate and evaporated to dryness. The title compound was isolated as a crude mixture (57 mg, 113% yield) and used without further purification in the next step. LCMS Tr=1.06 m, MS ESI m/z=479.3 (M+H) (Method 3).

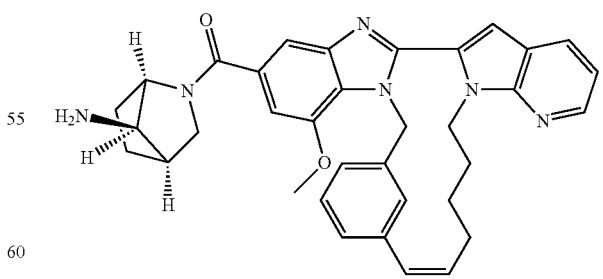

Step 8: Example 41. A stirring solution of (Z)-27-methoxy-11H,21H-1,2(2,1)-dipyrrolo[2,3-b]pyridina-4(1,3)-benzenacyclodecaphan-5-ene-25-carboxylic acid (28 mg, 0.059 mmol), tert-butyl ((1R,4R,7R)-2-azabicyclo[2.2.1]heptan-7-yl)carbamate (13.66 mg, 0.064 mmol) and triethylamine (0.024 mL, 0.176 mmol) in dichloromethane (1.5 mL) was treated with (benzotriazol-1-yloxy)tris(dimethylamino)phosphonium hexafluorophosphate (28.5 mg, 0.064 mmol). The solution was stirred at room temperature overnight. After confirmation of product mass by LCMS, the solution was treated with HCl (4N) (0.293 mL, 1.170 mmol) and stirred for an additional 2 hours. The mixture was concentrated in vacuo. The crude material was purified via preparative LC/MS with the following conditions: Column: XBridge C18, 200 mm×19 mm, 5-μm particles; Mobile Phase A: 5:95 acetonitrile:water with 0.05% trifluoroacetic acid; Mobile Phase B: 95:5 acetonitrile:water with 0.05% trifluoroacetic acid; Gradient: a 0-minute hold at 22% B, 22-62% B over 20 minutes, then a 0-minute hold at 100% B; Flow Rate: 20 mL/min; Column Temperature: 25° C. Fraction collection was triggered by MS and UV signals. Fractions containing the desired product were combined and dried via centrifugal evaporation. The purified material was then diluted with DMF, treated with Si-Pyridine and shaken for a minimum of 2 h. The resulting mixture was filtered and dried via centrifugal evaporation to yield the title compound (21.5 mg, 63.5% yield). $^1$H NMR (500 MHz, DMSO-$d_6$) (rotamers) δ 8.56-8.29 (m, 1H), 8.26-7.92 (m, 1H), 7.61-7.47 (m, 0.5H), 7.46-7.36 (m, 1H), 7.33 (s, 1H), 7.31-7.22 (m, 1H), 7.21-7.08 (m, 1H), 7.00-6.90 (m, 1H), 6.89-6.83 (m, 1H), 6.64-6.48 (m, 0.5H), 6.24-6.04 (m, 2H), 5.95-5.74 (m, 1H), 5.65-5.47 (m, 1H), 5.31-4.93 (m, 1H), 4.90-4.63 (m, 1H), 4.55-4.33 (m, 0.4H), 4.20-4.06 (m, 0.5H), 4.02-3.91 (m, 2H), 3.91-3.88 (m, 1H), 2.48-2.42 (m, 6H), 2.34-2.09 (m, 1H), 2.04-1.90 (m, 1H), 1.89-1.85 (m, 1H), 1.84 (br d, J=6.3 Hz, 1H), 1.74-1.50 (m, 2H), 1.48-1.24 (m, 2H), 0.86-0.57 (m, 1H). LCMS Tr=1.71 m, MS ESI m/z=573.1 (M+H) (Method 2).

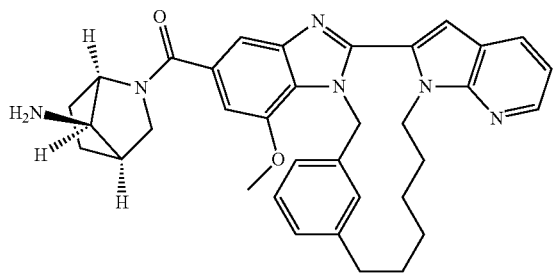 [SMILES: COc1cc(C(=O)N2C[C@H]3CC[C@@H]2[C@@H]3N)cc2nc3n(c12)Cc1cccc(c1)CCCCCCn1c-3cc2cccnc21]

Example 42

((1R,4R,7R)-7-amino-2-azabicyclo[2.2.1]heptan-2-yl)(2$^7$-methoxy-1$^1$H,2$^1$H-1,2(2,1)-dipyrrolo[2,3-b]pyridina-4(1,3)-benzenacyclodecaphane-2$^5$-yl)methanone

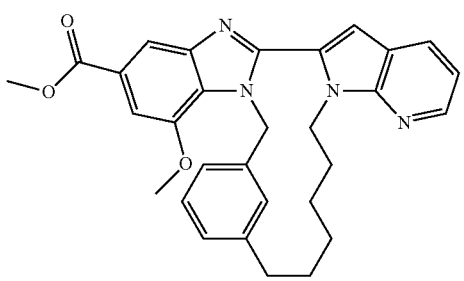 [SMILES: COC(=O)c1cc(OC)c2c(c1)nc1n2Cc2cccc(c2)CCCCCCn2c-1cc1cccnc12]

Step 1: methyl 2$^7$-methoxy-1$^1$H,2$^1$H-1,2(2,1)-dipyrrolo[2,3-b]pyridina-4(1,3)-benzenacyclodecaphane-2$^5$-carboxylate: To a 100 mL RBF was added Example 41, step 5 product, palladium on carbon 5% Standard (5.19 mg, 2.436 μmol). MeOH (3045 μl) was added to the dry reagents under a nitrogen stream. The vessel was fitted with a 3 way 24/40 valve that supported a hydrogen balloon and a nitrogen/vacuum line. The system was flushed three times with nitrogen/vacuum cycles, followed by three hydrogen/vacuum cycles. Once the system was saturated with hydrogen, the solution was stirred at room temperature for 3 hours until completion by LCMS. The mixture was filtered over a PTFE filter followed by evaporation in vacuo. The title compound was isolated (15 mg, 100% yield) and used without further purification in the next step. LCMS Tr=1.14 m, MS ESI m/z=495.4 (M+H) (Method 3).

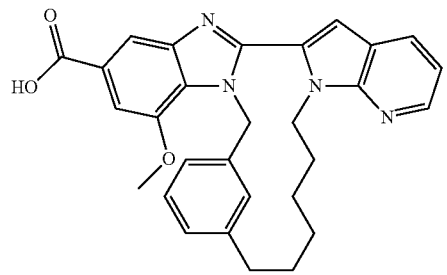 [SMILES: COc1cc(C(=O)O)cc2nc3n(c12)Cc1cccc(c1)CCCCCCn1c-3cc2cccnc21]

Step 2: 2$^7$-Methoxy-1H,2H-1,2(2,1)-dipyrrolo[2,3-b]pyridina-4(1,3)-benzenacyclodecaphane-2$^5$-carboxylic acid: To a 20 mL vial was added example 42, step 1 product, (12 mg, 0.024 mmol) in MeOH/THF 2:1 (970 μl). The mixture was treated with LiOH (48.5 μl, 0.024 mmol) and the vial was stirred at 50° C. for 1 hour. The pH was adjusted to 5 followed by extraction 7 times with ethyl acetate (5 mL). The combined organic layers were dried with sodium sulfate and evaporating to dryness. The title compound was isolated as a crude mixture and used without further purification in the next step. LCMS Tr=0.98 m, MS ESI m/z=481.3 (M+H) (Method 3).

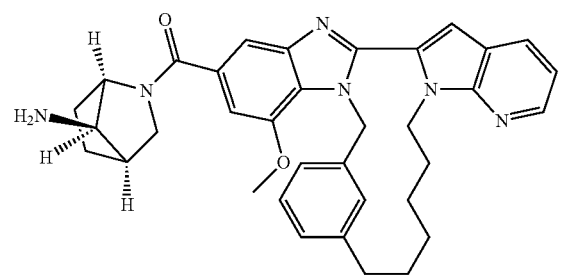 [SMILES: COc1cc(C(=O)N2C[C@H]3CC[C@@H]2[C@@H]3N)cc2nc3n(c12)Cc1cccc(c1)CCCCCCn1c-3cc2cccnc21]

Step 3: Example 42. A stirring solution of 27-methoxy-11H,21H-1,2(2,1)-dipyrrolo[2,3-b]pyridina-4(1,3)-benzenacyclodecaphane-25-carboxylic acid (13 mg, 0.027 mmol), tert-butyl ((1R,4R,7R)-2-azabicyclo[2.2.1]heptan-7-yl)carbamate (6.32 mg, 0.030 mmol) and triethylamine (0.011 mL, 0.081 mmol) in dichloromethane (1.5 mL) was treated with (benzotriazol-1-yloxy) tris (dimethylamino) phosphonium hexafluorophosphate (13.16 mg, 0.030 mmol). The solution was stirred at room temperature overnight. After completion by LCMS, the solution was treated with HCl (4N) (0.135 mL, 0.541 mmol). The mixture was stirred for 1 hour. The mixture was concentrated in vacuo. The crude material was purified via preparative LC/MS with the following conditions: Column: XBridge C18, 200 mm×19 mm, 5-µm particles; Mobile Phase A: 5:95 acetonitrile:water with 0.05% trifluoroacetic acid; Mobile Phase B: 95:5 acetonitrile:water with 0.05% trifluoroacetic acid; Gradient: a 0-minute hold at 23% B, 23-63% B over 20 minutes, then a 0-minute hold at 100% B; Flow Rate: 20 mL/min; Column Temperature: 25 C. Fraction collection was triggered by MS signals. Fractions containing the desired product were combined and dried via centrifugal evaporation. The purified material was then diluted with DMF, treated with Si-Pyridine and shaken for a minimum of 2 h. The resulting mixture was filtered and dried via centrifugal evaporation to yield the title compound (10 mg, 64% yield). $^1$H NMR (500 MHz, DMSO-$d_6$) (rotamers) δ 8.55-8.20 (m, 1H), 8.17-7.91 (m, 1H), 7.51 (br d, J=8.9 Hz, 1H), 7.44-7.35 (m, 0.6H), 7.27-7.19 (m, 1H), 7.19-7.12 (m, 1H), 7.14-7.01 (m, 1H), 7.00-6.91 (m, 0.6H), 6.90-6.83 (m, 0.7H), 6.36-6.22 (m, 0.7H), 6.20-6.04 (m, 1H), 6.03-5.90 (m, 0.7H), 4.93-4.64 (m, 2H), 4.61-4.37 (m, 0.5H), 4.30-4.12 (m, 0.5H), 4.10-4.01 (m, 2H), 3.98-3.90 (m, 0.4H), 3.60-3.29 (m, 2H), 3.20-2.98 (m, 1H), 2.94 (s, 0.3H), 2.69-2.57 (m, 1H), 2.10-1.76 (m, 4H), 1.73-1.52 (m, 1H), 1.49-1.09 (m, 4H), 1.06-0.89 (m, 1H), 0.87-0.61 (m, 2H), 0.46 (br d, J=11.9 Hz, 2H). LCMS Tr=1.71 m, MS ESI m/z=574.9 (M+H) (Method 2).

Step 1: Methyl (53R,54R)-27-methoxy-51-methyl-11H, 21H-1,2(2,1)-dipyrrolo[2,3-b]pyridina-5(3,4)-pyrrolidina-4 (1,3)-benzenacyclononaphane-25-carboxylate: In a vial, LDA in THF (193 µl, 0.386 mmol) was added to a solution of example 41, step 5 product (38 mg, 0.077 mmol) and trimethylamine-n-oxide (10.43 mg, 0.139 mmol) in THF (4286 µl) at 0 Celsius. An additional equivalent of trimethylamine-n-oxide (10.43 mg, 0.139 mmol) was added to push the reaction to completion. Once complete by LCMS, the reaction was quenched with 50% ammonium chloride and extracted with ethyl acetate. The title compound was isolated as a crude mixture (59 mg, 139% yield) and used without further purification in the next step. LCMS Tr=0.77 m, MS ESI m/z=550.3 (M+H) (Method 3).

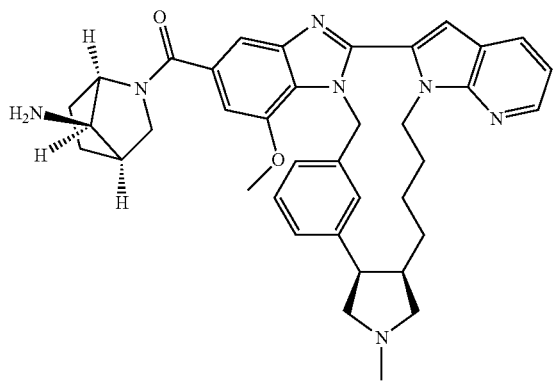 [SMILES: COc1cc(C(=O)N2C[C@H]3CC[C@@H]2[C@@H]3N)cc2nc3n(c12)Cc1cccc(c1)[C@@H]1CN(C)C[C@@H]1CCCCn1c-3cc2cccnc21]

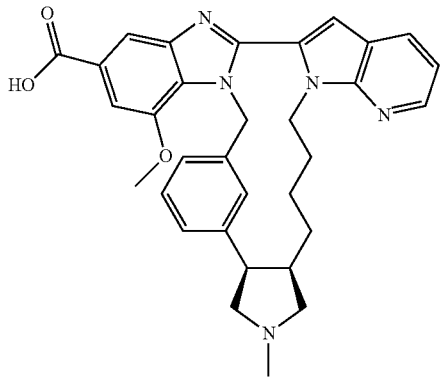

Example 43

((1R,4R,7R)-7-amino-2-azabicyclo[2.2.1]heptan-2-yl)((53R,54R)-27-methoxy-5'-methyl-1'H,21H-1,2(2,1)-dipyrrolo[2,3-b]pyridina-5(3,4)-pyrrolidina-4(1,3)-benzenacyclononaphane-25-yl)methanone

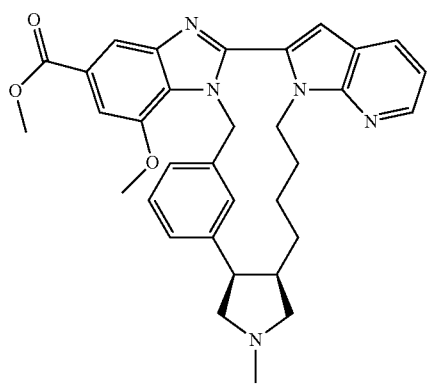 [SMILES: COC(=O)c1cc(OC)c2c(c1)nc1n2Cc2cccc(c2)[C@@H]2CN(C)C[C@@H]2CCCCn2c-1cc1cccnc12]

Step 2: (53R,54R)-27-Methoxy-51-methyl-11H,21H-1,2 (2,1)-dipyrrolo[2,3-b]pyridina-5(3,4)-pyrrolidina-4(1,3)-benzenacyclononaphane-25-carboxylic acid: To a 4 mL vial was added methyl (53R,54R)-27-methoxy-51-methyl-11H, 21H-1,2(2,1)-dipyrrolo[2,3-b]pyridina-5(3,4)-pyrrolidina-4 (1,3)-benzenacyclononaphane-25-carboxylate (59 mg, 0.107 mmol) and lithium hydroxide monohydrate (5.40 mg, 0.129 mmol) in THF/$H_2O$ 50:50 (1073 µl). The reaction was stirred for several hours before adding additional LiOH 0.5M (322 µl, 0.161 mmol). Upon completion, the pH was adjusted to 7 and extracted with ethyl acetate six times before drying over sodium sulfate and evaporating to dryness. The title compound was isolated as a crude mixture (46 mg, 80% yield) and used without further purification in the next step. LCMS Tr=1.32 m, MS ESI m/z=536.3 (M+H) Method 3).

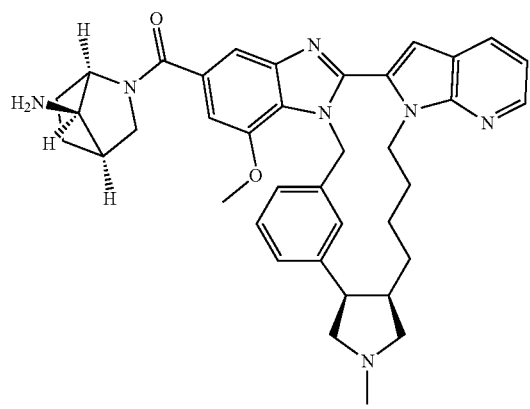 [SMILES: COc1cc(C(=O)N2C[C@H]3CC[C@@H]2[C@@H]3N)cc2nc3n(c12)Cc1cccc(c1)[C@@H]1CN(C)C[C@@H]1CCCCn1c-3cc2cccnc21]

Step 3: Example 43. A stirring solution of (5³R,5⁴R)-2⁷-methoxy-5¹-methyl-1¹H,2¹H-1,2(2,1)-dipyrrolo[2,3-b]pyridina-5(3,4)-pyrrolidina-4(1,3)-benzenacyclononaphane-2⁵-carboxylic acid (46 mg, 0.043 mmol), tert-butyl ((1R,4R,7R)-2-azabicyclo[2.2.1]heptan-7-yl)carbamate (10.03 mg, 0.047 mmol) and hunig's base (37.5 µl, 0.215 mmol) in dichloromethane (2.1 mL) was treated with ((1H-benzo[d][1,2,3]triazol-1-yl) oxy) tris (dimethylamino) phosphonium hexafluorophosphate(V) (20.89 mg, 0.047 mmol). The solution was stirred at room temperature overnight. After confirmation of the product by LCMS, the solution was treated with hydrogen chloride (4N) (215 µl, 0.859 mmol). The solution was stirred for 2 hours before evaporation in vacuo. The crude material was purified via preparative LC/MS with the following conditions: Column: Agilent Bonus RP C18 2.6 uM, 200 mm×21.2 mm, 5-µm particles; Mobile Phase A: 5:95 acetonitrile:water with ammonium acetate; Mobile Phase B: 95:5 acetonitrile:water with ammonium acetate; Gradient: a 4-minute hold at 0% B, 0-100% B over 20 minutes, then a 0-minute hold at 100% B; Flow Rate: 20 mL/min; Column Temperature: 25 C. Fraction collection was triggered by MS signals. Fractions containing the desired product were combined and dried via centrifugal evaporation. The purified material was then diluted with DMF, treated with Si-Pyridine and shaken for a minimum of 2 h. The resulting mixture was filtered and dried via centrifugal evaporation to yield the title compound (3.6 mg, 13% yield). ¹H NMR (500 MHz, DMSO-d₆) δ 8.63-7.91 (m, 3H), 7.41 (br s, 7H), 6.78-5.69 (m, 2H), 5.31 (br s, 1H), 4.91-4.41 (m, 2H), 4.28-2.63 (m, 11H), 2.38-1.58 (m, 5H), 1.54-0.55 (m, 8H), 0.08 (br s, 3H). LCMS Tr=1.13 m, MS ESI m/z=629.9 (M+H) (Method 2).

Example 44

((1R,4R,7R)-7-amino-2-azabicyclo[2.2.1]heptan-2-yl)((5¹S,5²R)-5³,5³-difluoro-2⁷-methoxy-1H,2¹H-1,2(2,1)-dipyrrolo[2,3-b]pyridina-4(1,3)-benzena-5(1,2)-cyclopropanacyclononaphane-2⁵-yl)methanone

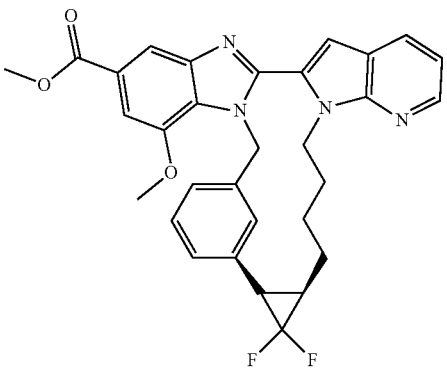

Step 1: Methyl (5¹S,5²R)-5³,5³-difluoro-2⁷-methoxy-1¹H,2¹H-1,2(2,1)-dipyrrolo[2,3-b]pyridina-4(1,3)-benzena-5(1,2)-cyclopropanacyclononaphane-2⁵-carboxylate: To a 2.5 mL microwave vial was added Example 41, step 5 product (105 mg, 0.213 mmol) and sodium iodide (32.0 mg, 0.213 mmol) and the vial was evacuated and backfilled with N₂ 3 times. To the vial was added acetonitrile (2132 µl) then trimethyl(trifluoromethyl)silane (315 µl, 2.132 mmol). The vial was heated to 80° C. using a Biotage Initatior Plus MW at high absorbance (low power). An additional 5 equivalents sodium iodide and 2.5 equivalents of trimethyl(trifluoromethyl)silane were added to the vial. Addition of 0.3 mL of TMSCF₃ was necessary every 15 minutes (due to evaporation) until only 15% starting material was observed by LCMS. The reaction was quenched with two drops of water and filtered through Celite washing with ethyl acetate. The mixture was evaporated to dryness to remove acetonitrile, redissolved in ethyl acetate and extracted with 50% water/brine solution to remove any leftover sodium iodide. The organic layer was dried over sodium sulfate and evaporated to dryness. The product was purified by MPLC using a 20% to 30% ethyl acetate to hexanes gradient. Fractions containing the desired product were collected and concentrated in vacuo to yield the title compound (72.4 mg, 62.4% yield). LCMS Tr=1.05 m, MS ESI m/z=543.3 (M+H) (Method 3).

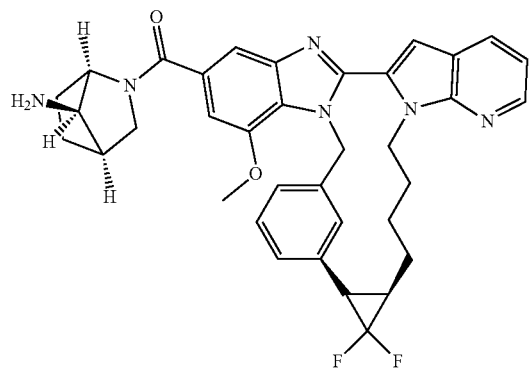

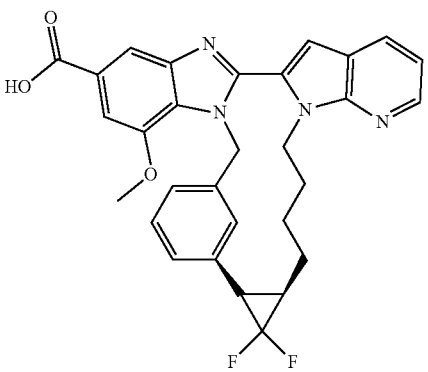

Step 2: (51S,52R)-53,53-Difluoro-27-methoxy-11H,21H-1,2(2,1)-dipyrrolo[2,3-b]pyridina-4(1,3)-benzena-5(1,2)-cyclopropanacyclononaphane-25-carboxylic acid: To a 20 mL vial was added methyl (51R,52R)-53,53-difluoro-27-methoxy-11H,21H-1,2(2,1)-dipyrrolo[2,3-b]pyridina-4(1,3)-benzena-5(1,2)-cyclopropanacyclononaphane-25-carboxylate (51 mg, 0.094 mmol) in MeOH/THF 2:1 (940 μl). The stirring mixture was treated with NaOH (1 M) (141 μl, 0.141 mmol), the vial was sealed and stirred at 50° C. for 1 hour, followed by overnight at room temperature. The pH was adjusted to 6 and the aqueous was extracted 7 times with ethyl acetate (5 mL), followed by drying of the organic layers with sodium sulfate and evaporating to dryness. The title compound was isolated as a crude mixture (56 mg, 113% yield) and used without further purification in the next step. LCMS Tr=1.04 m, MS ESI m/z=529.3 (M+H) (Method 3).

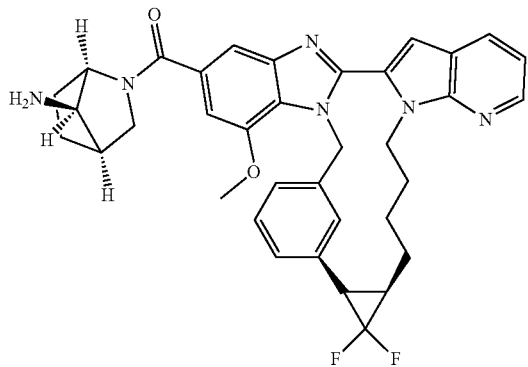

Step 3: Example 44. A stirring solution of (51R,52R)-53,53-difluoro-27-methoxy-11H,21H-1,2(2,1)-dipyrrolo[2,3-b]pyridina-4(1,3)-benzena-5(1,2)-cyclopropanacyclononaphane-25-carboxylic acid (28 mg, 0.053 mmol), tert-butyl ((1R,4R,7R)-2-azabicyclo[2.2.1]heptan-7-yl)carbamate (12.37 mg, 0.058 mmol) and triethylamine (0.022 mL, 0.159 mmol) in DCM (1.5 mL) was treated with ((1H-benzo[d][1,2,3]triazol-1-yl)oxy)tris(dimethylamino)phosphonium hexafluorophosphate(V) (25.8 mg, 0.058 mmol). The solution was stirred at room temperature overnight. After confirmation of product by LCMS, the solution was treated with HCl (4N) (0.265 mL, 1.059 mmol). The solution was stirred for 2 hours, before evaporation in vacuo. The crude material was purified via preparative LC/MS with the following conditions: Column: XBridge C18, 200 mm×19 mm, 5-μm particles; Mobile Phase A: 5:95 acetonitrile:water with 0.05% trifluoroacetic acid; Mobile Phase B: 95:5 acetonitrile:water with 0.05% trifluoroacetic acid; Gradient: a 0-minute hold at 22% B, 22-62% B over 20 minutes, then a 0-minute hold at 100% B; Flow Rate: 20 mL/min; Column Temperature: 25 C. Fraction collection was triggered by MS and UV signals. Fractions containing the desired product were combined and dried via centrifugal evaporation. The purified material was then diluted with DMF, treated with Si-Pyridine and shaken for a minimum of 2 h. The resulting mixture was filtered and dried via centrifugal evaporation to yield the title compound (20.5 mg, 52.1% yield). $^1$H NMR (500 MHz, DMSO-$d_6$) (rotamers) δ 8.54-7.94 (m, 2H), 7.77-6.83 (m, 8H), 6.67-5.82 (m, 3H), 5.07-4.44 (m, 2H), 4.16 (br s, 2H), 3.99 (br s, 1H), 3.39-3.07 (m, 1H), 2.82 (br s, 1H), 2.41 (s, 1H), 1.91 (s, 9H), 0.82-0.03 (m, 3H) (methoxy methyl (3) protons are under water peak). LCMS Tr=1.71 m, MS ESI m/z=623.3 (M+H) (Method 2).

Using the intermediate from Example 41 step 5, the following compounds in Table 3 were made using the procedures found in Example 39.

TABLE 3

| Ex # | Structure | Name | LC/MS Rt (min) | LC/MS Method | M + H (obs ion) |
|---|---|---|---|---|---|
| 45 | | ((1R,4R,7R)-7-amino-2-azabicyclo[2.2.1]heptan-2-yl)((5S,6R)-5,6-dihydroxy-27-methoxy-1$^1$H,2$^1$H-1,2(2,1)-dipyrrolo[2,3-b]pyridina-4(1,3)-benzenacyclodecaphane-25-yl)methanone, Isomer A | 1.32 | 1 | 607.1 |

TABLE 3-continued

| Ex # | Structure | Name | LC/MS Rt (min) | LC/MS Method | M + H (obs ion) |
|---|---|---|---|---|---|
| 46 | | ((1R,4R,7R)-7-amino-2-azabicyclo[2.2.1]heptan-2-yl)((5S,6R)-5,6-dihydroxy-27-methoxy-1$^1$H,2$^1$H-1,2(2,1)-dipyrrolo[2,3-b]pyridina-4(1,3)-benzenacyclodecaphane-25-yl)methanone, Isomer B | 1.40 | 1 | 607.3 |
| 47 | | ((1R,4R,7R)-7-amino-2-azabicyclo[2.2.1]heptan-2-yl)((5S,6R)-5,6-dihydroxy-27-methoxy-1$^1$H,2$^1$H-1,2(2,1)-dipyrrolo[2,3-b]pyridina-4(1,3)-benzenacyclodecaphane-25-yl)methanone, Isomer C | 1.33 | 1 | 607.1 |
| 48 | | ((1R,4R,7R)-7-amino-2-azabicyclo[2.2.1]heptan-2-yl)((5S,6R)-5,6-dihydroxy-27-methoxy-1$^1$H,2$^1$H-1,2(2,1)-dipyrrolo[2,3-b]pyridina-4(1,3)-benzenacyclodecaphane-25-yl)methanone, Isomer D | 1.33 | 1 | 607.1 |

TABLE 3-continued

| Ex # | Structure | Name | LC/MS Rt (min) | LC/MS Method | M + H (obs ion) |
|---|---|---|---|---|---|
| 49 | | ((3R,5R)-3-amino-5-fluoropiperidin-1-yl)((5S,6R)-5,6-dihydroxy-2⁷-methoxy-1¹H,2¹H-1,2(2,1)-dipyrrolo[2,3-b]pyridina-4(1,3)-benzenacyclodecaphane-2⁵-yl)methanone, Isomer A | 1.26 | 1 | 613.2 |
| 50 | | ((3R,5R)-3-amino-5-fluoropiperidin-1-yl)((5S,6R)-5,6-dihydroxy-2⁷-methoxy-1¹H,2¹H-1,2(2,1)-dipyrrolo[2,3-b]pyridina-4(1,3)-benzenacyclodecaphane-2⁵-yl)methanone, Isomer B | 1.28 | 1 | 613.3 |

Example 51

((3R,5R)-3-amino-5-fluoropiperidin-1-yl)((Z)-2⁷-methoxy-1¹H,2¹H-1,2(2,1)-dipyrrolo[2,3-b]pyridina-4(1,3)-benzenacyclodecaphan-5-en-2⁵-yl)methanone Using intermediate from Example 41 step 5, the title compound below was made using the procedures found in Example 41 with a substitution of (3R,5R)-5-fluoropiperidin-3-amine for (1R,4R,7R)-2-azabicyclo[2.2.1]heptan-7-amine. LCMS Tr=1.75 m, MS ESI m/z=579.3 (M+H) (Method 2).

Example 52

((3R,5R)-3-Amino-5-fluoropiperidin-1-yl)(1⁶-(2-hydroxypropan-2-yl)-2⁷-methoxy-1¹H,2¹H-1,2(2,1)-dipyrrolo[2,3-b]pyridina-4(3,5)-pyridina-5(1,2)-benzenacyclononaphane-2⁵-yl)methanone Step 1: 6-Chloro-N-methoxy-N-methyl-1H-pyrrolo[2,3-b]pyridine-2-carboxamide: A stirring solution of 6-chloro-1H-pyrrolo[2,3-b]pyridine-2-carboxylic acid (1.06 g, 5.39 mmol), N,O-dimethylhydroxylamine hydrochloride (0.631 g, 6.47 mmol), HOBt hydrate (1.239 g, 8.09 mmol), and triethylamine (3.76 mL, 27.0 mmol) in dichloromethane (10 mL) was treated with EDC (1.550 g, 8.09 mmol). The reaction was stirred at room temperature for 18 hours, at which point it was judged to be complete by LCMS. The mixture was diluted with ethyl acetate (100 mL) and washed twice with water, and once with brine, then dried over sodium sulfate and concentrated in vacuo. The residue was chromatographed via MPLC over an 80 g silica gel column, eluting at 60 mL/min with a 20% to 50% ethyl acetate/hexanes gradient over 15 column volumes. Fractions containing the desired product were pooled and concentrated in vacuo to yield the title compound (0.73 g, 3.05 mmol, 56.5% yield) as a colorless solid. LCMS retention time=1.17 m, MS ESI m/z=240.1 (M+H) (Method 3).

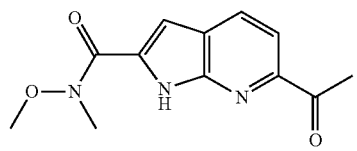 [SMILES: CON(C)C(=O)c1cc2ccc(C(C)=O)nc2[nH]1]

Step 2: 6-Acetyl-N-methoxy-N-methyl-1H-pyrrolo[2,3-b]pyridine-2-carboxamide: A stirring solution of 6-chloro-N-methoxy-N-methyl-1H-pyrrolo[2,3-b]pyridine-2-carboxamide (680 mg, 2.84 mmol), tributyl(1-ethoxyvinyl)stannane (2.368 mL, 7.09 mmol), and xantphos (328 mg, 0.567 mmol) in dioxane (10 mL) was degassed with bubbling nitrogen for 10 minutes. The mixture was treated with Pd$_2$(dba)$_3$ (260 mg, 0.284 mmol) and degassed for an additional 5 minutes. The vial was sealed, and the reaction was stirred at 110° C. for 18 hours, at which point it was judged to be complete by LCMS. Solids were removed by filtration and rinsed with THF, then the combined filtrate and rinsings were treated with 1M HCl (5 mL). The mixture was stirred at room temperature for 2 hours, at which point LCMS showed complete conversion of the intermediate vinyl ether to the desired ketone. The organic solvents were evaporated, and the remaining aqueous mixture was treated with saturated sodium bicarbonate. After stirring for 10 minutes, the mixture was extracted 3× with ethyl acetate. The combined organic phases were washed with brine, dried over sodium sulfate, and concentrated in vacuo. The residue was chromatographed via MPLC over an 80 g silica gel column, eluting at 60 mL/min with a 10% to 100% ethyl acetate/hexanes gradient over 20 column volumes. Fractions containing the desired product were pooled and concentrated in vacuo to yield the title compound (500 mg, 2.022 mmol, 71.3% yield) as an amber solid. LCMS retention time=0.72 m, MS ESI m/z=248.2 (M+H) (Method 3).

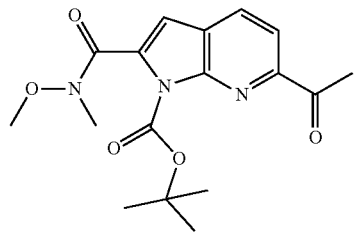 [SMILES: CON(C)C(=O)c1cc2ccc(C(C)=O)nc2n1C(=O)OC(C)(C)C]

Step 3: tert-Butyl 6-acetyl-2-(methoxy(methyl)carbamoyl)-1H-pyrrolo[2,3-b]pyridine-1-carboxylate: A stirring solution of 6-acetyl-N-methoxy-N-methyl-1H-pyrrolo[2,3-b]pyridine-2-carboxamide (500 mg, 2.022 mmol), Boc-anhydride (704 µl, 3.03 mmol), and triethylamine (564 µl, 4.04 mmol) in THF was treated with DMAP (247 mg, 2.022 mmol). The reaction was stirred at room temperature for 4 hours, at which point it was judged to be complete by LCMS. The mixture was diluted with ethyl acetate, and the turbid solution was washed 3× with water and once with brine, then dried over sodium sulfate and concentrated in vacuo. The residue was chromatographed via MPLC over a 40 g silica gel column, eluting at 40 mL/min with a 0% to 70% ethyl acetate/hexanes gradient over 15 column volumes. Fractions containing the desired product were pooled and concentrated in vacuo to yield the title compound (640 mg, 1.842 mmol, 91% yield). LCMS retention time=0.83 m, MS ESI m/z=348.1 (M+H) (Method 3).

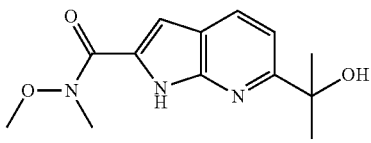 [SMILES: CON(C)C(=O)c1cc2ccc(C(C)(C)O)nc2[nH]1]

Step 4: 6-(2-Hydroxypropan-2-yl)-N-methoxy-N-methyl-1H-pyrrolo[2,3-b]pyridine-2-carboxamide: In a dry flask, a stirring solution of tert-butyl 6-acetyl-2-(methoxy(methyl)carbamoyl)-1H-pyrrolo[2,3-b]pyridine-1-carboxylate (600 mg, 1.727 mmol) in anhydrous THF (10 mL) was cooled to −78° C. and treated dropwise with methylmagnesium chloride (3 M in ether) (0.691 mL, 2.073 mmol). The reaction was stirred at −78° C. for 2 hours, then quenched with half-saturated ammonium chloride. The mixture was allowed to come to room temperature. The turbid mixture was extracted 3× with ethyl acetate, then the combined organic phases were washed with brine, dried over sodium sulfate, and concentrated in vacuo. The residue was chromatographed via MPLC over an ISCO GOLD 40 g silica gel column, eluting at 40 mL/min with a 15% to 35% ethyl acetate/hexanes gradient over 15 column volumes. Fractions containing the desired product were pooled and concentrated in vacuo to yield tert-butyl 6-(2-hydroxypropan-2-yl)-2-(methoxy(methyl)carbamoyl)-1H-pyrrolo[2,3-b]pyridine-1-carboxylate (287 mg, 0.790 mmol, 45.7% yield) as a slightly amber solid. LCMS retention time=0.74 m, MS ESI m/z=364.2 (M+H) (method 3). A stirring solution of tert-butyl 6-(2-hydroxypropan-2-yl)-2-(methoxy(methyl)carbamoyl)-1H-pyrrolo[2,3-b]pyridine-1-carboxylate (387 mg, 1.065 mmol) in dichloromethane (5 mL) was treated with TFA (2 mL). The reaction was stirred at room temperature for 1 hour, at which point it was judged to be complete by LCMS. The mixture was concentrated in vacuo, and the residue was partitioned between ethyl acetate and saturated sodium carbonate. After stirring for 10 minutes, the layers were separated, and the organic phase was washed twice with saturated sodium carbonate. The combined aqueous phases were extracted twice with ethyl acetate, then the combined organic phases were washed with brine, dried over sodium sulfate, and concentrated in vacuo to yield the title compound (259 mg, 0.984 mmol, 92% yield). LCMS retention time=0.62 m, MS ESI m/z=264.2 (M+H) (Method 3).

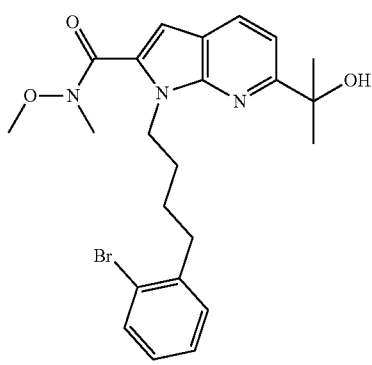 [SMILES: CON(C)C(=O)c1cc2ccc(C(C)(C)O)nc2n1CCCCc1ccccc1Br]

Step 5: 1-(4-(2-Bromophenyl)butyl)-6-(2-hydroxypropan-2-yl)-N-methoxy-N-methyl-1H-pyrrolo[2,3-b]pyridine-2-carboxamide: In a 40 mL scintillation vial, a stirring mixture of 6-(2-hydroxypropan-2-yl)-N-methoxy-N-methyl-1H-pyrrolo[2,3-b]pyridine-2-carboxamide (259 mg, 0.984 mmol) and potassium carbonate (408 mg, 2.95 mmol) in anhydrous DMF (3 mL) was treated with 4-(2-bromophenyl)butyl 4-methylbenzenesulfonate (377 mg, 0.984 mmol). The vial was sealed, and the reaction was stirred at 70° C. for 48 hours, at which point it was judged to be complete by LCMS. The mixture was diluted with ethyl acetate (25 mL), and the turbid solution was washed once with water, twice with 10% lithium chloride solution, and once with brine, then dried over sodium sulfate and concentrated in vacuo. The residue was adsorbed onto celite and chromatographed via MPLC over a 40 g silica gel column, eluting at 40 mL/min with a 0% to 100% ethyl acetate/hexanes gradient over 15 column volumes. Fractions containing the desired product were pooled and concentrated in vacuo to yield the title compound (400 mg, 0.843 mmol, 86% yield). LCMS retention time=1.04 m, MS ESI m/z=474.1 (M+H) (Method 3).

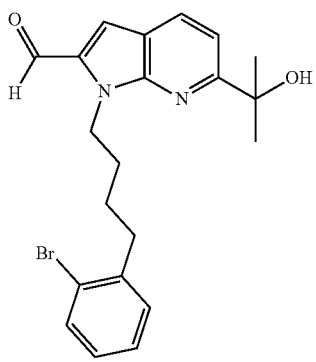 [SMILES: CC(C)(O)c1ccc2cc(C=O)n(CCCCc3ccccc3Br)c2n1]

Step 6: 1-(4-(2-Bromophenyl)butyl)-6-(2-hydroxypropan-2-yl)-1H-pyrrolo[2,3-b]pyridine-2-carbaldehyde: A stirring solution of 1-(4-(2-bromophenyl)butyl)-6-(2-hydroxypropan-2-yl)-N-methoxy-N-methyl-1H-pyrrolo[2,3-b]pyridine-2-carboxamide (390 mg, 0.822 mmol) in anhydrous THF (5 mL) was cooled to −78° C. and treated with DIBAL-H (1 M in dichloromethane) (1.644 mL, 1.644 mmol). The reaction was allowed to come to 0° C. and stirred for 1 hour, at which point it was judged to be complete by LCMS. The reaction was quenched with ice cold water, and stirred for 5 minutes, resulting in a thick, gel-like mixture. The mixture was diluted with ethyl acetate (100 mL) and 30 mL of a saturated solution of Rochelle's salt, and vigorously stirred for 18 hours. The layers of the now clear, biphasic solution were separated, and the organic phase was washed twice with water. The combined aqueous phases were extracted once with ethyl acetate, then the combined organic phases were washed with brine, dried over sodium sulfate, and concentrated in vacuo. The residue was adsorbed onto celite and chromatographed via MPLC over an ISCO GOLD 40 g silica gel column, eluting at 40 mL/min with a 0% to 100% acetone/hexanes gradient over 25 column volumes. Fractions containing the desired product were pooled and concentrated in vacuo to yield the title compound (192 mg, 0.462 mmol, 56.2% yield). LCMS retention time=1.09 m, MS ESI m/z=415.0 (M+H) (Method 3).

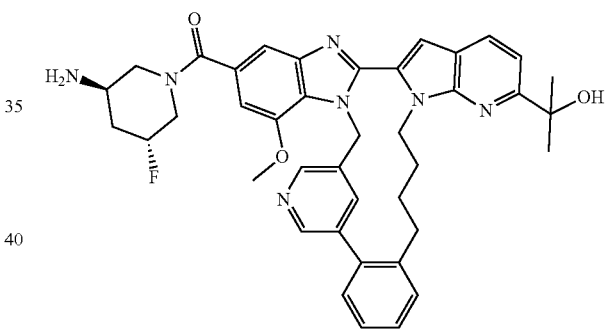

Step 7: Example 52 DG21: The title compound can be prepared from 1-(4-(2-bromophenyl)butyl)-6-(2-hydroxypropan-2-yl)-1H-pyrrolo[2,3-b]pyridine-2-carbaldehyde using procedures described in Example 21. $^1$H NMR (500 MHz, CHLOROFORM-d) δ 8.83 (dd, J=7.5, 1.9 Hz, 1H), 8.38 (t, J=2.1 Hz, 1H), 7.99 (d, J=8.2 Hz, 1H), 7.50 (d, J=5.4 Hz, 1H), 7.28-7.23 (m, 1H), 7.22-7.17 (m, 2H), 7.15 (d, J=7.5 Hz, 1H), 7.08 (ddd, J=7.5, 3.4, 1.2 Hz, 1H), 7.07-7.03 (m, 1H), 7.03-7.00 (m, 1H), 6.99 (s, 1H), 6.25 (d, J=15.0 Hz, 1H), 6.08 (d, J=15.0 Hz, 1H), 5.29 (br d, J=6.0 Hz, 1H), 5.16-4.65 (m, 4H), 4.18 (s, 3H), 3.37 (br s, 1H), 3.28-3.10 (m, 1H), 2.88-2.51 (m, 1H), 2.47-2.33 (m, 2H), 1.93-1.83 (m, 1H), 1.80-1.68 (m, 1H), 1.61 (s, 6H), 1.59-1.45 (m, 3H), 1.20-1.05 (m, 1H), 0.81-0.62 (m, 1H). LCMS retention time=0.73 m, MS ESI m/z=688.3 (M+H) (Method 3).

Example 53

((1R,4R,7R)-7-Amino-2-azabicyclo[2.2.1]heptan-2-yl)(1⁶-(2-hydroxypropan-2-yl)-2⁷-methoxy-1¹H,2¹H-1,2(2,1)-dipyrrolo[2,3-b]pyridina-4(3,5)-pyridina-5(1,2)-benzenacyclononaphane-2⁵-yl)methanone

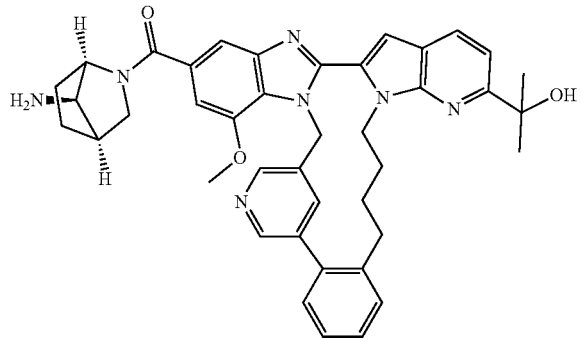 [SMILES: COc1cc(C(=O)N2C[C@H]3CC[C@@H]2[C@@H]3N)cc2nc3n(c12)Cc1cncc(c1)-c1ccccc1CCCCn1c-3cc2ccc(C(C)(C)O)nc21]

The title compound can be prepared from 1-(4-(2-bromophenyl)butyl)-6-(2-hydroxypropan-2-yl)-1H-pyrrolo[2,3-b]pyridine-2-carbaldehyde using procedures described in Example 21. ¹H NMR (500 MHz, CHLOROFORM-d) δ 8.85-8.79 (m, 1H), 8.40-8.32 (m, 1H), 7.99 (dd, J=8.1, 1.8 Hz, 1H), 7.57-7.50 (m, 1H), 7.27-7.22 (m, 1H), 7.21-7.17 (m, 2H), 7.16-7.06 (m, 3H), 7.06-7.01 (m, 1H), 6.99 (s, 1H), 6.32-6.20 (m, 1H), 6.13-6.00 (m, 1H), 5.29 (d, J=6.3 Hz, 1H), 5.13-4.96 (m, 2H), 4.19 (d, J=3.2 Hz, 3H), 4.11-3.96 (m, 1H), 3.82-3.65 (m, 1H), 3.53-3.36 (m, 1H), 3.32-3.17 (m, 1H), 2.45-2.23 (m, 2H), 2.19-1.82 (m, 4H), 1.79-1.68 (m, 1H), 1.68-1.62 (m, 1H), 1.59 (br s, 2H), 1.56-1.44 (m, 2H), 1.13 (br s, 3H), 0.81-0.59 (m, 1H). LCMS retention time=0.69 m, MS ESI m/z=682.4 (M+H) (Method 3).

7. Biological Assays

Compounds of the present invention were assayed as inhibitors of PAD4 using the assay protocol described below.

RFMS Human PAD4 Functional Assay:

Compounds were solubilized in 100% DMSO to achieve a 10 mM compound concentration. Compound stock solutions were stored at RT. A series of dilutions were prepared in DMSO and mixed 8 times with 20 μL mixing volume. Final top concentration of compound in the assay is 50 μM. Final assay conditions were as follows:

Reaction volume: 26 μl
Assay buffer: 25 mM hepes, pH 7.5, 5 mM NaCl, 1 mM DTT, 0.2 mg/ml BSA, 0.01% CHAPS, 50 μM Calcium, and 5 μM TPEN
Final concentrations: 5 nM hPAD4 enzyme, 250 μM BAEE, and 0.5% DMSO
Total incubation time: 30 mins compound and enzyme preincubation at 37° C., 90 min enzyme/substrate reaction, 30 min reaction with phenyl glyoxal at 37° C.
Stop solution: 40 μl 5% TCA in ACN 0.13 μL of compound solution was added to 13 μL of 10 nM PAD4 in assay buffer. After 30 min 13 μl of 500 μM of BAEE was added in 25 mM hepes, pH 7.5, 5 mM NaCl, 1 mM DTT, 0.2 mg/ml BSA, 0.01% CHAPS, 50 μM Calcium, 5 μM TPEN was added and the reaction incubated for 90 min at 37° C. The enzymatic reaction was quenched by addition of 15 μl of 6.1N TCA, 100% Final Concentration is 20%, 35 μl of 8.5 mM phenyl glyoxal (final concentration 4 mM) is then added and the reaction is incubated for 30 min at 37° C.

After 30 minutes the plates are spun down to remove all precipitate. The enzyme reaction was quenched with an equal volume of methanol containing internal standard (modified citrulline). Samples were loaded onto the Rapid Fire RF300 system (Agilent) wherein they were first sipped for 1000 ms and then directly loaded to a C18 separations cartridge using a mixture of acetonitrile containing 0.01% formic acid for 3000 ms desalting. The flow rate of the mobile phase was 1.5 ml/min. Once the samples were eluted from the cartridge, a mobile phase of acetonitrile containing 0.01% formic acid was used to move the samples into the mass spectrometer for 4000 ms at a flow rate of 1.25 ml/min/Sciex API5500 triple quadrupole mass spectrometer (Applied Biosystems) equipped with ESI was used to analyze the peptidyl citrulline and internal standard ions.

MRM transition of product and internal standard were monitored at m/z 424.5 to 350.4 and m/z 293 to 247 respectively. The dwell time for each transition was set at 200 ms, and the ESI voltage was used at 5500 with a source temperature of 400° C. Extracted ion peaks for each transition were integrated using the Rapid Fire Integrator software. Peak area of analyte was normalized with internal standard).

For a given compound example, Table 4 below shows the human PAD4 (hPAD4) IC$_{50}$ in the rapid-fire mass spectrum (RFMS) assay.

TABLE 4

| PAD4 Activity | |
|---|---|
| Cmpd # | hPAD4 RFMS IC$_{50}$ (μM) |
| 1. | 0.255 |
| 2. | 1.367 |
| 3. | 0.019 |
| 4. | 0.024 |
| 5. | 0.037 |
| 6. | 0.031 |
| 7. | 0.136 |
| 8. | 0.277 |
| 9. | 0.612 |
| 10. | 0.137 |
| 11. | 18.765 |
| 12. | 0.047 |
| 13. | 0.066 |
| 14. | 0.011 |
| 15. | 0.040 |
| 16. | 0.015 |
| 17. | 0.011 |
| 18. | 0.009 |
| 19. | 0.005 |
| 20. | 0.013 |
| 21. | 0.191 |
| 22. | 0.053 |
| 23. | 0.109 |
| 24. | 0.096 |
| 25. | 0.031 |
| 26. | 0.021 |
| 27. | 0.049 |
| 28. | 0.062 |
| 29. | 0.059 |
| 30. | 0.004 |
| 31. | 0.010 |
| 32. | 0.112 |
| 33. | 0.120 |
| 34. | 0.030 |
| 35. | 0.014 |

TABLE 4-continued

PAD4 Activity

| Cmpd # | hPAD4 RFMS IC$_{50}$ (μM) |
| --- | --- |
| 36. | 0.007 |
| 37. | 0.019 |
| 38. | 0.078 |
| 39. | 0.026 |
| 40. | 0.030 |
| 41. | 0.0449 |
| 42. | 0.0497 |
| 43. | 0.153 |
| 44. | 0.216 |
| 45. | 0.0306 |
| 46. | 0.0448 |
| 47. | 0.088 |
| 48. | 0.092 |
| 49. | 0.292 |
| 50. | 0.837 |
| 51. | 0.119 |
| 52. | 0.008 |
| 53. | 0.014 |

What is claimed is:

1. A compound of Formula (I):

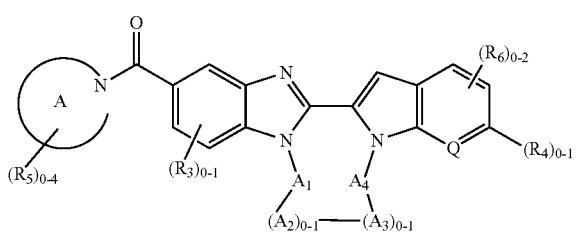

(I)

or a pharmaceutically acceptable salt thereof, wherein:

Q is selected from the group consisting of N and CH;

A is 4- to 15-membered heterocyclyl comprising carbon atoms and 1-4 heteroatoms selected from N, O, and S(O)$_p$;

A$_1$ is C$_{1-4}$ alkylene substituted with 0-3 R$_1$; optionally, one or more of the methylene units of said C$_{1-4}$ alkylene are replaced by O, S(O)$_p$, NH, N(C$_{1-4}$ alkyl), and C(=O);

A$_2$ is selected from the group consisting of C$_{3-6}$ carbocyclyl and 4- to 6-membered heterocyclyl comprising carbon atoms and 1-4 heteroatoms selected from N, O, and S(O)$_p$, each substituted with 0-4 R$_2$;

A$_3$ is selected from the group consisting of C$_{3-6}$ carbocyclyl and 4- to 6-membered heterocyclyl comprising carbon atoms and 1-4 heteroatoms selected from N, O, and S(O)$_p$, each substituted with 0-4 R$_2$;

A$_4$ is selected from the group consisting of C$_{3-8}$ alkylene and C$_{3-8}$ alkenylene, each substituted with 0-5 R$_1$; optionally, one or more of the methylene units of said C$_{3-8}$ alkylene except for the one that is directly bonded to the nitrogen atom of the indole or pyrrolopyridine moiety are replaced by O, S(O)$_p$, NH, N(C$_{1-4}$ alkyl), and C(=O);

provided that when A$_2$ is absent, A$_1$ is bonded directly to A$_3$; when A$_3$ is absent, A$_2$ is bonded directly to A$_4$; when A$_2$ and A$_3$ are both absent, A$_1$ is bonded directly to A$_4$ and at least two methylene units of A$_4$ are replaced by O, S(O)$_p$, NH, N(C$_{1-4}$ alkyl), and C(=O);

R$_1$ is selected from the group consisting of F, Cl, —OR$_b$, and C$_{1-3}$ alkyl substituted with 0-5 R$_c$;

R$_2$ is selected from the group consisting of F, Cl, CN, =O, C(=O)NR$_a$R$_a$, and C$_{1-3}$ alkyl substituted with 0-5 R$_c$;

R$_3$ is selected from the group consisting of F, Cl, Br, —OR$_b$, and C$_{1-3}$ alkyl substituted with 0-5 R$_c$;

R$_4$ is selected from the group consisting of F, Cl, Br, and C$_{1-6}$ alkyl substituted with 0-5 R$_c$;

R$_5$ is selected from the group consisting of F, Cl, CN, C$_{1-3}$ alkyl, =N—OR$_b$, —(CH$_2$)$_r$OR$_b$, —OC(=O)NR$_a$R$_a$, —(CH$_2$)$_r$NR$_a$R$_a$, —NR$_a$C(=NH)C$_{1-3}$alkyl, —C(=O)OR$_b$, —NR$_a$C(=O)OR$_b$, carbocyclylyl substituted with 0-5 R$_c$, and heterocyclylyl substituted with 0-5 R$_c$; alternatively, two R$_5$ groups are taken together to form carbocyclyl or heterocyclyl;

R$_6$, at each occurrence, is independently selected from the group consisting of F, Cl, Br, and C$_{1-4}$alkyl, C$_{1-4}$ haloalkyl, and C$_{1-4}$ hydroxyalkyl;

R$_a$, at each occurrence, is independently selected from the group consisting of H, C$_{1-6}$ alkyl substituted with 0-5 R$_c$, C$_{2-6}$ alkenyl substituted with 0-5 R$_c$, C$_{2-6}$ alkynyl substituted with 0-5 R$_c$, —(CH$_2$)$_r$—C$_{3-10}$carbocyclyl substituted with 0-5 R$_c$, and —(CH$_2$)$_r$-heterocyclyl substituted with 0-5 R$_c$; or R$_a$ and R$_a$ together with the nitrogen atom to which they are both attached form a heterocyclic ring substituted with 0-5 R$_c$;

R$_b$, at each occurrence, is independently selected from the group consisting of H, C$_{1-6}$ alkyl substituted with 0-5 R$_c$, C$_{2-6}$ alkenyl substituted with 0-5 R$_c$, C$_{2-6}$ alkynyl substituted with 0-5 R$_c$, —(CH$_2$)$_r$—C$_{3-10}$carbocyclyl substituted with 0-5 R$_c$, and —(CH$_2$)$_r$-heterocyclyl substituted with 0-5 R$_c$;

R$_c$, at each occurrence, is independently selected from the group consisting of F, Cl, Br, CN, =O, OH, OC$_{1-4}$ alkyl, CO$_2$H, C$_{1-6}$ alkyl substituted with 0-5 R$_d$, —(CH$_2$)$_r$—C$_{3-6}$ cycloalkyl substituted with 0-5 R$_d$, —(CH$_2$)$_r$-aryl substituted with 0-5 R$_d$, —(CH$_2$)$_r$-heterocyclyl substituted with 0-5 R$_d$;

R$_d$, at each occurrence, is independently selected from the group consisting of F, Cl, Br, CN, OH, C$_{1-5}$ alkyl, C$_{2-5}$ alkenyl, C$_{2-5}$ alkynyl, C$_{3-6}$ cycloalkyl, and phenyl;

p, at each occurrence, is an integer selected from zero, 1, and 2; and r, at each occurrence, is an integer selected from zero, 1, 2, 3, and 4.

2. The compound according to claim 1 of Formula (II):

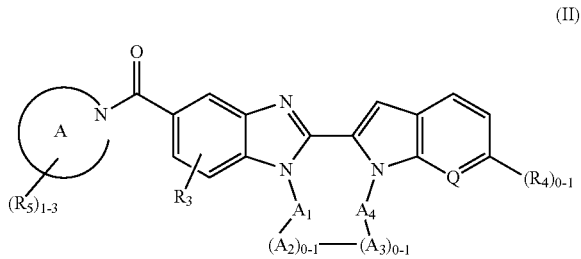

(II)

or a pharmaceutically acceptable salt thereof, wherein:

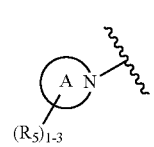

is selected from the group consisting of

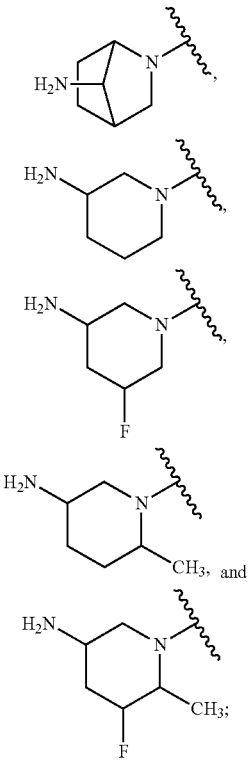

A₁ is C₁₋₄ alkylene substituted with 0-2 R₁; optionally, one or more of the methylene units of said C₁₋₄ alkylene are replaced by NH, N(C₁₋₄ alkyl), and C(=O);

A₂ is selected from the group consisting of C₆ aryl and 4- to 6-membered heterocyclyl comprising carbon atoms and 1-4 heteroatoms selected from N, O, and S(O)$_p$, each substituted with 0-2 R₂;

A₃ is selected from the group consisting of C₃₋₆ cycloalkyl, C₆ aryl, and 4- to 6-membered heterocyclyl comprising carbon atoms and 1-4 heteroatoms selected from N, O, and S(O)$_p$, each substituted with 0-2 R₂;

A₄ is selected from the group consisting of C₃₋₇ alkylene and C₃₋₇ alkenylene, each substituted with 0-5 R₁; optionally, one to three of the methylene units of said C₃₋₇ alkylene except for the one that is directly bonded to the nitrogen atom of the indole or pyrrolopyridine moiety are replaced by O, S(O)$_p$, NH, N(C₁₋₄ alkyl), and C(=O);

R₁ is selected from the group consisting of F, Cl, and —OR$_b$;

R₂ is selected from the group consisting of F, Cl, CN, =O, C(=O)NR$_a$R$_a$, and C₁₋₃ alkyl;

R₃ is selected from the group consisting of F, Cl, Br, and —OC₁₋₄ alkyl;

R₄ is selected from the group consisting of F, Cl, C₁₋₅ alkyl, C₁₋₅ haloalkyl and C₁₋₅ hydroxyalkyl;

R$_a$, at each occurrence, is independently selected from the group consisting of H and C₁₋₅ alkyl; and R$_b$, at each occurrence, is independently selected from the group consisting of H and C₁₋₅ alkyl.

3. The compound according to claim 2 of Formula (III):

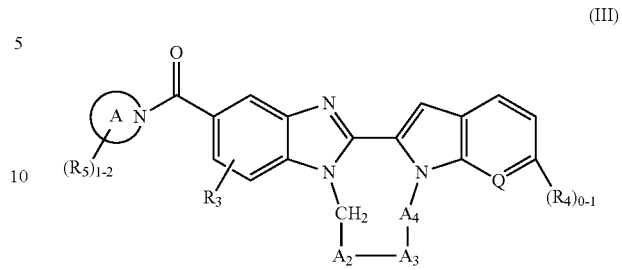

(III)

or a pharmaceutically acceptable salt thereof, wherein:

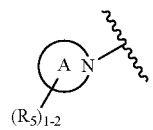

is selected from the group consisting of

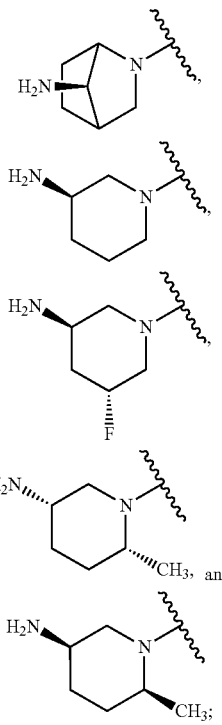

A₂ is selected from the group consisting of C₆ aryl and 4- to 6-membered heterocyclyl comprising carbon atoms and 1-4 heteroatoms selected from N, O, and S(O)$_p$, each substituted with 0-2 R₂;

A₃ is selected from the group consisting of C₃₋₆ cycloalkyl, C₆ aryl, and 4- to 6-membered heterocyclyl comprising carbon atoms and 1-4 heteroatoms selected from N, O, and S(O)$_p$, each substituted with 0-2 R₂;

A₄ is selected from the group consisting of C₃₋₇ alkylene and C₃₋₇ alkenylene, each substituted with 0-5 R₁; optionally, one to two of the methylene units of said C₃₋₇ alkylene except for the one that is directly bonded to the nitrogen atom of the indole or pyrrolopyridine moiety are replaced by O, S(O)$_p$, NH, and N(C$_{1-4}$ alkyl);

R$_1$ is selected from the group consisting of F, Cl, and —OR$_b$;

R$_2$ is selected from the group consisting of F, Cl, CN, =O, C(=O)NR$_a$R$_a$, and C$_{1-3}$ alkyl;

R$_3$ is selected from the group consisting of F, Cl, Br, and —OC$_{1-4}$ alkyl;

R$_4$ is selected from the group consisting of F, C$_{1-4}$alkyl, C$_{1-4}$haloalkyl and C$_{1-4}$hydroxyalkyl;

R$_a$, at each occurrence, is independently selected from the group consisting of H and C$_{1-5}$ alkyl; and R$_b$, at each occurrence, is independently selected from the group consisting of H and C$_{1-5}$ alkyl.

4. The compound according to claim 3 of Formula (IV):

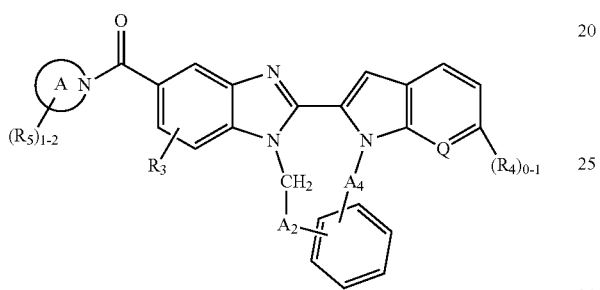

(IV)

or a pharmaceutically acceptable salt thereof, wherein:

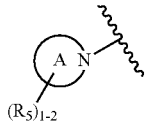

is selected from the group consisting of

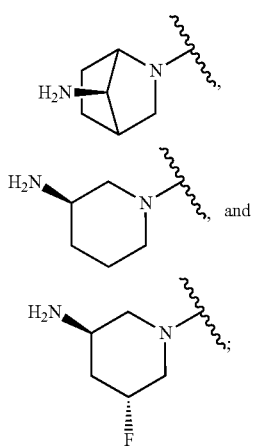

A$_2$ is selected from the group consisting of C$_6$ aryl and 5- to 6-membered heterocyclyl comprising carbon atoms and 1-4 heteroatoms selected from N, O, and S(O)$_p$, each substituted with 0-2 R$_2$;

A$_4$ is selected from the group consisting of C$_{3-7}$ alkylene and C$_{3-7}$ alkenylene, each substituted with 0-5 R$_1$;

optionally, one to two of the methylene units of said C$_{3-7}$ alkylene except for the one that is directly bonded to the nitrogen atom of the indole or pyrrolopyridine moiety are replaced by O, S(O)$_p$, NH, and N(C$_{1-4}$ alkyl) are replaced by O, NH, and N(C$_{1-4}$ alkyl);

R$_1$ is selected from the group consisting of F and —OR$_b$;

R$_2$ is selected from the group consisting of F, CN, =O, and C(=O)NR$_a$R$_a$; and R$_4$ is selected from the group consisting of C$_{1-3}$ alkyl, C$_{1-3}$ haloalkyl and C$_{1-3}$ hydroxyalkyl.

5. The compound according to claim 4 of Formula (V):

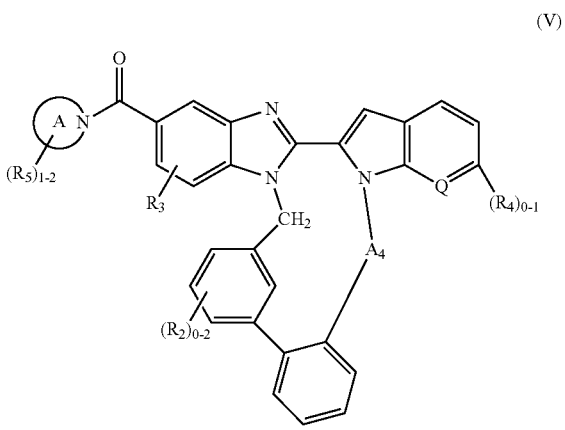

(V)

or a pharmaceutically acceptable salt thereof, wherein:

A$_4$ is selected from the group consisting of C$_{3-7}$ alkylene and C$_{3-7}$ alkenylene, each substituted with 0-5 R$_1$; optionally, one to two of the methylene units of said C$_{3-7}$ alkylene except for the one that is directly bonded to the nitrogen atom of the indole or pyrrolopyridine moiety are replaced by O and NH;

R$_1$ is selected from the group consisting of F and —OH;

R$_2$ is selected from the group consisting of F, CN, and C(=O)NH$_2$; and

R$_4$ is selected from the group consisting of C$_{1-3}$ haloalkyl and C$_{1-3}$ hydroxyalkyl.

6. The compound according to claim 5, or a pharmaceutically acceptable salt thereof, wherein A$_4$ is selected from the group consisting of C$_{3-7}$ alkylene, —OC$_{4-7}$ alkylene, and C$_{3-7}$ alkenylene.

7. The compound according to claim 4 of Formula (VI):

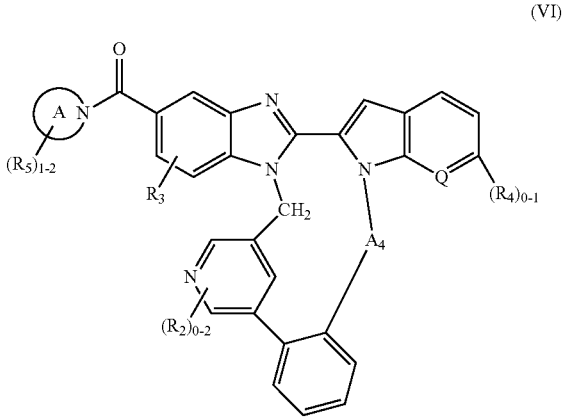

(VI)

or a pharmaceutically acceptable salt thereof, wherein:
$A_4$ is selected from the group consisting of $C_{3-7}$ alkylene, —$OC_{4-7}$ alkylene, and $C_{3-7}$ alkenylene each substituted with 0-5 $R_1$;
$R_1$ is —$OR_b$;
$R_2$ is selected from the group consisting of F and CN;
$R_3$ is —$OC_{1-4}$ alkyl;
$R_4$ is selected from the group consisting of $C_{1-3}$ haloalkyl and $C_{1-3}$ hydroxyalkyl; and
$R_b$, at each occurrence, is independently selected from the group consisting of H and $C_{1-3}$ alkyl.

8. The compound according to claim 7, or a pharmaceutically acceptable salt thereof, wherein

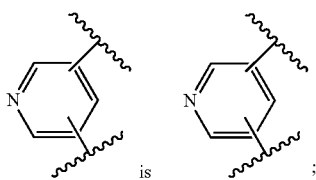

$A_4$ is $C_{3-5}$ alkylene; and
$R_3$ is —$OCH_3$.

9. The compound according to claim 4 of Formula (VII):

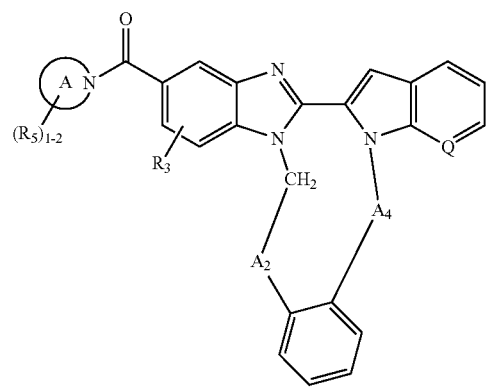

(VII)

or a pharmaceutically acceptable salt thereof, wherein:
$A_2$ is selected from the group consisting of

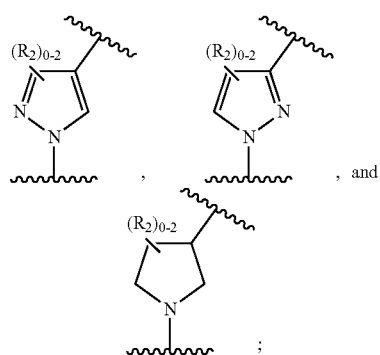

$A_4$ is selected from the group consisting of $C_{3-6}$ alkylene, —$OC_{3-6}$ alkylene, and $C_{3-6}$ alkenylene, each substituted with 0-5 $R_1$; and
$R_2$ is selected from the group consisting of F and =O.

10. The compound according to claim 3 of Formula (VIII):

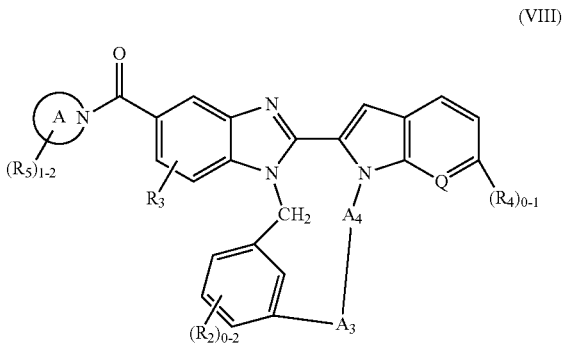

(VIII)

or a pharmaceutically acceptable salt thereof, wherein:

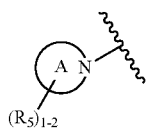

is selected from the group consisting of

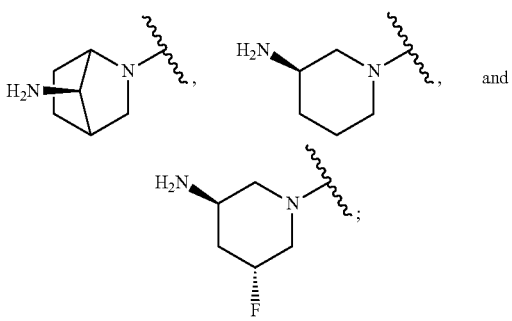

$A_3$ is selected from the group consisting of $C_{3-6}$ cycloalkyl and 4- to 6-membered heterocyclyl comprising carbon atoms and 1-4 heteroatoms selected from N, O, and $S(O)_p$, each substituted with 0-2 $R_2$;
$A_4$ is selected from the group consisting of $C_{3-7}$ alkylene and $C_{3-7}$ alkenylene, each substituted with 0-5 $R_1$; optionally, one to two of the methylene units of said $C_{3-7}$ alkylene except for the one that is directly bonded to the nitrogen atom of the indole or pyrrolopyridine moiety are replaced by O, $S(O)_p$, NH, and $N(C_{1-4}$ alkyl);
$R_1$ is selected from the group consisting of F and —$OR_b$;
$R_2$ is selected from the group consisting of F, Cl, CN, and $C_{1-3}$ alkyl;
$R_3$ is selected from the group consisting of F, Cl, and —$OC_{1-4}$ alkyl;
$R_4$ is selected from the group consisting of $C_{1-4}$ alkyl, $C_{1-4}$ haloalkyl and $C_{1-4}$ hydroxyalkyl;
$R_a$, at each occurrence, is independently selected from the group consisting of H and $C_{1-4}$ alkyl; and
$R_b$, at each occurrence, is independently selected from the group consisting of H and $C_{1-4}$ alkyl.

11. The compound according to claim 10, or a pharmaceutically acceptable salt thereof, wherein:

$A_3$ is selected from the group consisting of cyclopropyl substituted with 0-2 $R_2$ and

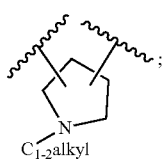

$A_4$ is selected from the group consisting of $C_{3-7}$ alkylene, —$OC_{4-7}$ alkylene, and $C_{3-7}$ alkenylene, each substituted with 0-5 $R_1$;
$R_2$ is selected from the group consisting of F and Cl; and
$R_3$ is —$OCH_3$.

12. The compound according to claim 2 of Formula (IX):

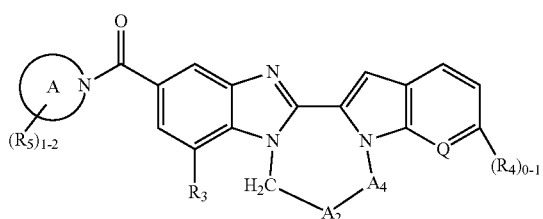

or a pharmaceutically acceptable salt thereof, wherein:

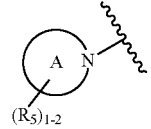

is selected from the group consisting of

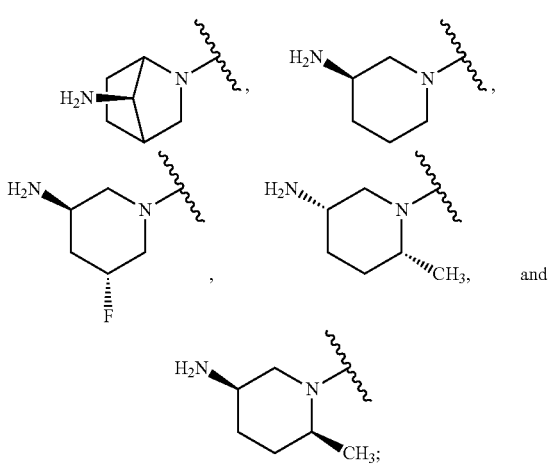

$A_2$ is selected from the group consisting of $C_6$ aryl and 4- to 6-membered heterocyclyl comprising carbon atoms and 1-2 heteroatoms selected from N, each substituted with 0-2 $R_2$;
$A_4$ is selected from the group consisting of $C_{3-7}$ alkylene and $C_{3-7}$ alkenylene, each substituted with 0-3 $R_1$;

optionally one to three of the methylene units of said $C_{3-7}$ alkylene except for the one that is directly bonded to the nitrogen atom of the indole or pyrrolopyridine moiety are replaced by O and C(=O);
$R_1$ is selected from the group consisting of F, Cl, and —OH;
$R_2$ is selected from the group consisting of F, Cl, and CN; and
$R_3$ is selected from the group consisting of F, Cl, and —$OC_{1-4}$ alkyl.

13. The compound according to claim 12 of Formula (X):

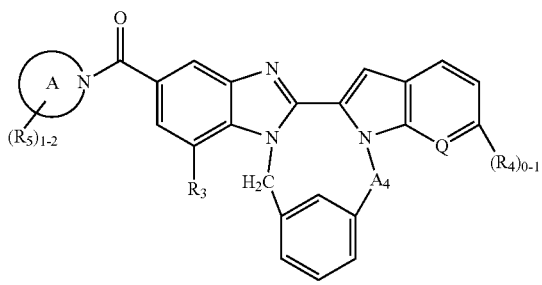

or a pharmaceutically acceptable salt thereof, wherein:

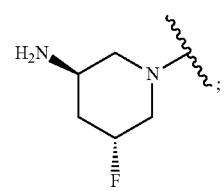

is selected from the group consisting of

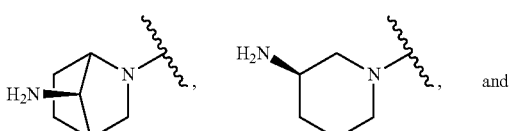

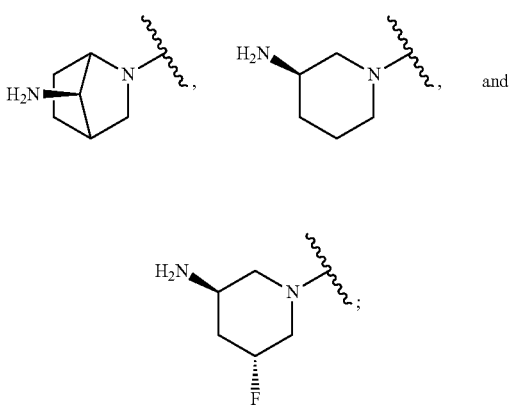

$A_4$ is selected from the group consisting of $C_{3-7}$ alkylene substituted with 0-3 $R_1$, —$OC_{4-7}$ alkylene, and $C_{3-7}$ alkenylene;
$R_1$ is selected from the group consisting of F and —OH; and
$R_3$ is —$OC_{1-4}$ alkyl.

14. The compound according to claim 12, or a pharmaceutically acceptable salt thereof, wherein:

A₂ is

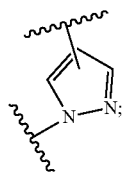

A₄ is selected from the group consisting of C₄₋₇ alkylene and C₄₋₇ alkenylene; and
R₃ is —OCH₃.

16. The compound according to claim 2 of Formula (XI):

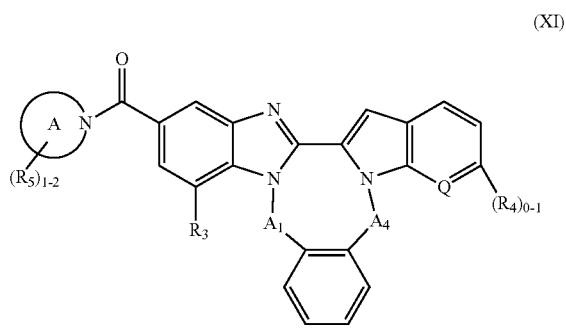

(XI)

or a pharmaceutically acceptable salt thereof, wherein:

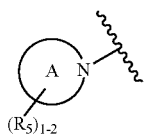

is selected from the group consisting of

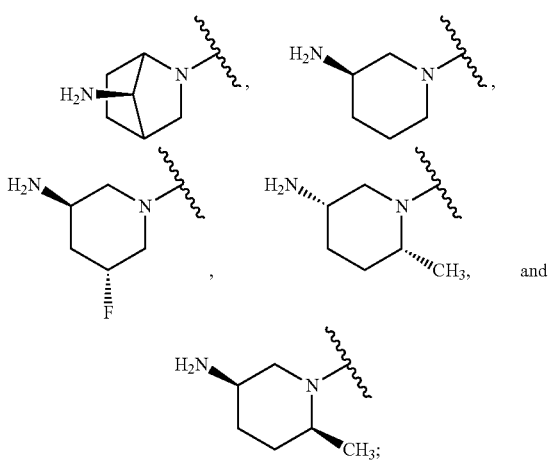

A₁ is C₁₋₃ alkylene and one to two of the methylene units of said C₁₋₃ alkylene are replaced by NH, N(C₁₋₄ alkyl), and C(=O);
A₄ is selected from the group consisting of C₃₋₇ alkylene, —OC₄₋₇ alkylene, and C₃₋₇ alkenylene; and
R₃ is selected from the group consisting of F, Cl, and —OC₁₋₄ alkyl.

16. The compound according to claim 2 of Formula (XII):

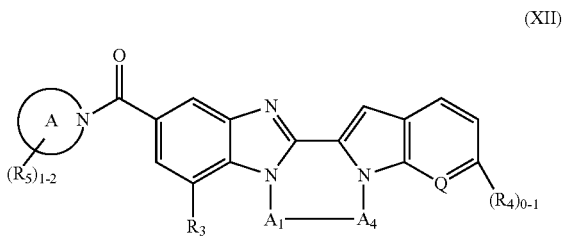

(XII)

or a pharmaceutically acceptable salt thereof, wherein:

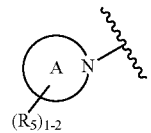

is selected from the group consisting of

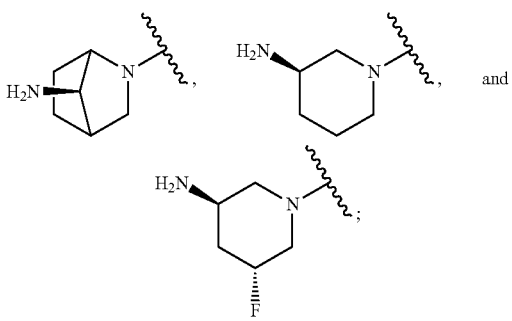

A₁ is C₁₋₂ alkylene;
A₄ is C₃₋₇ alkylene wherein the first two methylene units of said C₃₋₇ alkylene are replaced by S(=O)₂—NH or S(=O)₂—N(C₁₋₃ alkyl); and
R₃ is —OC₁₋₄ alkyl.

17. A pharmaceutical composition comprising the compound according to claim 1, and a pharmaceutically acceptable carrier, adjuvant, or vehicle.

18. The composition according to claim 17, in combination with an additional therapeutic agent.

19. A method of inhibiting PAD4 in a subject or in a biological sample comprising the step of contacting the PAD4 with a compound according to claim 1.

20. A method of treating a PAD4-mediated disease, disorder, or condition selected from the group consisting of acute lymphocytic leukemia, ankylosing spondylitis, cancer, chronic lymphocytic leukemia, colitis, lupus, rheumatoid arthritis, multiple sclerosis, and ulcerative colitis, in a subject having a PAD4-mediated disease, disorder, or condition, comprising the step of administering to said subject the composition according to claim 17.

21. The method according to claim 20, wherein the PAD4-mediated disease, disorder, or condition is selected from rheumatoid arthritis, systemic lupus erythematosus, cutaneous lupus erythematosus, ulcerative colitis, and cancer.

* * * * *